United States Patent
Perkins et al.

(10) Patent No.: US 12,484,904 B2
(45) Date of Patent: Dec. 2, 2025

(54) SYSTEMS, DEVICES AND METHODS OF REPAIRING TENDONS AND LIGAMENTS

(71) Applicant: Cilag GmbH International, Zug (CH)

(72) Inventors: Jason T. Perkins, Easton, PA (US); Alexander M. Cannara, Roseland, NJ (US); Wei Kong, Bridgewater, NJ (US); Matthew D. Putnam, Minneapolis, MN (US); David W. Overaker, Glen Gardner, NJ (US); James Amis, Rogersville, MO (US); Mark T. Mooney, Duluth, GA (US); John Killion, Flemington, NJ (US); Shane Lacy, Bound Brook, NJ (US); Sandra Jean Savidge, Whitehouse Station, NJ (US)

(*) Notice: Subject to any disclaimer, the term of this patent is extended or adjusted under 35 U.S.C. 154(b) by 955 days.

(21) Appl. No.: 17/344,363

(22) Filed: Jun. 10, 2021

(65) Prior Publication Data
US 2022/0395273 A1 Dec. 15, 2022

(51) Int. Cl.
*A61B 17/11* (2006.01)
*A61B 17/06* (2006.01)

(52) U.S. Cl.
CPC .... *A61B 17/1146* (2013.01); *A61B 17/06166* (2013.01); *A61B 2017/06176* (2013.01); *A61B 2017/1125* (2013.01)

(58) Field of Classification Search
CPC .......... A61B 17/1146; A61B 17/06166; A61B 2017/06176; A61B 2017/1125;
(Continued)

(56) References Cited

U.S. PATENT DOCUMENTS

| 5,425,747 A | * | 6/1995 | Brotz | ................. A61B 17/08 606/228 |
| 6,984,241 B2 | | 1/2006 | Lubbers et al. | |

(Continued)

FOREIGN PATENT DOCUMENTS

| EP | 1221909 | 3/2007 |
| JP | 5694328 B2 | 2/2015 |

(Continued)

OTHER PUBLICATIONS

Volker Schoffl et al., Tendon Injuries of the Hand, World Journal of Orthopedics, Jun. 18, 2012, pp. 62-69, vol. 3, Issue 6.
(Continued)

*Primary Examiner* — Richard G Louis
(74) *Attorney, Agent, or Firm* — Amir Bishara

(57) ABSTRACT

A repaired tendon includes a proximal tendon section having a free end, and a distal tendon section having a free end that opposes the free end of the proximal tendon section. Four bidirectional barbed sutures are implanted in the repaired tendon for approximating the free end of the proximal tendon section with the free end of the distal tendon section. Each of the four bidirectional barbed sutures includes a proximal section having proximal barbs that engage the proximal tendon section, a distal section having distal barbs that engage the distal tendon section, and a stop located between the proximal and distal barbs that engages the approximated free ends of the proximal and distal tendon sections. The bidirectional barbed sutures have first suture bites and second suture bites that are shorter than the first suture bites.

28 Claims, 34 Drawing Sheets

(58) Field of Classification Search
CPC .......... A61B 17/30; A61B 2017/06057; A61B 2017/2825; A61B 2017/2837; A61B 17/0482
See application file for complete search history.

(56) References Cited

U.S. PATENT DOCUMENTS

| | | | |
|---|---|---|---|
| 8,062,363 | B2 | 11/2011 | Hirpara et al. |
| 8,273,105 | B2 | 9/2012 | Cohen et al. |
| 8,409,225 | B2 | 4/2013 | Bull et al. |
| D690,810 | S | 10/2013 | Nawrocki et al. |
| 8,679,158 | B2 | 3/2014 | Leung et al. |
| 8,690,914 | B2 | 4/2014 | Leung et al. |
| RE45,426 | E * | 3/2015 | Buncke ............ A61B 17/06166 606/228 |
| 9,017,404 | B2 | 4/2015 | Champagne et al. |
| 9,539,084 | B2 | 1/2017 | Champagne et al. |
| 9,872,679 | B2 | 1/2018 | Perkins et al. |
| D905,243 | S | 12/2020 | Kim |
| D905,244 | S | 12/2020 | Kim |
| D936,829 | S | 11/2021 | Ryu et al. |
| 2002/0077631 | A1* | 6/2002 | Lubbers ............ A61B 17/0401 606/328 |
| 2005/0186273 | A1* | 8/2005 | Yum .................. A61K 9/0004 604/890.1 |
| 2007/0224237 | A1* | 9/2007 | Hwang ............ A61K 38/1841 514/16.1 |
| 2008/0154286 | A1* | 6/2008 | Abbott ............... A61B 17/0483 606/228 |
| 2010/0262181 | A1* | 10/2010 | Choi .................. A61B 17/0469 606/205 |
| 2010/0318123 | A1 | 12/2010 | Leung et al. |
| 2012/0035623 | A1* | 2/2012 | Bagaoisan ......... A61B 17/0482 606/144 |
| 2013/0079815 | A1 | 3/2013 | Hasan et al. |
| 2014/0081321 | A1 | 3/2014 | Nawrocki et al. |
| 2015/0173737 | A1 | 6/2015 | Champagne et al. |
| 2017/0035553 | A1 | 2/2017 | Champagne et al. |
| 2017/0224338 | A1 | 8/2017 | Sung |
| 2018/0014828 | A1 | 1/2018 | Fonte et al. |
| 2021/0386423 | A1 | 12/2021 | Dalessandro et al. |

FOREIGN PATENT DOCUMENTS

| | | |
|---|---|---|
| JP | 1652605 S | 2/2020 |
| JP | 1652606 S | 2/2020 |
| KR | 30-0737832 B2 | 6/2014 |
| WO | 2017051409 | 3/2017 |

OTHER PUBLICATIONS

Kessler and Modified Kessler Techniques for Flexor Tendon Repair, one page.

Office Action in connection with Japanese Application No. 2021-027067, dated Mar. 15, 2022, p. 1.

* cited by examiner

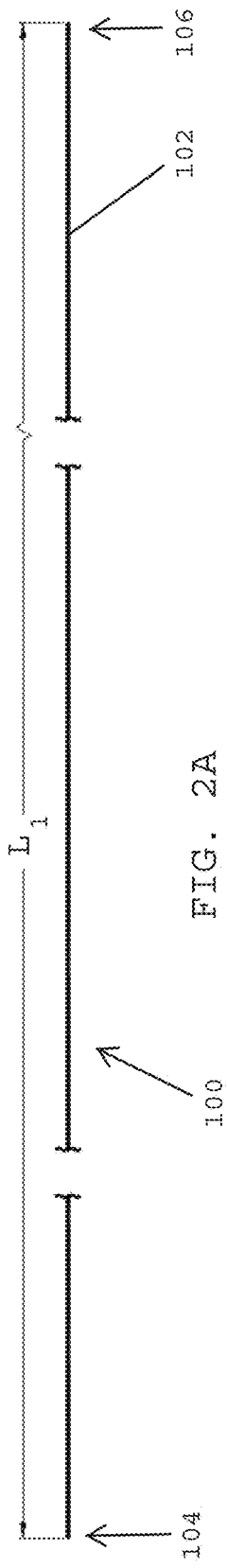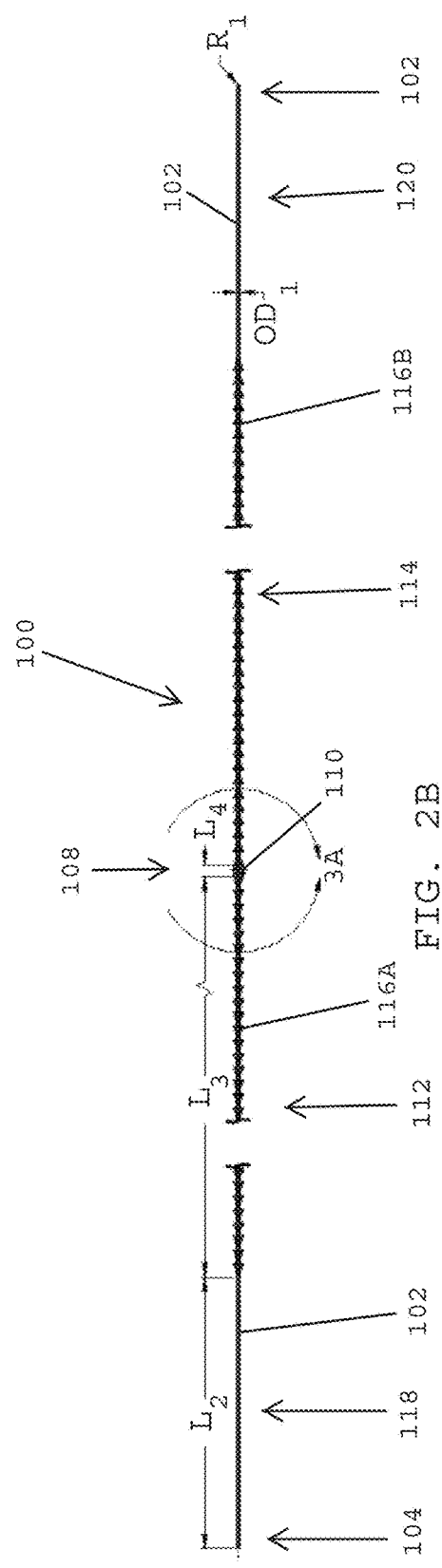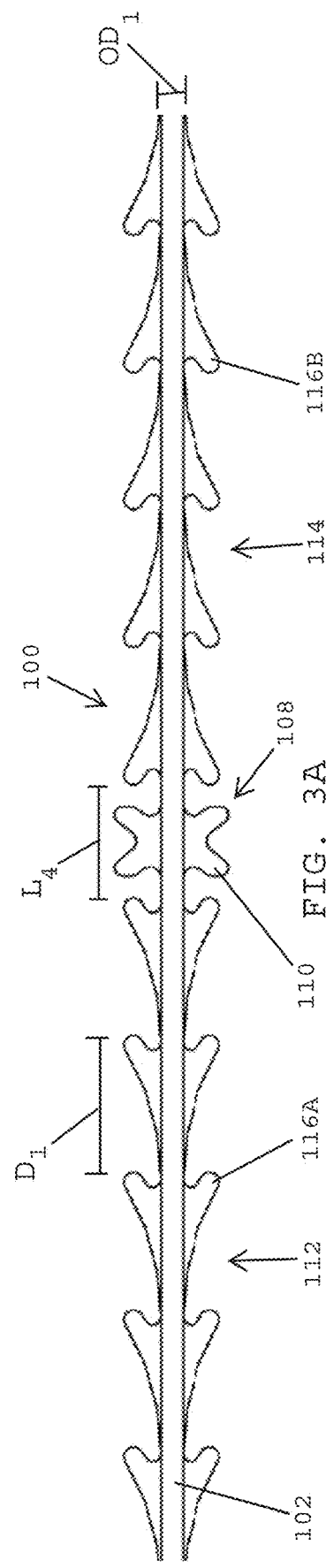

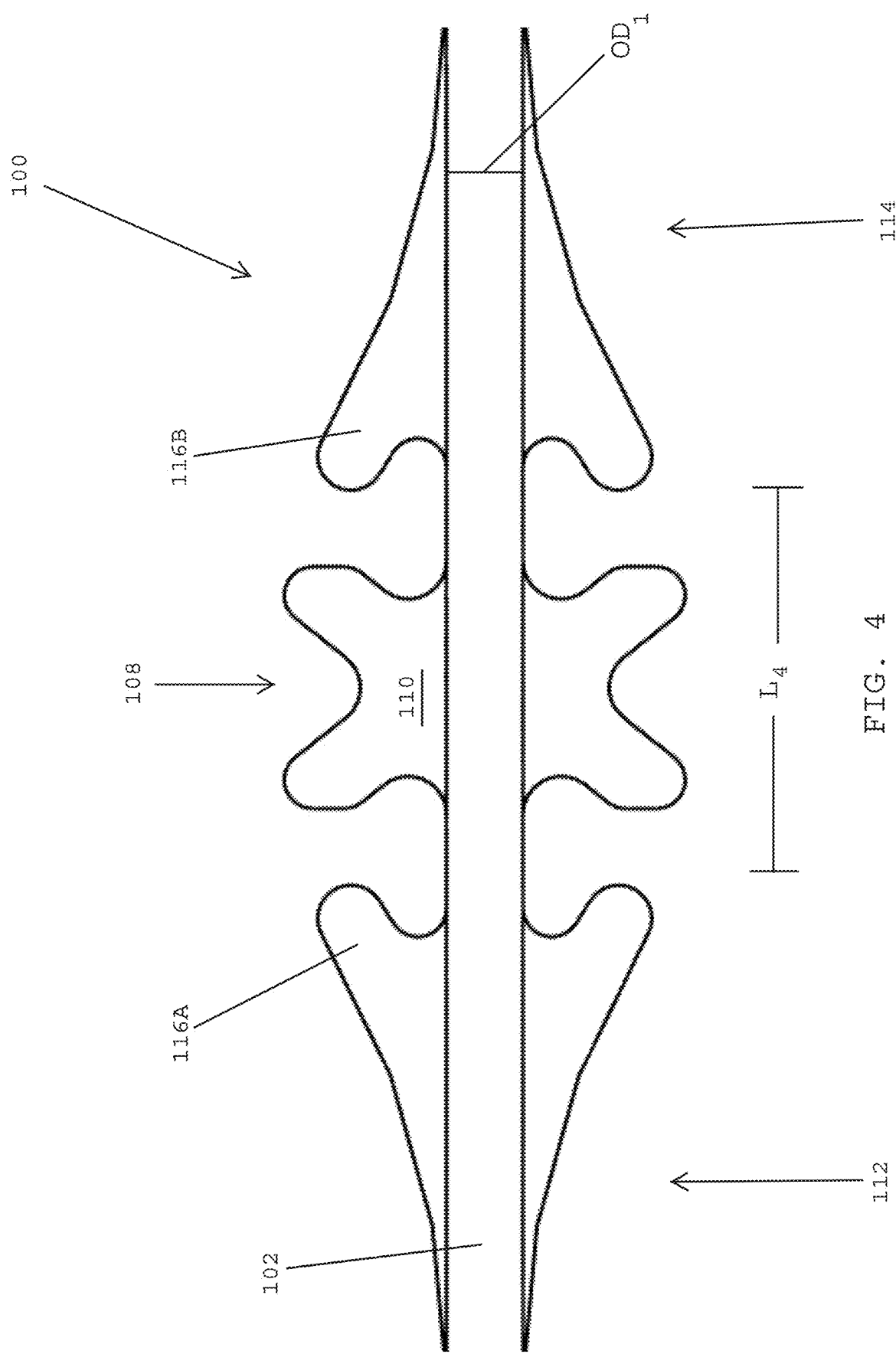

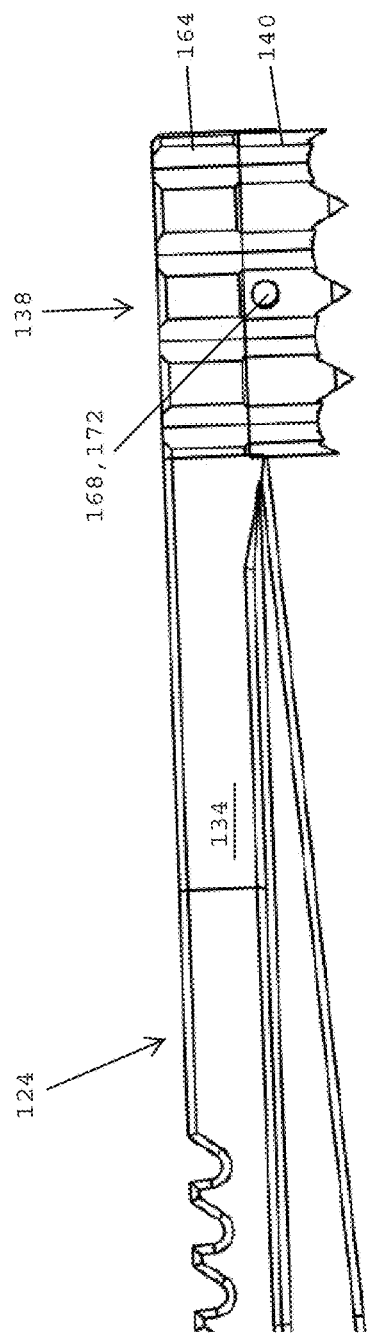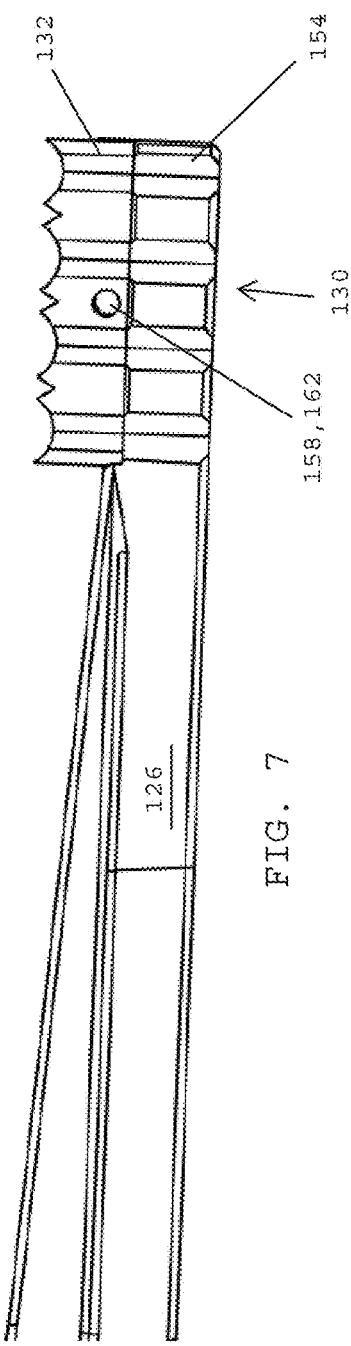
FIG. 7

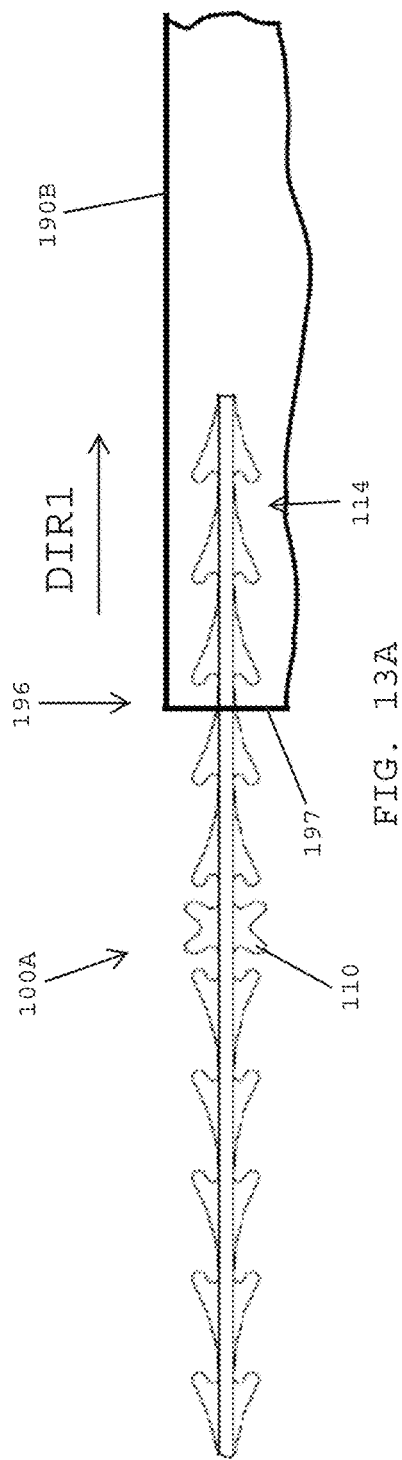
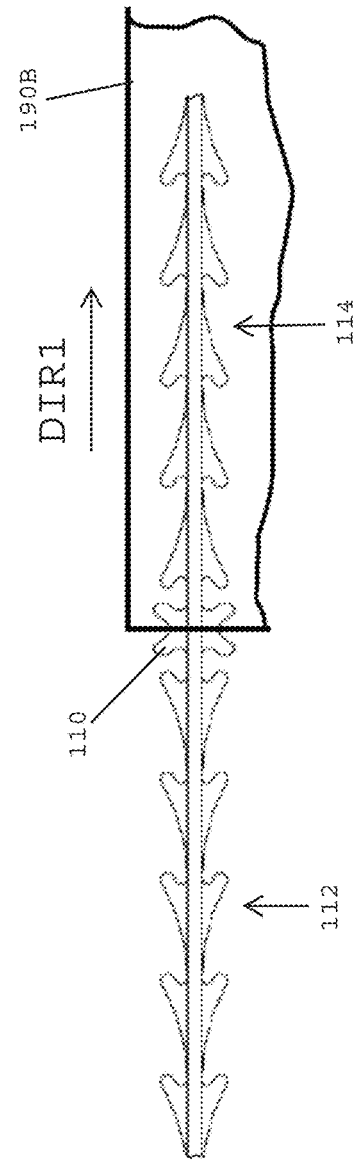
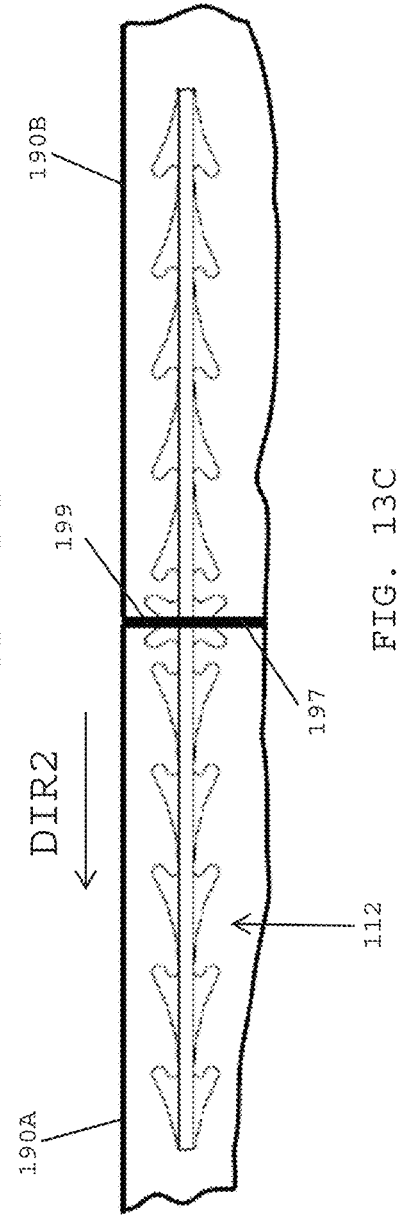

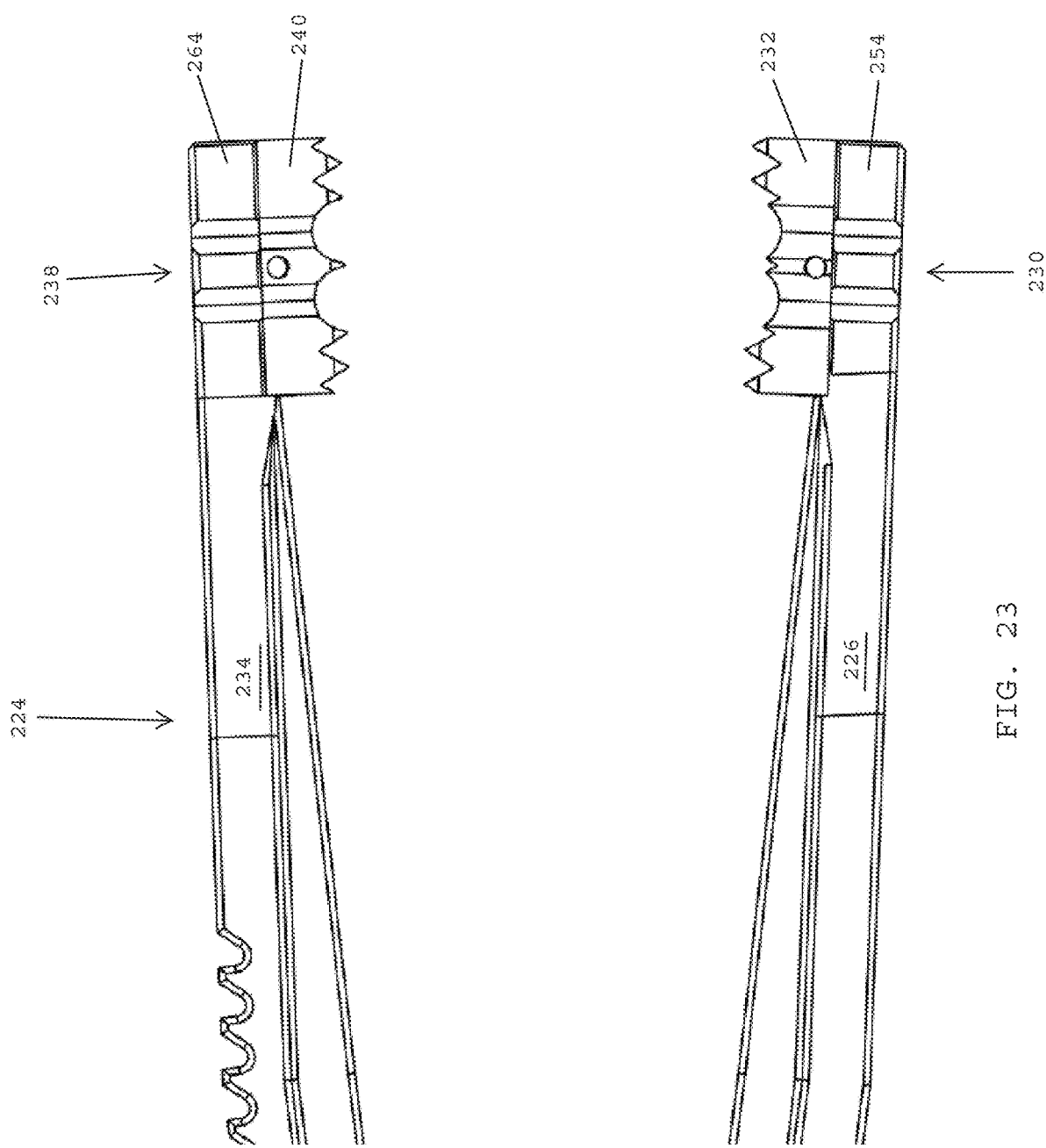

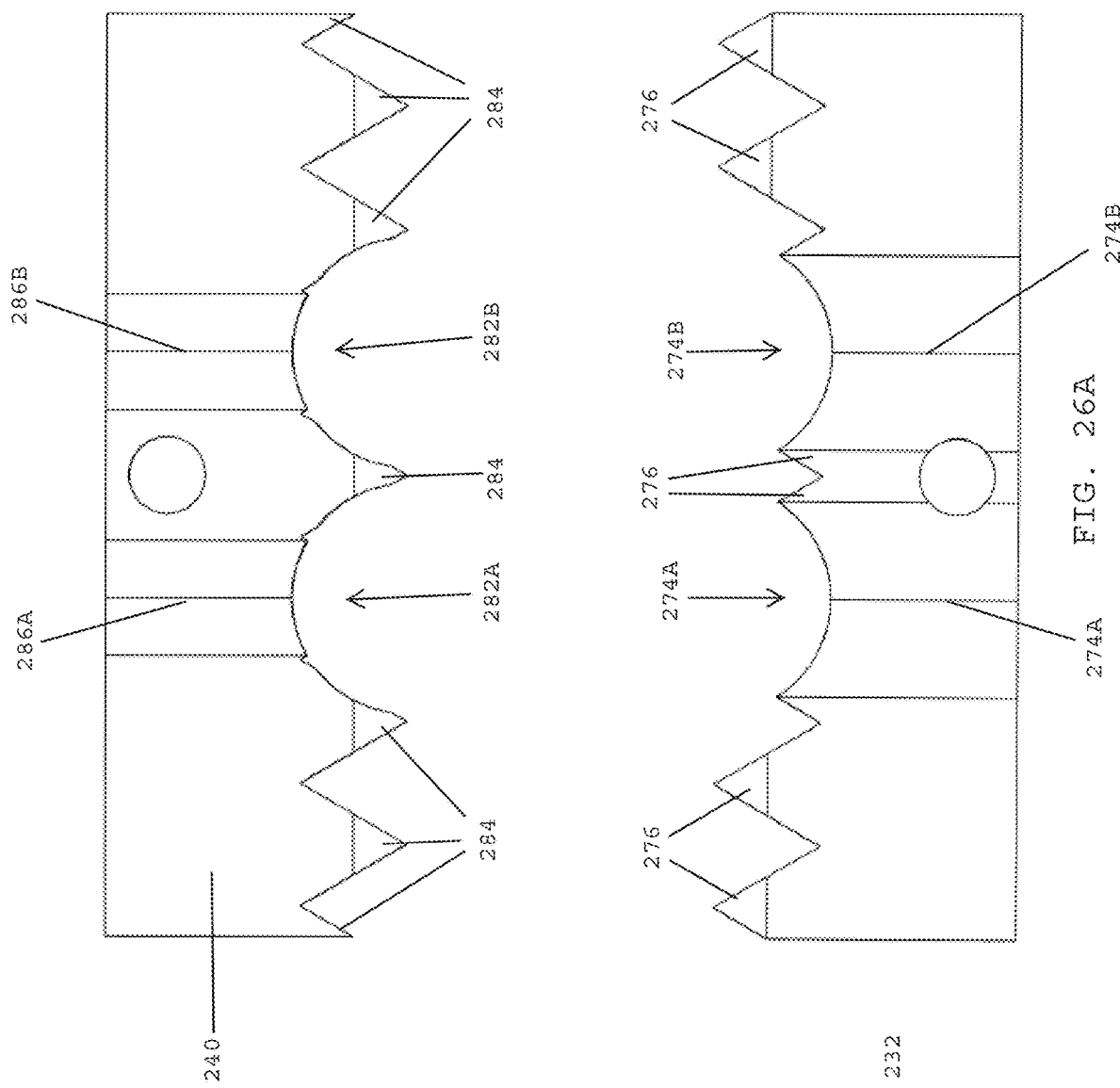

SYSTEMS, DEVICES AND METHODS OF REPAIRING TENDONS AND LIGAMENTS

BACKGROUND OF THE INVENTION

Field of the Invention

The present patent application is generally related to surgical procedures and is more particularly related to systems, devices, and methods for repairing tendons and ligaments.

Description of the Related Art

Hand injuries account for approximately 14%-30% of all injuries that are treated in emergency rooms and emergency care centers. Tendon injuries are the second most common type of hand injury.

There are no established, uniform guidelines for surgically repairing tendons. Rather, there are 150 or more different surgical procedures that are used to repair tendons, many of which are very complex and result in varied outcomes. The particular repair techniques that are chosen by surgeons reflect surgical training, popularity, and technical difficulty. Most tendon repair procedures use traditional sutures with varying suture patterns and knotting techniques. One widely accepted procedure, the Kessler repair or modified Kessler technique shown in FIG. 29, uses one or more monofilament sutures having a core suture size of 3/0 or 4/0.

During the recovery period following tendon repair surgery, a patient's quality of life is typically poor, which is often due to the patient's inability to perform normal daily activities and the patient's dependence upon others for assistance in completing normal activities. In addition, adhesions and ruptures are common complications of tendon repair procedures, which may slow recovery and cause patient discomfort.

In view of the above-noted deficiencies, there is a continuing need for effective and safe tendon repair procedures that provide the necessary strength at the junction of the repaired tendon to maintain the tendon faces in apposition. In addition, there is a need for improved repair systems and procedures that allow for effective gliding of the repaired tendon over pulleys, and that reduce the occurrence of inflammation and adhesion formation. There is also a need for simplified, standardized, repeatable and efficient systems, devices, and methods for repairing damaged tendons (and ligaments). Moreover, there is a need for systems, devices and methods that achieve a consistent, repeatable result for tendon repair with minimal deviation in results from patient to patient.

SUMMARY OF THE INVENTION

In one embodiment, systems, devices, and methods provide a new, uniform standard of care for tendon repair procedures, which surpass the varied surgical techniques and equally varied patient outcomes, including knot-related complications, that are typically associated with the use of traditional sutures and suturing techniques.

In one embodiment, the improved systems, devices, and methods may be used for repairing tendons including flexor tendons.

In one embodiment, the improved systems, devices and methods may be used for repairing ligaments.

In one embodiment, a system for repairing tendons and ligaments preferably includes a novel bidirectional barbed suture that joins together opposing sections of a torn and/or damaged tendon or ligament.

In one embodiment, a system for repairing tendons and ligaments preferably includes a tissue clamp (e.g., a tendon grasper tool) that facilitates completing tendon repair procedures while minimizing the likelihood of injury to the tendon (or ligament).

In one embodiment, a system for repairing tendons and ligaments preferably includes a band or an adhesive tape (e.g., a heat-shrinkable band) that may cover a rejoined junction of a repaired tendon for replacing an epitendinous whip stitch. In one embodiment, the band or adhesive tape may be applied over a previously applied epitendinous whip stitch.

In one embodiment, the band or adhesive tape may incorporate a therapeutic agent that preferably enhances healing and/or encourages the formation of bridging collagen at the injury site. In one embodiment, the therapeutic agent incorporated into a band or adhesive tape may include peptides, which are biologically and medically significant molecules. In one embodiment, the therapeutic agent incorporated into a band or adhesive tape include genetically modified immune compatible cells designed to deliver repair instruction to the tendon and ligament tissue, such as a therapeutic agent that utilizes Clustered Regularly Interspaced Short Palindromic Repeat (CRISPR) technology.

In one embodiment, a novel tendon repair method may use one or more bidirectional barbed sutures, a tissue clamp, and the adhesive tape for improving the strength, consistency, and repeatability of a tendon repair procedure.

In one embodiment, the bidirectional barbed sutures are specifically designed to approximate and repair flexor tendon injuries while allowing for smooth glide of the repaired flexor tendon through a pulley (i.e., sheath) system to provide unimpeded full range of motion when flexing fingers that have a repaired flexor tendon.

In one embodiment, the bidirectional barbed suture may be made from absorbable or non-absorbable materials and may elute bioactive or lubricious agents to promote healing and smooth glide through the pulley system or prophylactically address adhesion formation.

In one embodiment, a system for repairing tendons and/or ligaments preferably includes using four strands of bidirectional barbed sutures in an out-in-out substantially linear technique. In one embodiment, the suture size is preferably 4-0.

In one embodiment, the bidirectional barbed suture preferably includes a central transition zone in which the barbs change direction to minimize the presence of gapping in a repaired tendon or ligament. In one embodiment, the bidirectional barbed suture preferably includes a stop that is located in the transition zone. The stop preferably creates a clear visual and tactile indicator of the midpoint of the bidirectional barbed suture, while offering tendon repair strength due to the barbs engaging the tendon and while allowing for tenocyte communication and bridging across the repair junction to promote healing.

In one embodiment, the barbs of the bidirectional barbed suture preferably have a low profile. In one embodiment, the low-profile barb geometry preferably provides minimal drag through tissue, while still providing sufficient and evenly distributed barb holding strength with multiple fixation points.

In one embodiment, a bidirectional barbed suture has gradual transition from the elongated core of the bidirectional barbed suture (approximately 0.008-0.012 inches in diameter) to the full width of the barbs (approximately 0.035-0.039 inches) over a barb pitch of approximately 0.050-0.075 inches, which provides a bidirectional barbed suture that achieves a balance between low tissue drag and sufficient barb holding strength.

In one embodiment, a bidirectional barbed suture having barbs that lie in a single plane may be twisted and subjected to heat setting, etc. so that the barbs lie in multiple planes. After twisting and setting, the multi-planar barbs may appear three-dimensional, which desirably benefits holding strength in general and adds a secondary tactile indicator of the transition zone where the barbs change orientation.

In one embodiment, the tips of the barbs of a bidirectional barbed suture preferably have a radius of curvature of approximately 0.003 inches to reduce the likelihood of injury by allowing the barbs to grasp, but not strangle tendons or ligaments. The above-described barb geometry is an improvement over the Kessler and Modified Kessler techniques (FIG. 29), which uses traditional sutures that can strangulate or kill tissue. In addition, the rounded geometry of the barbs preferably limits the likelihood of any exposed barbs interfering with the pulley system.

In one embodiment, the bidirectional barbed suture preferably has a non-barbed leader length of approximately 0.75-2.0 inches to provide freedom of maneuverability to surgeons when the bidirectional barbed suture is being placed in a tendon.

Tendons remodel and heal differently than fascia or skin. With tendons there is minimal scarring, and, when fully healed, there may be no evidence of the initial damage or repair. In one embodiment, the bidirectional barbed sutures may be made of an absorbable material for returning a patient closer to the pre-injury state provided that the absorbable material delivers the appropriate strength of repair over the required time period.

In one embodiment, a bidirectional barbed suture made of an absorbable material may also be used to control the release of a drug to the repair site.

In one embodiment, a bidirectional barbed suture may include a marker, such as a radiopaque marker that is opaque to one or more forms of radiation, such as x-rays, ultrasound, etc. After being implanted in a tendon or ligament during surgery, the marker may be monitored to determine the effectiveness of rehabilitation and/or physical therapy protocols.

In one embodiment, a bidirectional barbed suture preferably includes a transition zone having a stop that provides visual and tactile indications of the midpoint of the barbed suture. In one embodiment, the transition zone is the location on the bidirectional barbed suture where the barbs change orientation and/or direction.

In one embodiment, the stop engages in tissue to provide strength to the tendon repair. In one embodiment, the stop is preferably not so large as to inhibit tissue healing and growth at the junction of the tendon repair.

In one embodiment, a system for repairing tendons and ligaments preferably includes a tissue clamping tool, which is specifically designed to secure tendons and ligaments during surgical procedures.

Conventional tissue grasping tools and tissue clamps inherently impart some degree of damage to a tendon (or ligament) when handling it during repair. In one embodiment, the tissue clamp is designed to allow for easy manipulation of tissue without damaging the tendon. In one embodiment, the tissue clamp preferably holds the tendon in a fixed location while placing the bidirectional barbed sutures during a tendon repair procedure.

In one embodiment, the tissue clamp preferably includes a locking mechanism that allows for the application of adjustable clamping pressure onto tendons, which enables the tendon to be held with minimal damage while one or more bidirectional barbed sutures are passed through the tendon sections. In one embodiment, the tissue clamp preferably include two or more spaced apart needle guide channels for passing needles and sutures without compressing the tendons.

In one embodiment, the needle guide channels function as guide paths for needles to accurately deliver the bidirectional barbed sutures into a tendon. In one embodiment, the needle guide channels preferably guide suture needles and the bidirectional barbed sutures into collagen bands or bundles that extend along the length of a tendon.

In one embodiment, the tissue clamp may include tissue gripper pads having pointed teeth that provide a secure grip over a large area of the tendon to prevent tendon slippage and reduce damage to the tendon. The pointed teeth of opposing tissue gripper pads are preferably offset from one another (i.e., not in alignment). The offset pointed teeth preferably function as a bed of nails to secure the tendon without damaging the tendon by applying too much clamping force in any particular area or location of the tendon.

In one embodiment, the tissue clamp preferably includes opposing first and second clamping arms having respective distal ends with laterally-located, visual alignment guides (e.g., vertical grooves) that are in alignment with the needle guide channels for enabling surgeons to locate the needle guide channels when the tissue clamp is in a closed configuration (e.g., clamped over a tendon).

In one embodiment, the needle guide channels preferably enable the needle and suture to be passed through the tendon without compressing the tendon.

In one embodiment, the side grooves provide a visual indication of the location of the needle guide channels when the tissue clamp is in a closed position (e.g., clamped onto a tendon).

In one embodiment, the tissue clamp preferably has a locking mechanism with an adjustable locking lever for modifying the amount of clamping pressure applied to a tendon, pointed teeth to provide a secure grip of the tendon over a large area to prevent tendon slippage and reduce damage to the tendon, needle clearance grooves for easier and more consistent passing of needles and sutures without compressing the tendon, and side grooves that provide visual indicators of the location of the needle guide channels when the tissue clamp is closed on a tendon.

During tendon repair procedures, epitendinous whip stitches are often used around the junction of the tendon repair for bringing the opposing edges of the tendon together in a low-profile manner. In one embodiment, rather than using an epitendinous whip stitch, an adhesive tape may be placed around the junction of the tendon repair. In one embodiment, the adhesive tape may be positioned over an epitendinous whip stitch.

In one embodiment, the adhesive tape may have heat-shrink properties that enable it to shrink when in contact with a body's elevated temperature. The adhesive tape preferably protects surrounding tissues from any barbs that protrude from the suture core. The adhesive tape may be pre-rolled like a ring, applied onto one segment of the tendon prior to the core suture repair, and rolled out over the repaired junction after the core sutures are placed. In one embodiment, the adhesive tape may prophylactically elute ORC or another type of anti-adhesion product.

In one embodiment, needles having ¼, ⅜ and/or ½ circle curvatures have been shown to work well in human cadaver flexor tendon labs to provide the 0.25-0.75 inch tissue bite into tendons in an ergonomic manner.

In one embodiment, whip stitches are preferably located directly at the junction of the repair site, with the components of the whip stitch in direct contact with the injured collagen fibers and the living cells of the repaired tendons and ligaments.

In one embodiment, a surgical repair procedure preferably includes creating a circumferential whip stitch using a suture needle having a curvature of ¼, ⅜ or ½ circle with a tissue bite of between about 0.25 inches to about 0.75 inches. A monofilament suture is preferably attached to the suture needle for creating the circumferential whip stitch.

In one embodiment, after one or more bidirectional barbed sutures have been implanted for repairing damaged tendons and ligaments, one or more whip stitches may be used for adding strength to the overall repair, stabilizing the tendon or ligament structure, placing the filaments of the injured collagen bundles in close proximity with one another for promoting healing and repair, and reducing the bulk of the collagen fibers at the repair site.

In one embodiment, the one or more whip stitches may include dynamic whip stitches that are responsive to temperature or other factors.

In one embodiment, a whip stitch may incorporate a therapeutic agent that preferably enhances healing and/or encourages the formation of bridging collagen at the injury site. In one embodiment, the therapeutic agent incorporated into a whip stitch may include peptides, which are biologically and medically significant molecules. In one embodiment, the therapeutic agent incorporated into a whip stitch may include genetically modified immune compatible cells designed to deliver repair instruction to the tendon and ligament tissue, such as a therapeutic agent that utilizes Clustered Regularly Interspaced Short Palindromic Repeat (CRISPR) technology.

In one embodiment, the needle for advancing the bidirectional barbed suture through a tendon preferably has a blunt or tapered point. In one embodiment, the blunt or tapered needle tip geometry is preferred because such a needle will follow the "path of least resistance" through the tendon and separate fibers within the tendon instead of cutting the fibers, thereby reducing, or eliminating injury.

In one embodiment, a surgical procedure for repairing a damaged tendon or ligament uses four bidirectional barbed sutures in an out-in-out technique. In one embodiment, the suture cores are preferably size 4-0. In one embodiment, the bidirectional barbed sutures are passed through the distal tendon section in a linear pattern so that the sutures are arranged linearly relative to one another. In one embodiment, the sutures extend in a linear pattern through the collagen bundles of the distal tendon section. In one embodiment, one or more bidirectional barbed sutures may be passed through a first collagen bundle and one or more bidirectional barbed sutures may be passed through a second collagen bundle.

In one embodiment, distal sections of bidirectional barbed sutures are passed through a distal tendon section using a 7 mm/5 mm bite pattern. In one embodiment, the first suture bite into the distal tendon section has a length of 7 mm. The suture is then pulled out of the distal tendon section. Tension is applied to the suture to pull the stop against the end face at the proximal end of the distal tendon section. The suture is then reinserted back into the distal tendon section for taking a second suture bite having a length of 5 mm. The suture is again removed from the distal tendon section following the 5 mm bite. The same 7 mm and 5 mm suture bite pattern is used for implanting each of the four sutures. The suturing pattern is preferably repeated for the proximal tendon section for rejoining and/or approximating the opposing ends of the proximal and distal tendon sections.

As used in the present patent application, the term "suture bite" means the distance between where sutures enter and exit tissue. In one embodiment, a length of a suture bite is the distance from where a bidirectional barbed suture enters a tendon (e.g., a free end of a tendon section) to the distance when the bidirectional barbed suture exits the tendon (e.g., a sidewall of a tendon section).

In one embodiment, a tendon repair procedure preferably utilizes bidirectional barbed sutures that are primarily contained within the tendon and allow full approximation (<2 mm gap) of the tendon while minimizing tissue bunching, bulking, or reduced glide through the pulley system as occurs when using traditional suture repair techniques that utilize knots.

As a result of using the out-in-out tissue bite methodology, the barbs that project from the elongated core of the bidirectional barbed suture will engage in the tendon in multiple planes and at multiple orientations, which translates into higher repair strength. The symmetry of the surgical techniques (i.e., positioning a distal end of the suture in a distal tendon section and a proximal end of the suture in a proximal tendon section) balances the mechanical load on the repaired tendon by working with the natural anatomy of the two fibrous collagen bundles within the tendon. The surgical techniques disclosed herein also preferably stabilize the repair and minimize rotational misalignment of the two tendon segments.

In one embodiment, using barbed sutures saves time versus using unbarbed sutures that require traditional suturing techniques (e.g., tying knots).

In one embodiment, using four suture strands creates a more complex network of opposing forces that increases the repair strength.

The 4-0 bidirectional barbed suture and the four suture "out-in-out" surgical technique provides many benefits including a pleasing aesthetic appearance of the resulting repair (because the barbed sutures are barely visible—see FIG. 14), maximum cyclic loading strength at repair failure, maximum cyclic loading strength at 2 mm gap, minimum cyclic creep, and core break failure mode, which minimizes standard deviation.

In one embodiment, a method of repairing a tendon preferably includes obtaining four bidirectional barbed sutures, each of the four bidirectional barbed sutures including a proximal section with proximal barbs that extend in a first direction and a proximal needle secured to a proximal end of the proximal section, a distal section with distal barbs that extend in a second direction that is opposite the first direction and a distal needle secured to a distal end of the distal section, and a stop located between the proximal and distal barbs.

In one embodiment, a method includes using the distal needle of a first bidirectional barbed suture to take a first suture bite in a distal tendon section and pulling the distal barbs in a distal direction through the distal tendon section until the stop abuts against a free end of the distal tendon section.

In one embodiment, a method includes using the distal needle of a second bidirectional barbed suture to take a first suture bite in the distal tendon section and pulling the distal barbs of the second bidirectional barbed suture in the distal direction through the distal tendon section until the stop of the second bidirectional barbed suture abuts against the free end of the distal tendon section.

In one embodiment, a method includes using the distal needle of a third bidirectional barbed suture to take a first suture bite in the distal tendon section and pulling the distal barbs of the third bidirectional barbed suture in the distal direction through the distal tendon section until the stop of the third bidirectional barbed suture abuts against the free end of the distal tendon section.

In one embodiment, a method includes using the distal needle of a fourth bidirectional barbed suture to take a first suture bite in the distal tendon section and pulling the distal barbs of the fourth bidirectional barbed suture in the distal direction through the distal tendon section until the stop of the fourth bidirectional barbed suture abuts against the free end of the distal tendon section.

In one embodiment, a method may include pulling the distal barbs of the first bidirectional barbed suture and the distal barbs of the second bidirectional barbed suture in the distal direction through a first collagen bundle located within the distal tendon section.

In one embodiment, a method may include pulling the distal barbs of the third bidirectional barbed suture and the distal barbs of the fourth bidirectional barbed suture in the distal direction through a second collagen bundle located within the distal tendon section.

In one embodiment, a method includes using the proximal needle of the first bidirectional barbed suture to take a first suture bite in a proximal tendon section and pulling the proximal barbs of the first bidirectional barbed suture in a proximal direction through the proximal tendon section.

In one embodiment, a method includes using the proximal needle of the second bidirectional barbed suture to take a first suture bite in the proximal tendon section and pulling the proximal barbs of the second bidirectional barbed suture in the proximal direction through the proximal tendon section.

In one embodiment, a method includes using the proximal needle of the third bidirectional barbed suture to take a first suture bite in the proximal tendon section and pulling the proximal barbs of the third bidirectional barbed suture in the proximal direction through the proximal tendon section.

In one embodiment, a method includes using the proximal needle of the fourth bidirectional barbed suture to take a first suture bite in the proximal tendon section and pulling the proximal barbs of the fourth bidirectional barbed suture in the proximal direction through the proximal tendon section.

In one embodiment, a method includes applying tension to the proximal ends of the four bidirectional barbed sutures to pull the respective stops of the four bidirectional barbed suture against the free end of the proximal tendon section that opposes the free end of the distal tendon section for approximating the opposing free ends of the distal and proximal tendon sections for repairing a tendon.

In one embodiment, a method may include pulling the proximal barbs of the first bidirectional barbed suture and the proximal barbs of the second bidirectional barbed suture through a first collagen bundle located within the proximal tendon section.

In one embodiment, a method may include pulling the proximal barbs of the third bidirectional barbed suture and the proximal barbs of the fourth bidirectional barbed suture through a second collagen bundle located within the proximal tendon section.

In one embodiment, the first and second collagen bundles extend along a length of the repaired tendon. In one embodiment, the first and second bidirectional barbed sutures extend linearly through the first collagen bundle of the repaired tendon and the third and fourth barbed sutures extend linearly through the second collagen bundle of the repaired tenson.

In one embodiment, the first suture bites made in the distal tendon section have a length of about 7 mm, and the first suture bites made in the proximal tendon section have a length of about 7 mm.

In one embodiment, a method includes using the distal needles of the four bidirectional barbed sutures to take second suture bites in the distal tendon section, and using the proximal needles of the four bidirectional barbed sutures to take second suture bites in the proximal tendon section.

In one embodiment, the first suture bites have a length that is greater than the second suture bites.

In one embodiment, each of the second sutures bites in the distal and proximal tendon sections has a length of about 5 mm.

In one embodiment, a method includes forming and/or placing an epitendinous whip stitch around a junction of the approximated opposing free ends of the distal and proximal tendon sections.

In one embodiment, a method includes placing a band of heat-shrink material (e.g., an adhesive tape) around a junction of the approximated opposing free ends of the distal and proximal tendon sections.

In one embodiment, a method includes using a tissue clamp for securing the distal tendon section adjacent the free end of the distal tendon section.

In one embodiment, the tissue clamp desirably includes first and second tissue gripping pads that oppose one another for engaging opposite sides of the distal tendon section.

In one embodiment, the opposing tissue gripping pads define at least one needle guide channel that is in alignment with a collagen bundle of a distal or proximal tendon section.

In one embodiment, the opposing tissue gripping pads define first and second needle guide channels that are in alignment with the first collagen bundle of the distal tendon section and third and fourth needle guide channels that are in alignment with the second collagen bundle of the distal tendon section.

In one embodiment, the first tissue gripping pad has teeth that project toward the opposing second tissue gripping pad, and the second tissue gripping pad has teeth that project toward the opposing first tissue gripping pad. In one embodiment, the teeth of the first tissue gripping pad are offset (i.e., not aligned with) from the teeth of the second tissue gripping pad.

In one embodiment, a method of repairing a tendon preferably includes obtaining a bidirectional barbed suture including a proximal section with proximal barbs that extend in a first direction and a proximal needle secured to a proximal end of the proximal section, a distal section with distal barbs that extend in a second direction that is opposite the first direction and a distal needle secured to a distal end of the distal section, and a stop located between the proximal and distal barbs.

In one embodiment, a method includes using the distal needle to take a first suture bite in a distal tendon section of a tendon and pulling the distal barbs in a distal direction through the distal tendon section until the stop abuts against a free end of the distal tendon section.

In one embodiment, a method includes using the proximal needle to take a first suture bite in a proximal tendon section of the tendon and pulling the proximal barbs in a proximal direction through the proximal tendon section until the stop abuts against a free end of the proximal tendon section that opposes the free end of the distal tendon section for approximating the opposing free ends of the distal and proximal tendon sections.

In one embodiment, a method includes using the distal needle to take a second suture bite in the distal tendon section that is located distal to the first suture bite in the distal tendon section.

In one embodiment, a method includes using the proximal needle to take a second suture bite in the proximal tendon section that is located proximal to the first suture bite in the proximal tendon section.

In one embodiment, the first suture bite in the distal tendon section is longer than the second suture bite in the distal tendon section, and the first suture bite in the proximal tendon section is longer than the second suture bite in the proximal tendon section.

In one embodiment, the first suture bites in the respective distal and proximal tendon sections have a length of about 7 mm, and the second suture bites in the respective distal and proximal tendon sections have a length of about 5 mm.

In one embodiment, a method includes obtaining a second bidirectional barbed suture including a proximal section with proximal barbs that extend in a first direction and a proximal needle secured to a proximal end of the proximal section, a distal section with distal barbs that extend in a second direction that is opposite the first direction and a distal needle secured to a distal end of the distal section, and a stop located between the proximal and distal barbs.

In one embodiment, a method includes using the distal needle of the second bidirectional barbed suture to take a first suture bite in the distal tendon section and pulling the distal barbs of the second bidirectional barbed suture in the distal direction through the distal tendon section until the stop of the second bidirectional barbed suture abuts against the free end of the distal tendon section.

In one embodiment, a method includes using the proximal needle of the second bidirectional barbed suture to take a first suture bite in the proximal tendon section and pulling the proximal barbs of the second bidirectional barbed suture in the proximal direction through the proximal tendon section until the stop of the second bidirectional barbed suture abuts against the free end of the proximal tendon section that opposes the free end of the distal tendon section for approximating the opposing free ends of the distal and proximal tendon sections.

In one embodiment, a method includes using the distal needle of the second bidirectional barbed suture to take a second suture bite in the distal tendon section that is located distal to the first suture bite of the second bidirectional barbed suture in the distal tendon section.

In one embodiment, a method includes using the proximal needle of the second bidirectional barbed suture to take a second suture bite in the proximal tendon section that is located proximal to the first suture bite of the second bidirectional barbed suture in the proximal tendon section.

In one embodiment, the first suture bite of the second bidirectional barbed suture in the distal tendon section is longer than the second tissue bite of the second bidirectional barbed suture in the distal tendon section.

In one embodiment, the first suture bite of the second bidirectional barbed suture in the proximal tendon section is longer than the second suture bite of the second bidirectional barbed suture in the proximal tendon section.

In one embodiment, the first suture bites of the second bidirectional barbed suture in the respective distal and proximal tendon sections have a length of about 7 mm, and the second suture bites of the second bidirectional barbed suture in the respective distal and proximal tendon sections have a length of about 5 mm.

In one embodiment, a method includes obtaining a third bidirectional barbed suture including a proximal section with proximal barbs that extend in a first direction and a proximal needle secured to a proximal end of the proximal section, a distal section with distal barbs that extend in a second direction that is opposite the first direction and a distal needle secured to a distal end of the distal section, and a stop located between the proximal and distal barbs.

In one embodiment, a method includes using the distal needle of the third bidirectional barbed suture to take a first suture bite in the distal tendon section of the tendon and pulling the distal barbs of the third bidirectional barbed suture in the distal direction through the distal tendon section until the stop of the third bidirectional barbed suture abuts against the free end of the distal tendon section.

In one embodiment, a method includes using the proximal needle of the third bidirectional barbed suture to take a first suture bite in the proximal tendon section of the tendon and pulling the proximal barbs of the third bidirectional barbed suture in the proximal direction through the proximal tendon section until the stop of the third bidirectional barbed suture abuts against the free end of the proximal tendon section that opposes the free end of the distal tendon section for approximating the opposing free ends of the distal and proximal tendon sections of the tendon.

In one embodiment, a method includes obtaining a fourth bidirectional barbed suture including a proximal section with proximal barbs that extend in a first direction and a proximal needle secured to a proximal end of the proximal section, a distal section with distal barbs that extend in a second direction that is opposite the first direction and a distal needle secured to a distal end of the distal section, and a stop located between the proximal and distal barbs.

In one embodiment, a method includes using the distal needle of the fourth bidirectional barbed suture to take a first suture bite in the distal tendon section of the tendon and pulling the distal barbs of the fourth bidirectional barbed suture in the distal direction through the distal tendon section until the stop of the fourth bidirectional barbed suture abuts against the free end of the distal tendon section.

In one embodiment, a method includes using the proximal needle of the fourth bidirectional barbed suture to take a first suture bite in the proximal tendon section of the tendon and pulling the proximal barbs of the fourth bidirectional barbed suture in the proximal direction through the proximal tendon section until the stop of the fourth bidirectional barbed suture abuts against the free end of the proximal tendon section that opposes the free end of the distal tendon section for approximating the opposing free ends of the distal and proximal tendon sections.

In one embodiment, a method includes placing an epitendinous whip stitch around a junction of the approximated opposing free ends of the distal and proximal tendon sections.

In one embodiment, a method includes placing a band of heat-shrink material around a junction of the approximated opposing free ends of the distal and proximal tendon sections.

In one embodiment, a repaired tendon has first and second collagen bundles that extend along a length of the tendon. In one embodiment, the first and second bidirectional barbed sutures extend linearly through the first collagen bundle of the repaired tendon and the third and fourth bidirectional barbed sutures extend linearly through the second collagen bundle of the repaired tendon.

In one embodiment, a repaired tendon preferably includes a proximal tendon section having a free end and distal tendon section having a free end that opposes the free end of the proximal tendon section.

In one embodiment, a repaired tendon has one or more bidirectional barbed sutures (e.g., four bidirectional barbed sutures) implanted in the repaired tendon for approximating the free end of the proximal tendon section with the free end of the distal tendon section.

In one embodiment, each of the one or more bidirectional barbed sutures includes a proximal section having proximal barbs that engage collagen bundles located within the proximal tendon section, a distal section having distal barbs that engage collagen bundles located within the distal tendon section, and a stop located between the proximal and distal barbs that engages the approximated free ends of the proximal and distal tendon sections.

In one embodiment, the proximal barbs extend in a first direction and the distal barbs extend in a second direction that is opposite the first direction.

In one embodiment, the repaired tendon has first and second collagen bundles that extend along a length of the repaired tendon.

In one embodiment, the four bidirectional barbed sutures extend linearly through the first and second collagen bundles of the repaired tendon.

In one embodiment, two of the four bidirectional barbed sutures extend linearly through the first collagen bundle and two of the four bidirectional barbed sutures extend linearly through the second collagen bundle.

In one embodiment, each of the proximal sections of the four bidirectional barbed sutures that engage collagen bundles within the proximal tendon section include a first suture bite in the proximal tendon section having a first length and a second suture bite in the proximal tendon section having a second length that is less than the first length.

In one embodiment, each of the distal sections of the four bidirectional barbed sutures that engage collagen bundles within the distal tendon section include a first suture bite in the distal tendon section having a first length and a second suture bite in the distal tendon section having a second length that is less than the first length.

In one embodiment, the first lengths of the first suture bites are about 7 mm and the second lengths of the second suture bites are about 5 mm.

These and other preferred embodiments of the present patent application will be described in more detail herein.

BRIEF DESCRIPTION OF THE DRAWINGS

FIG. 2A is a schematic view of the bidirectional barbed suture shown in FIG. 1A.

FIG. 2B is a top view of the bidirectional barbed suture shown in FIG. 1A.

FIG. 3A is a magnified view of a midsection of the bidirectional barbed suture shown in FIG. 2B.

FIG. 4 is a magnified view of a midsection of a bidirectional barbed suture, the midsection including a transition zone and a stop located in the transition zone, in accordance with one embodiment of the present patent application.

FIG. 7 is a side view of the distal end of the tissue clamp shown in FIGS. 5A and 5B.

FIG. 13A is a schematic view of a first stage of a method of repairing a tendon, in accordance with one embodiment of the present patent application.

FIG. 13B is a schematic view of a second stage of a method of repairing a tendon, in accordance with one embodiment of the present patent application.

FIG. 13C is a schematic view of a third stage of a method of repairing a tendon, in accordance with one embodiment of the present patent application.

FIG. 23 is a magnified view of a distal end of the tissue clamp shown in FIGS. 22A and 22B.

FIG. 26A is a side view of the opposing first and second tissue gripping pads shown in FIGS. 22A and 22B.

DETAILED DESCRIPTION OF PREFERRED EMBODIMENTS

Figure 1A:
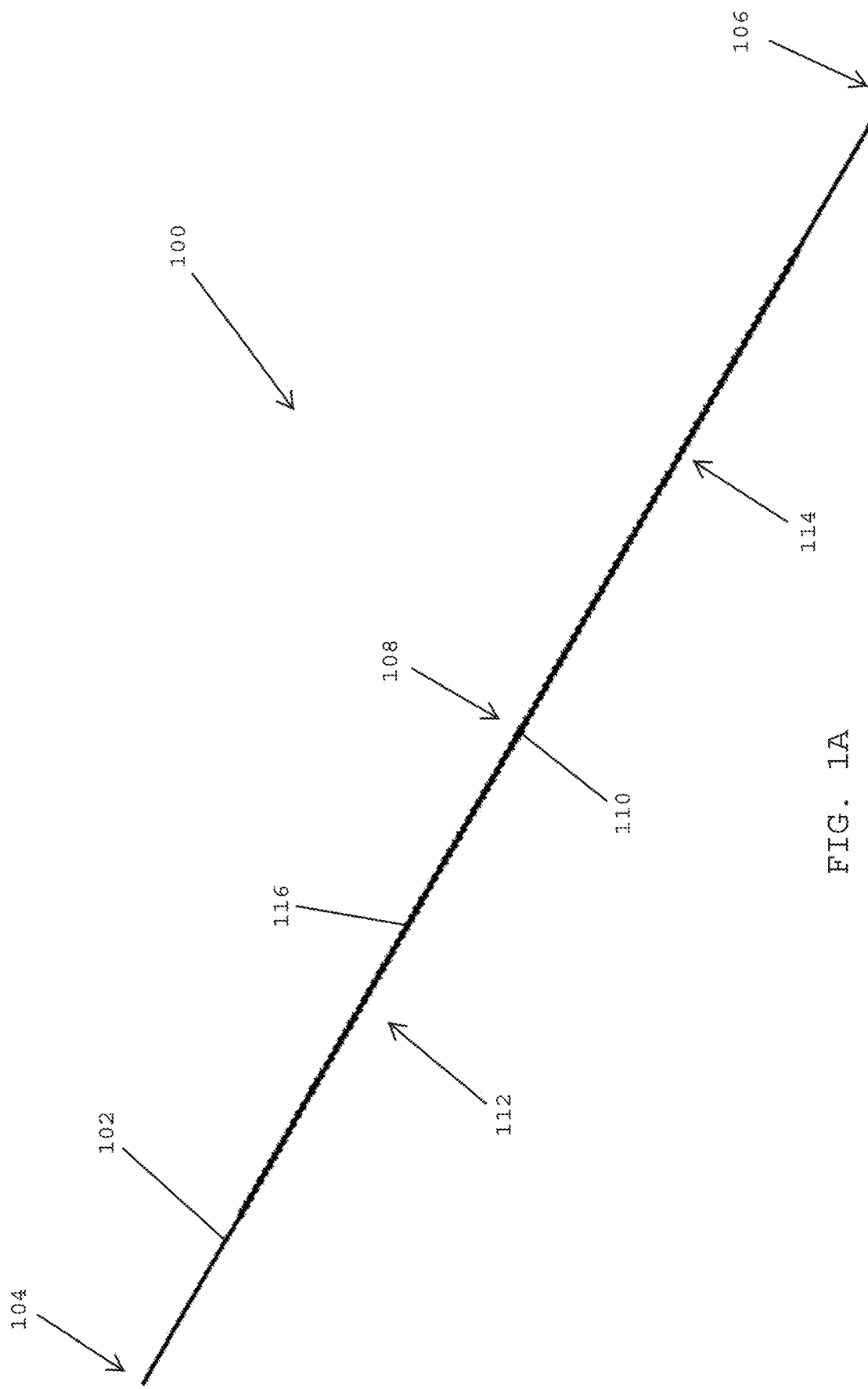
FIG. 1A is a perspective view of a bidirectional barbed suture used for repairing tendons and ligaments, in accordance with one embodiment of the present application.

Referring to FIG. 1A, in one embodiment, a bidirectional barbed suture 100 preferably includes a flexible, elongated core 102 having a proximal end 104 and a distal end 106. In one embodiment, the bidirectional barbed suture 100 preferably includes a transition zone 108 located at a midpoint of the elongated core, and a stop 110 located within the transition zone that divides the bidirectional barbed suture into a proximal section 112 that extends between the stop 110 and the proximal end 104 of the elongated core 102 and a distal section 114 that extends between the stop 110 and the distal end 106 of the elongated core 102.

In one embodiment, the bidirectional barbed suture 100 preferably includes barbs 116 that project outwardly from the elongated core 102. The barbs 116 change direction at the transition zone 108.

Figure 1B:
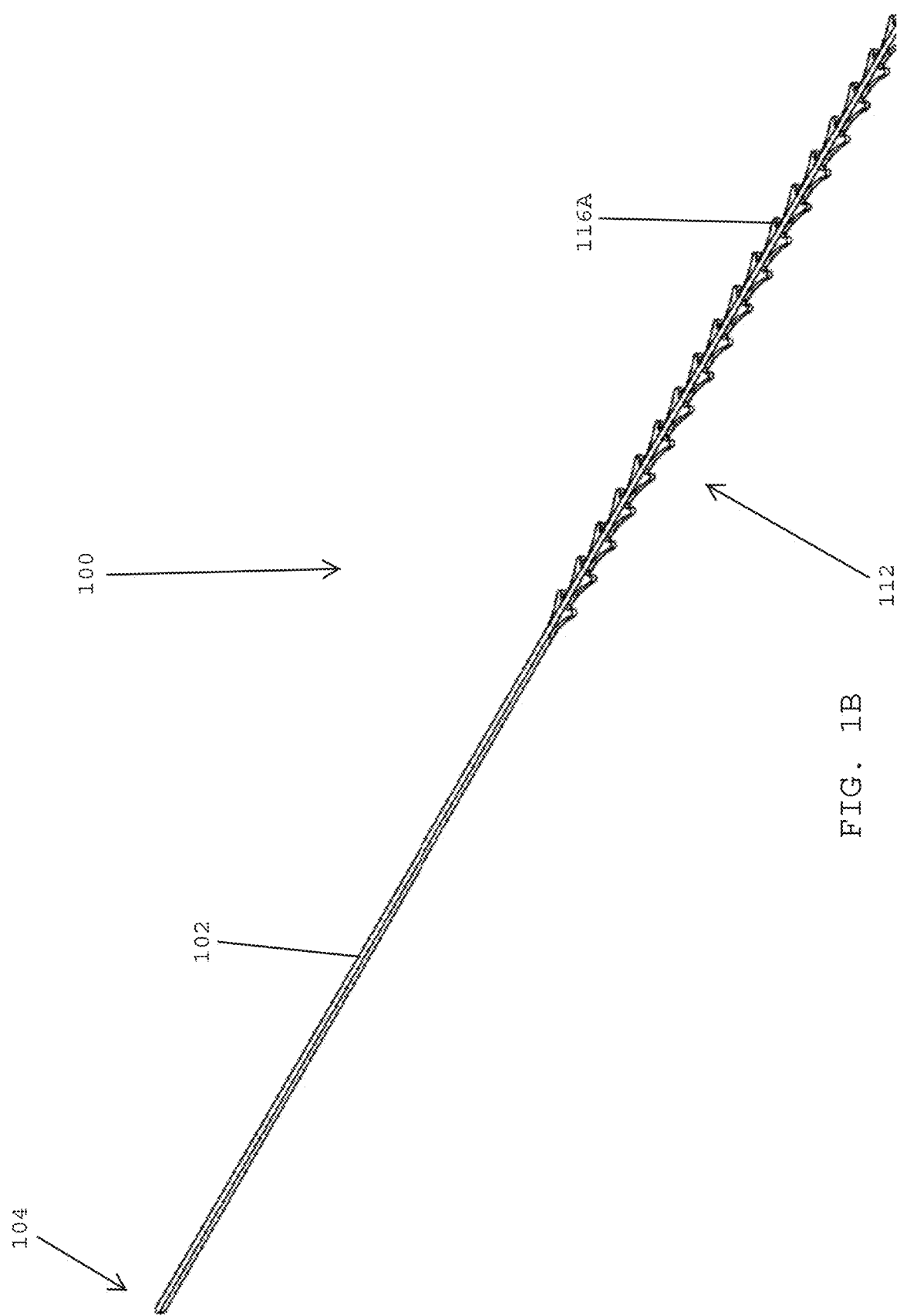
FIG. 1B shows a proximal end of the bidirectional barbed suture shown in FIG. 1A.
Figure 1C:
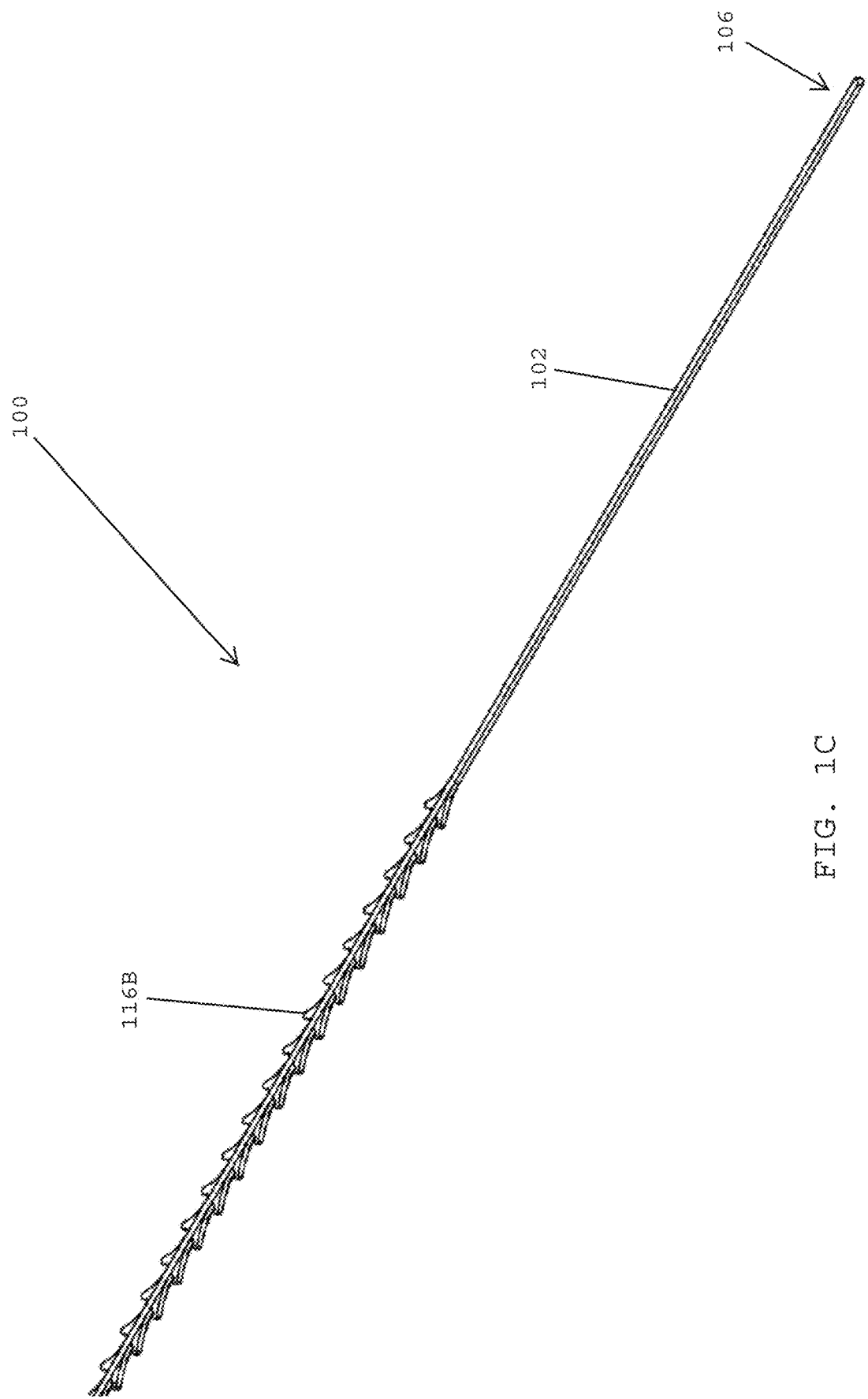
FIG. 1C shows a distal end of the b-directional barbed suture shown in FIG. 1A.

Referring to FIG. 1B, in one embodiment, the proximal section 112 of the bidirectional barbed suture 100 preferably includes the elongated core 102 that extends to the proximal end 104 thereof. The bidirectional barbed suture 100 preferably includes barbs 116A that project from opposite sides of the elongated core 102. The barbs 116A preferably extend away from the proximal end 104 and toward the distal end 106 (FIG. 1A) of the elongated core 102.

Figure 10A:
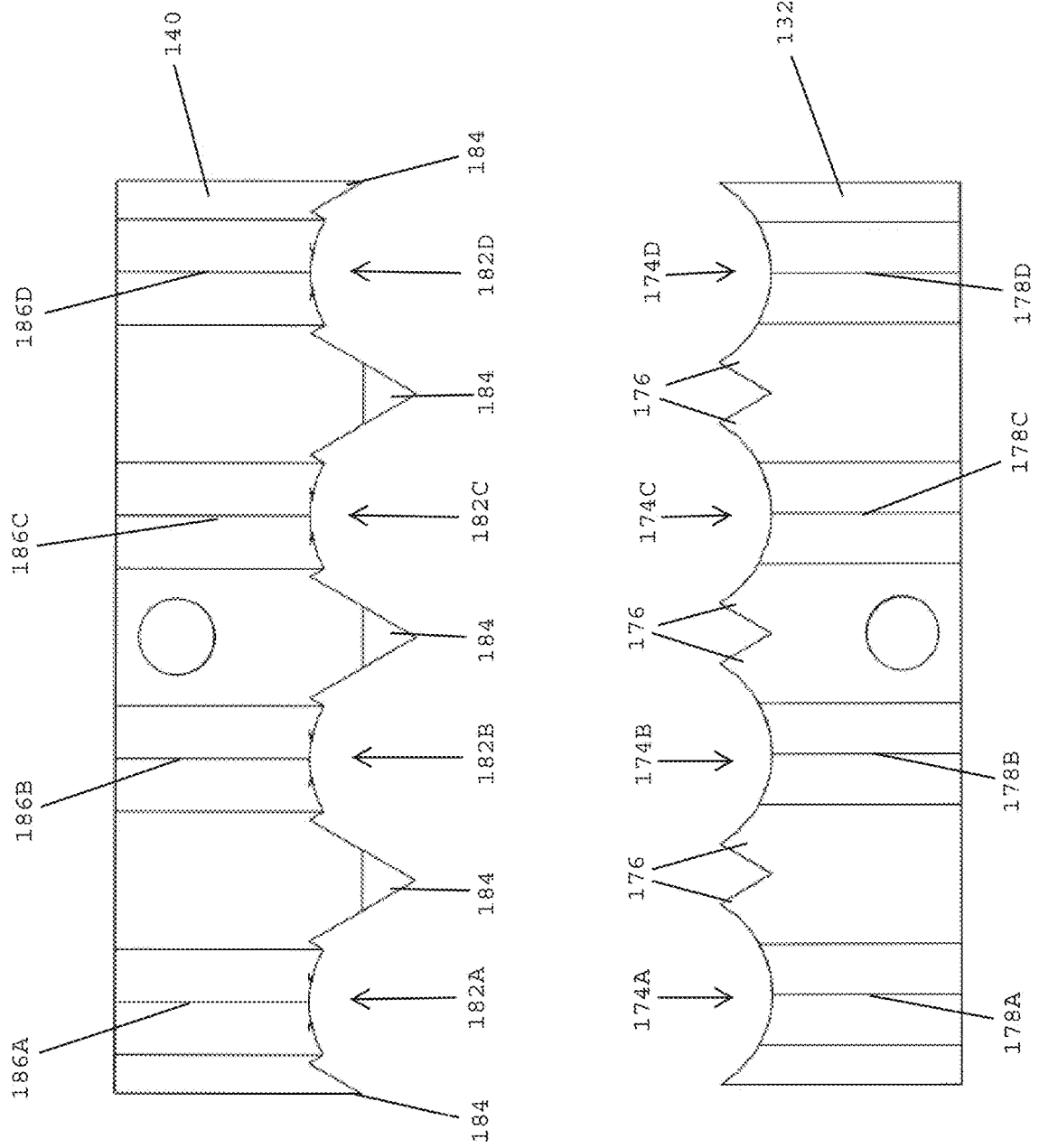
FIG. 10A shows the opposing first and second tissue gripping pads of the tissue clamp shown in FIGS. 5A and 5B, in accordance with one embodiment of the present patent application.
Figure 10B:
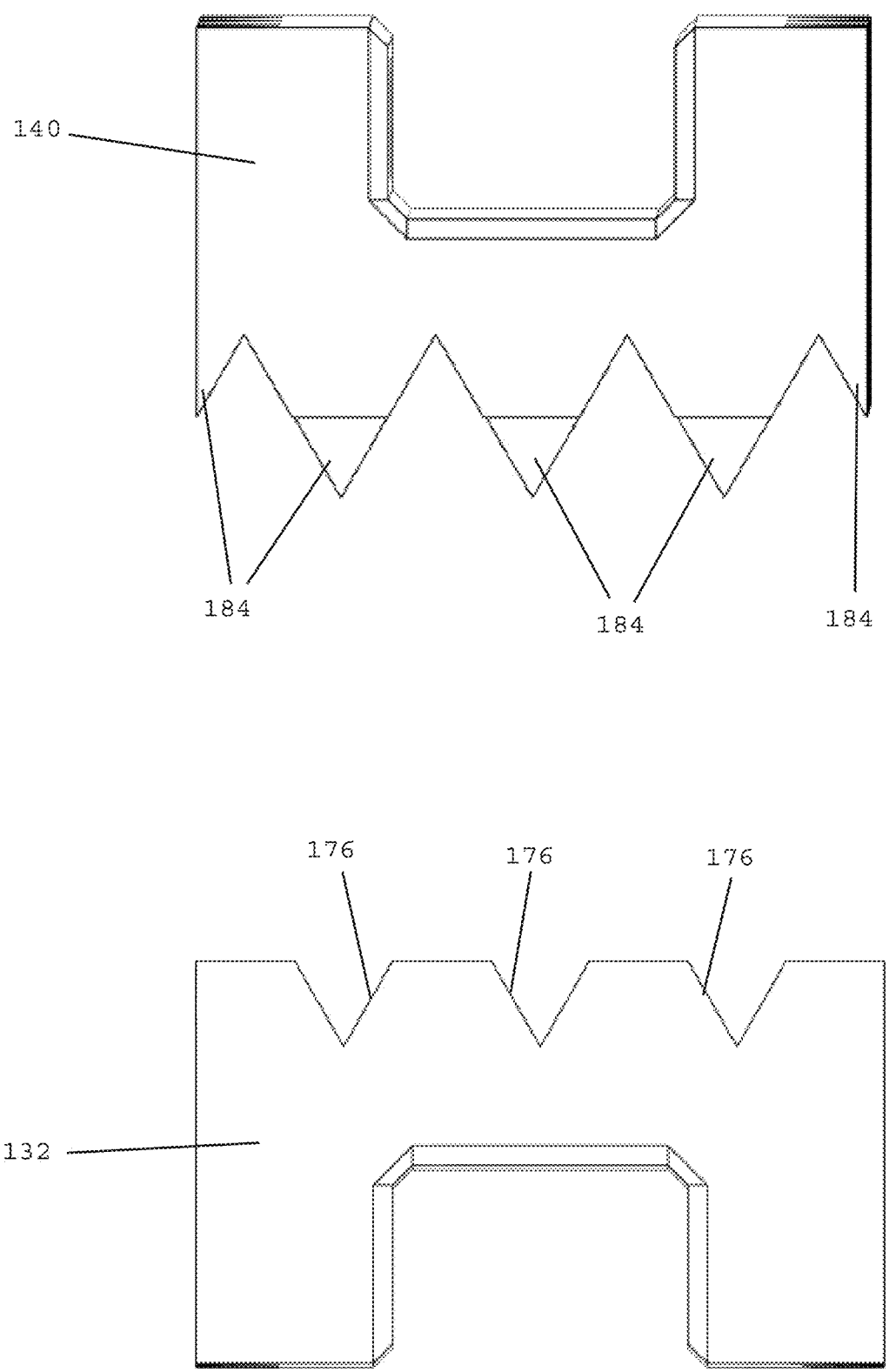
FIG. 10B shows a distal end view of the opposing first and second tissue gripping pads shown in FIG. 10A.

Referring to FIG. 10, in one embodiment, the distal section 114 of the bidirectional barbed suture 100 preferably includes the elongated core 102 that extends to the distal end 106 thereof. The distal section 114 preferably includes barbs 116B that project from opposite sides of the elongated core 102. The barbs 116B within the distal section 114 of the bidirectional barbed suture 100 preferably extend away from the distal end 106 and toward the proximal end 104 (FIG. 1A) of the elongated core 102.

In one embodiment, the barbs of the bidirectional barbed suture may have a barb geometry that is similar to that shown and described in U.S. Pat. No. 9,872,679, commonly assigned to Ethicon, Inc. of Somerville, New Jersey, the disclosure of which is hereby incorporated by reference herein.

In one embodiment, the bidirectional barbed sutures disclosed herein may be made of conventional, biocompatible, absorbable materials, non-absorbable materials, and combinations of absorbable and non-absorbable materials. Preferred non-absorbable materials suitable for both the barbed sutures include polypropylene, a polymer blend of polyvinylidene fluoride and polyvinylidene fluoride-co-hexafluoropropylene, polyethylene, polyvinylidene fluoride (PVDF), polyesters, polyethylene terephthalate, glycol-modified polyethylene terephthalate, polytetrafluoroethylene, fluoropolymers, nylons etc. and the like, or copolymers of combinations thereof. Preferred absorbable polymeric materials suitable for the barbed sutures include polydioxanone, polyglactin, polyglycolic acid, copolymers of glycolide and lactide, polyoxaesters, and poliglecaprone. In certain preferred embodiments, these may include combinations of both absorbable and non-absorbable materials. In addition, metals or ceramics may be suitable for certain applications, such as instances where specific strength or corrosion resistance is necessary. In one preferred embodiment, the barbed sutures preferably includes a polymer blend of polyvinylidene fluoride and polyvinylidene fluoride-co-hexafluoropropylene material. In one embodiment, the barbed sutures may have surface modifications that include coatings, plasma treatments, therapeutics, and the like.

Referring to FIG. 2A, in one embodiment, the bidirectional barbed suture 100 preferably includes the elongated core 102 that extends from the proximal end 104 to the distal end 106 of the bidirectional barbed suture 100. In one embodiment, the bidirectional barbed suture 100 preferably has a length $L_1$ of about 6-10 inches and more preferably about 8 inches.

Referring to FIG. 2B, in one embodiment, the bidirectional barbed suture 100 preferably includes the elongated core 102 that extends from the proximal end 104 to the distal end 106 thereof. The bidirectional barbed suture 100 preferably includes the transition zone 108 that is located midway between the proximal and distal ends 104, 106 of the elongated core 102. The bidirectional barbed suture 100 preferably includes the stop 110 that is located within the transition zone 108 and that preferably defines the midpoint of the bidirectional barbed suture 100.

In one embodiment, the bidirectional barbed suture 100 preferably includes the first barbs 116A that are located within the proximal section 112 of the barbed suture. The first barbs 116A extend between the stop 110 and the proximal end 104 of the elongated core 102. In one embodiment, the first barbs 116A do not extend entirely to the proximal end 104 of the elongated core 102. As a result, the elongated core 102 includes an unbarbed proximal section 118 that extends between the proximal barbs 116A and the proximal end 104 of the elongated core 102. In one embodiment, the unbarbed proximal section 118 preferably has a length $L_2$ of about 1 inch. In one embodiment, the series of barbs within the proximal section 112 preferably define a length $L_3$ of about 2.950 inches. In one embodiment, the transition zone 108 of the bidirectional barbed suture 100 preferably has a length $L_4$ of about 0.045 inches.

In one embodiment, the bidirectional barbed suture 100 preferably includes the second barbs 116B that are located within the distal section 114 of the barbed suture. The second barbs 116B extend between the stop 110 and the distal end 106 of the elongated core 102. In one embodiment, the second barbs 116B do not extend entirely to the distal end 106 of the elongated core 102. As a result, the elongated core 102 includes an unbarbed distal section 120 that extends between the distal barbs 116B and the distal end 106 of the elongated core 102. The distal section 114 has a length that is similar to the length $L_3$ of the proximal section 112, and the distal unbarbed section 120 has a length that is similar to the length $L_2$ of the proximal unbarbed section 118.

Figure 3B:
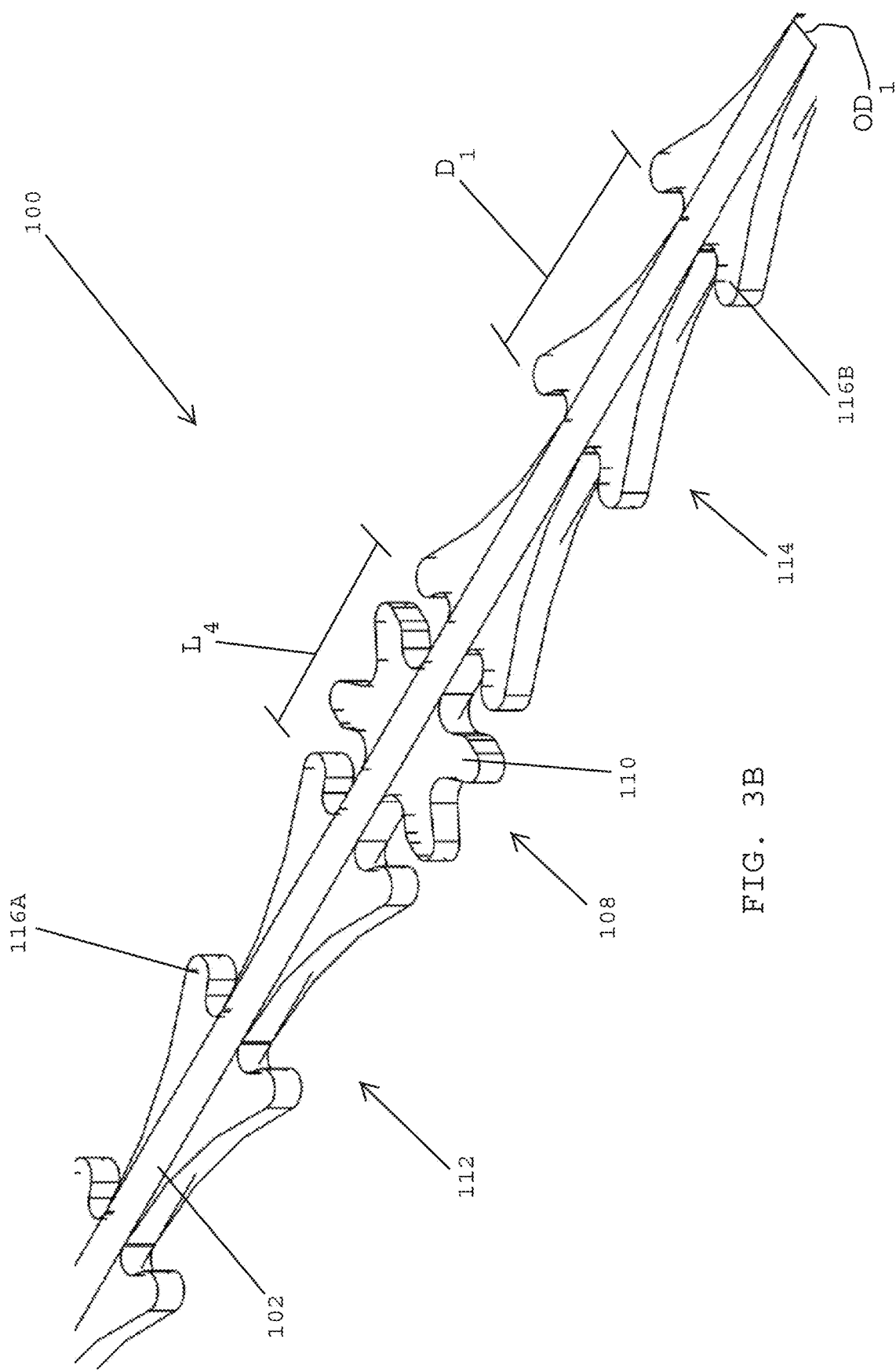
FIG. 3B is a perspective view of the midsection of the bidirectional barbed suture shown in FIG. 3A.

Referring to FIGS. 3A-3B and 4, in one embodiment, the bidirectional barbed suture 100 preferably includes the elongated core 102 that extends between proximal and distal ends of the bidirectional barbed suture. In one embodiment, the bidirectional barbed suture preferably includes the stop 110 that is located within the transition zone 108. The transition zone 108 preferably defines the region of the bidirectional barbed suture where the barbs 116A, 116B change direction. In one embodiment, the proximal barbs 116A located within the proximal section 112 extend toward the distal end of the elongated core 102. In one embodiment, the distal barbs 116B located within the distal section 114 preferably extend toward the proximal end of the elongated core 102. In one embodiment, the transition zone 108 preferably has a length $L_4$ of about 0.045 inches. In one embodiment, the spacing between adjacent barbs is designated $D_1$ and is preferably about 0.050 inches. In one embodiment, the elongated core 102 preferably has an outer diameter $OD_1$ of about 0.008 inches.

Figure 5A:
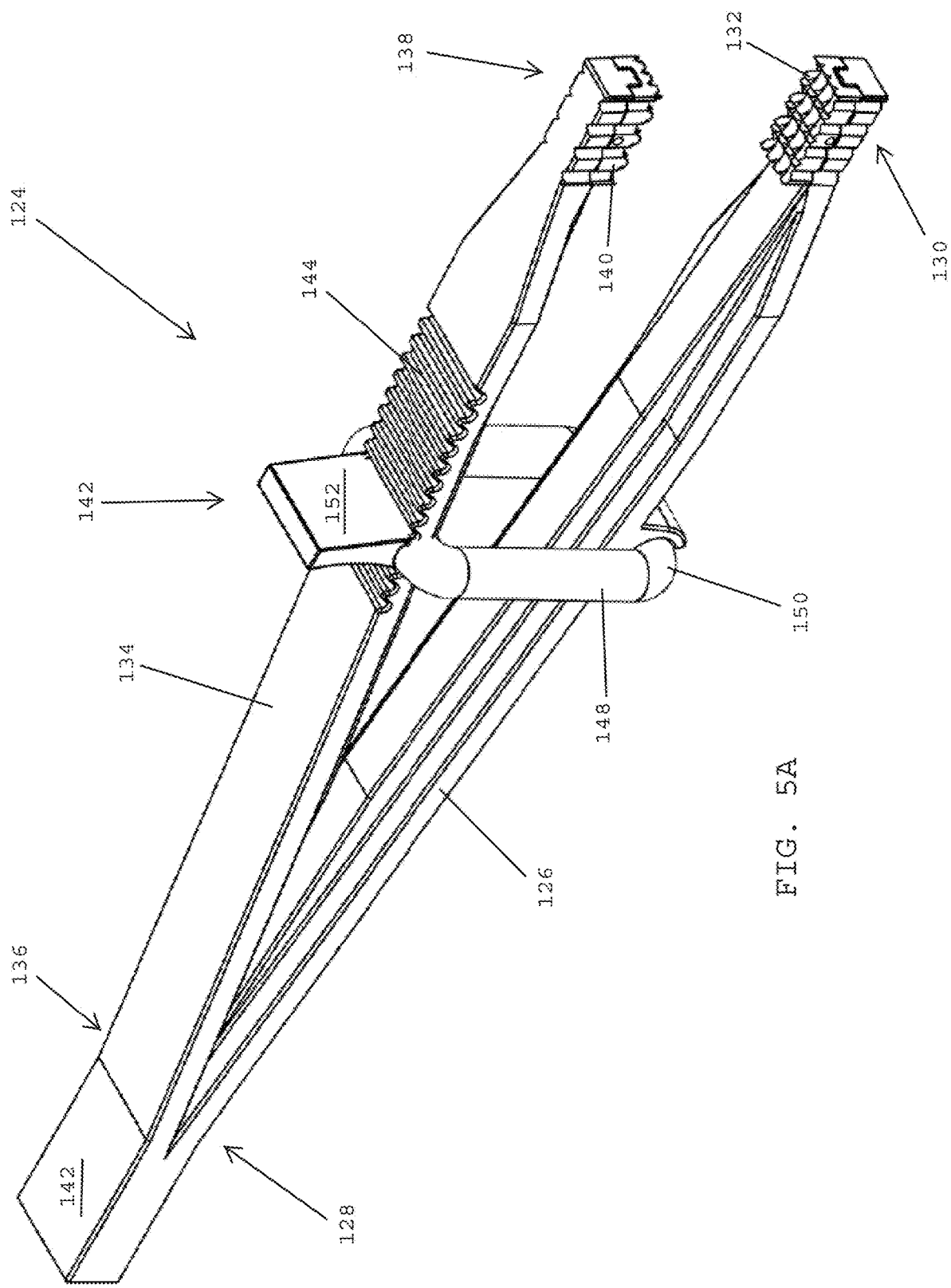
FIG. 5A is a perspective view of a tissue clamp used for repairing tendons and ligaments, the tissue clamp including a first clamping arm having a first tissue gripping pad and a second clamping arm having a second tissue gripping pad, the first and second tissue gripping pads opposing one another, in accordance with one embodiment of the present patent application.
Figure 5B:
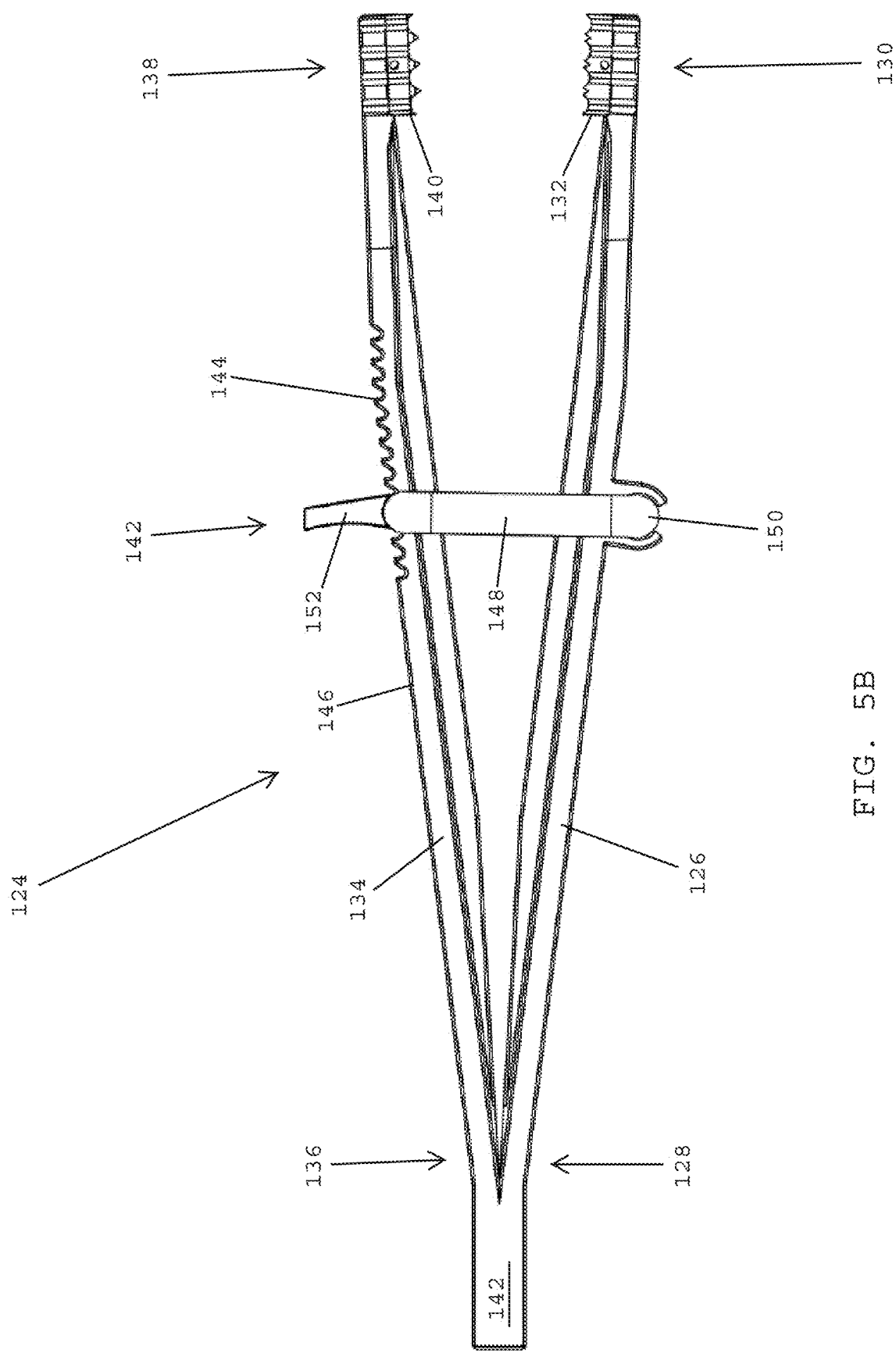
FIG. 5B is a side view of the tissue clamp shown in FIG. 5A, the tissue clamp including the first tissue gripping pad and the second tissue gripping pad.

Referring to FIGS. 5A and 5B, in one embodiment, a tissue clamp 124 is adapted to grasp a tendon or a ligament during a surgical repair procedure. In one embodiment, the tissue clamp 124 preferably includes a first clamping arm 126 having a proximal end 128 and a distal end 130. In one embodiment, the distal end 130 of the first clamping arm 126 is configured for securing a first tissue gripping pad 132, which is adapted to engage a tendon or a ligament.

In one embodiment, the tissue clamp 124 preferably includes a second clamping arm 134 having a proximal end 136 and a distal end 138 that is configured for securing a second tissue gripping pad 140. In one embodiment, the proximal ends 128, 136 of the respective first and second clamping arms 126, 134 are connected to a spring tension component 142 that provides spring tension at the proximal end of the tissue clamp 124 for ensuring that the distal ends of the first and second clamping arms 126, 134 are normally biased away from one another so that the tissue clamp is normally biased into the open position shown in FIGS. 5A and 5B.

In one embodiment, the tissue clamp operates like tweezers having a spring component for normally urging the arms of the tweezers into an open configuration. When the distal ends of the first and second clamping arms are compressed toward one another, the tissue clamp moves into a closed configuration. When the clamping force is removed, the distal ends of the first and second clamping arms move away from one another. In one embodiment, the distal ends 130, 138 of the respective first and second clamping arms 126, 134 may be pressed toward one another for overcoming the spring tension force provided by the spring tension component 142. When the pressing force is released, the spring tension component 142 will return the distal ends 130, 138 of the respective first and second clamping arms 126, 134 to the open position shown in FIGS. 5A and 5B.

In one embodiment, the tissue clamp 124 preferably includes a locking mechanism 142 that enables adjustable clamping pressure to be applied between the first and second tissue gripping pads 132, 140. In one embodiment, the locking mechanism 142 preferably includes ratchet teeth 144 that are provided on a top surface 146 of the second clamping arm 134. The locking mechanism 142 preferably includes a locking lever 148 having a lower end 150 that is coupled with the first clamping arm 126 and an upper end 152 that is adapted to engage the ratchet teeth 144 for adjusting the amount of clamping force that may be applied between the distal ends of the first and second clamping arms and the first and second tissue gripping pads 132, 140.

Figure 6:
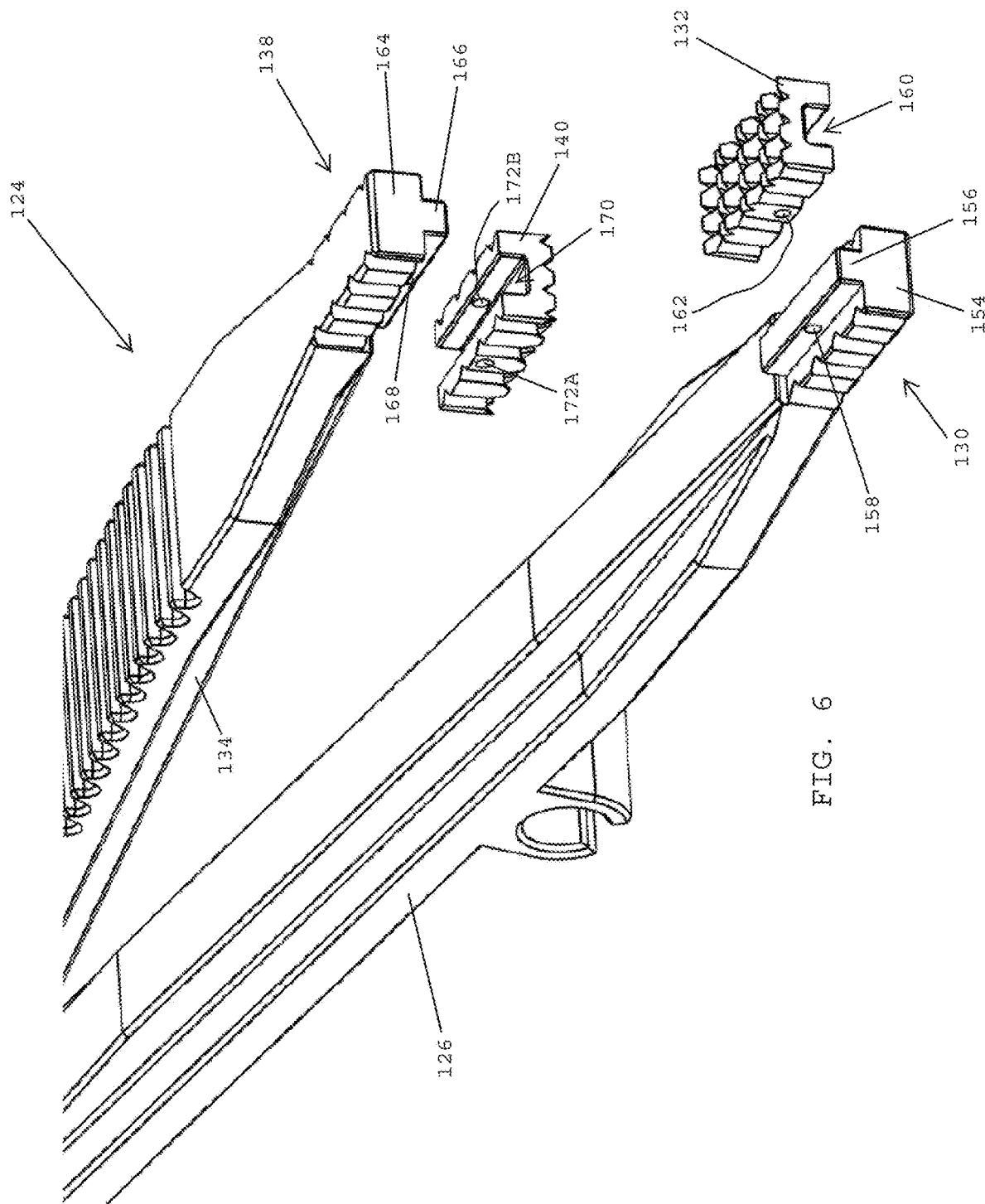
FIG. 6 is an exploded view of a distal end of the tissue clamp shown in FIGS. 5A and 5B.

Referring to FIG. 6, in one embodiment, the distal end 130 of the first clamping arm 126 preferably includes a first tissue gripping pad mounting base 154 that is configured to secure the first tissue gripping pad 132 to the distal end 130 of the first clamping arm 126. In one embodiment, the first tissue gripping pad mounting base 154 preferably includes a first alignment flange 156 that preferably extends along the longitudinal axis of the first clamping arm 126. In one embodiment, the first alignment flange 156 preferably includes a laterally extending pinhole 158 that is adapted to receive a pin for securing an underside of the first tissue gripping pad 132 to the first alignment flange 156. In one embodiment, the first tissue gripping pad 132 preferably has a U-shaped channel 160 that extends along an underside thereof that is adapted to receive the first alignment flange 156 of the first tissue gripping pad mounting base 154 for mounting the first tissue gripping pad 132 to the distal end 130 of the first clamping arm 126. The side walls of the first tissue gripping pad 132 preferably include aligned pinholes 162 that are preferably aligned with the pinhole 158 extending laterally though the first alignment flange 156. A pin (not shown) may be passed through the aligned pinholes 158, 162 for securing the first tissue gripping pad 132 onto the first tissue gripping pad mounting base 154 at the distal end 130 of the first clamping arm 126.

In one embodiment, the tissue clamp 124 preferably includes the second clamping arm 134 having the distal end 138. In one embodiment, the distal end 138 of the second clamping arm 134 preferably includes a second tissue gripping pad mounting base 164 that is adapted to secure the second tissue gripping pad 140 to the distal end 138 of the second clamping arm 134. In one embodiment, the second tissue gripping pad mounting base 164 preferably includes a second alignment flange 166 having a laterally extending pinhole 168 that is adapted to receive a pin (not shown) for securing the second tissue gripping pad 140 to the second alignment flange 166 of the second tissue gripping pad mounting base 164.

In one embodiment, the second tissue gripping pad 140 preferably includes a U-shaped channel 170 that is adapted to receive the second alignment flange 166 for mounting the second tissue gripping pad 140 to the distal end 138 of the second clamping arm 134. In one embodiment, the second tissue gripping pad 140 preferably includes pinhole openings 172A, 172B that are adapted to receive a pin for securing the second tissue gripping pad 140 to the second alignment flange 166 of the second tissue gripping pad mounting base 164. In one embodiment, after the U-shaped channel 170 of the second tissue gripping pad 140 is positioned over the second alignment flange 166, a pin may be passed through the aligned pinhole openings 172A, 172B and 168 for securing the second tissue gripping pad 140 to the second tissue gripping pad mounting base 164.

Referring to FIG. 7, in one embodiment, the first tissue gripping pad 132 is preferably secured to the first tissue gripping pad mounting base 154 that is located at the distal end 130 of the first clamping arm 126. A pin is passed through the aligned openings 158, 162 of the first alignment flange 156 (FIG. 6) and the first tissue gripping pad 132 for securing the first tissue gripping pad 132 to the first tissue gripping pad mounting base 154.

In one embodiment, the second tissue gripping pad 140 is secured to the second tissue gripping pad mounting base 164 located at the distal end 138 of the second clamping arm 134. A pin may be passed through the aligned openings 168, 172 formed in the second alignment flange 166 (FIG. 6) and the sidewalls of the second tissue gripping pad 140 for securing the second tissue gripping pad to the second tissue gripping pad mounting base 164 of the tissue clamp 124.

The first and second tissue gripping pads 132, 140 preferably oppose one another at the distal end of the tissue clamp. As will be described in more detail herein, the opposing tissue gripping pads have opposing teeth that are adapted to engage an outer surface of a tendon that is under repair. The opposing teeth are not in alignment with one another to create a bed of nails configuration that minimizes the likelihood of the tendon being damaged when a clamping force is applied to the tendon.

Figure 8:
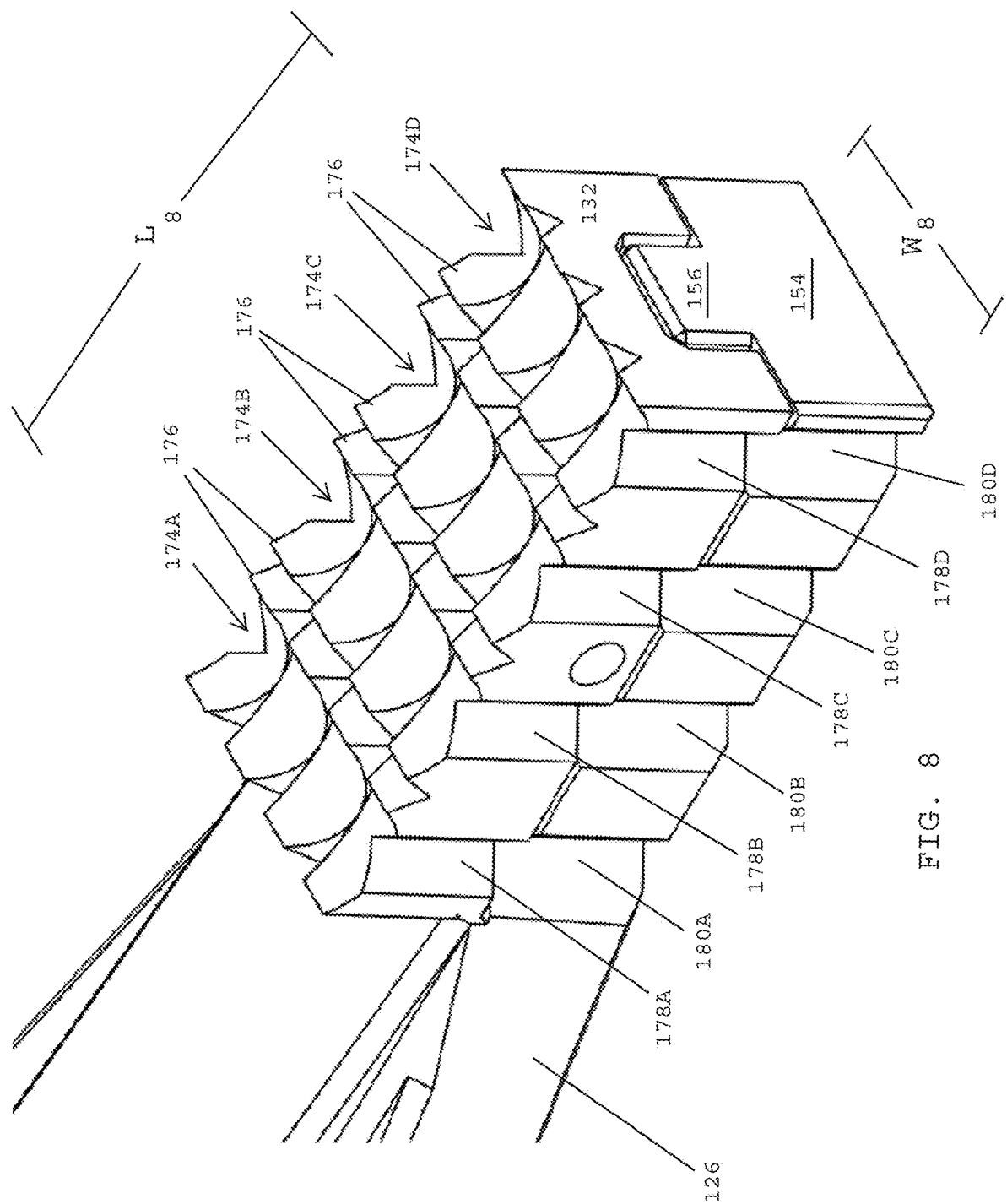
FIG. 8 is a magnified view of the first tissue gripping pad shown in FIGS. 5A and 5B.

Referring to FIG. 8, in one embodiment, the first tissue gripping pad 132 is preferably secured atop the first alignment flange 156 of the first tissue gripping pad mounting base 154. The first tissue gripping pad 132 preferably has a length $L_8$ that extends along the longitudinal axis of the first clamping arm 126 and a width $W_8$ that extends between lateral sides of the first tissue gripping pad 132 (i.e., perpendicular to the longitudinal axis of the first clamping arm). In one embodiment, the first tissue gripping pad 132 preferably includes a top surface having a series of laterally extending needle guide channels 174A-174D that are located between the proximal and distal ends of the first tissue gripping pad 132. The four needle guide channels 174A-174D preferably extend in lateral directions that are perpendicular to the length $L_8$ of the first tissue gripping pad 132. In one embodiment, the first tissue gripping pad 132 preferably includes a plurality of spaced teeth 176 that project from the upper face of the first tissue gripping pad. The teeth 176 desirably extend between the respective needle guide channels 174A-174D.

In one embodiment, the first tissue gripping pad 132 preferably includes lateral grooves 178A-178D that are preferably in alignment with the respective needle guide channels 174A-174D for providing a visual indication of the location of the needle guide channels 174A-174D when the tissue clamp is closed on a tendon. In one embodiment, a distal end of a suture needle is preferably aligned with one of the side grooves 178A-178D for passing the needle through one of the needle guide channels 174-174D. The suture needle is preferably utilized for passing an end of the bidirectional barbed sutures shown and described above in FIGS. 1A-1B through a tendon during a tendon repair procedure. The needle guide channels 174A-174D preferably guide the distal end of the suture needle into a particular location of a tendon (e.g., a collagen band) that will maximize the strength of a tendon repair.

In one embodiment, a sidewall of the first tissue gripping pad mounting base 154 preferably includes side grooves 180A-180D that are preferably aligned with the respective side grooves 178A-178D formed in the first tissue gripping pad 132 to provide additional visual indicators of the location of the needle guide channels 174A-174D.

Figure 9:
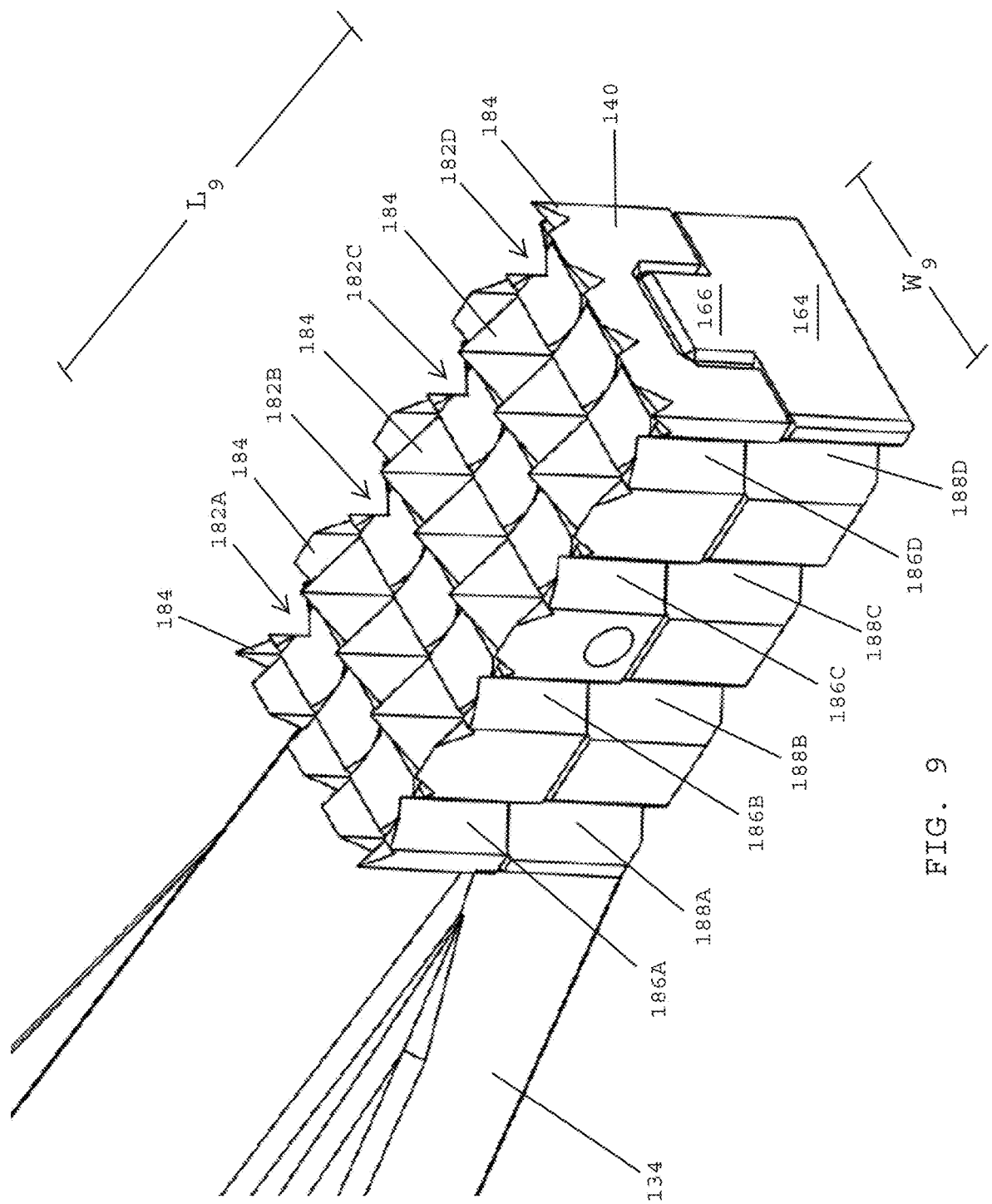
FIG. 9 is a magnified view of the second tissue gripping pad shown in FIGS. 5A and 5B.

Referring to FIG. 9, in one embodiment, the second tissue gripping pad 140 is preferably mounted onto the second alignment flange 166 of the second tissue gripping pad mounting base 164. The second tissue gripping pad 140 preferably has a length $L_9$ that extends along the longitudinal axis of the second clamping arm 134 and a width $W_9$ that extends between the lateral sides of the second tissue gripping pad 140. In one embodiment, the second tissue gripping pad 140 preferably includes a bottom surface having a series of laterally extending needle guide channels 182A-182D that extend between the lateral sides of the second tissue gripping pad 140 and along respective axes that are substantially perpendicular to the longitudinal axis of the second clamping arm 134. In one embodiment, the second tissue gripping pad 140 preferably includes teeth 184 that project from the bottom surface of the second tissue gripping pad and that are located between the four laterally extending needle guide channels 182A-182D. In one embodiment, a lateral side of the second tissue gripping pad 140 preferably includes a series of side grooves 186A-186D that are aligned with the laterally extending needle guide channels 182A-182D for providing a visual indication of the location of the laterally extending needle guide channels 182A-182D. In one embodiment, a sidewall of the second tissue gripping pad mounting base 164 includes side grooves 188A-188D that are in alignment with the respective side grooves 186A-186D of the second tissue gripping pad 140 to provide additional visual indicators of the location of the needle guide channels 182A-182D.

Referring to FIG. 10A, in one embodiment, the upper surface of the first tissue gripping pad 132 preferably opposes the bottom surface of the second tissue gripping pad 140. The top surface of the first tissue gripping pad 132 preferably includes the four laterally extending needle guide channels 174A-174D that oppose the bottom surface of the second tissue gripping pad 140.

In one embodiment, the bottom surface of the second tissue gripping pad 140 preferably includes the laterally extending needle guide channels 182A-182D that preferably oppose the top surface of the first tissue gripping pad 132.

In one embodiment, the peaks of the teeth 176 projecting from the upper surface of the first tissue gripping pad 132 are preferably offset from the peaks of the teeth 184 projecting from the bottom surface of the second tissue gripping pad 140.

Although the present patent application is not limited by any particular theory of operation, offsetting the peaks of the opposing teeth from one another preferably generates a bed of nails clamping configuration that minimizes the amount of clamping force that is applied to any one location of a tendon, which dramatically minimizes the likelihood of tissue damage.

In one embodiment, a sidewall of the first tissue gripping pad 132 preferably includes side grooves 178A-178D that are preferably aligned with the respective laterally extending needle guide channels 174A-174D for providing a visual indication of the location of the needle guide channels 174A-174D when the tissue clamp is closed on a tendon. In one embodiment, the side grooves 178A-178D and the needle guide channels 174A-174D may serve as visual alignment tools that help surgeons to locate the collagen bands that are within a tendon, and to aid the surgeons in positioning the bidirectional barbed sutures within the collagen bands of the tendon during a tendon repair procedure.

In one embodiment, the second tissue gripping pad 140 preferably has a sidewall having side grooves 186A-186D formed therein that are in alignment with the laterally extending needle guide channels 182A-182D of the second tissue gripping pad 140 for providing a visual indication of the location of the laterally extending needle guide channels 182A-182D when the tissue clamp is closed on a tendon. In one embodiment, the side grooves 186A-186D and the needle guide channels 182A-182D may serve as visual alignment tools that help surgeons to locate the collagen bands that are within a tendon, and to aid the surgeons in positioning the bidirectional barbed sutures within the collagen bands of the tendon during a tendon repair procedure.

During a tendon repair procedure, the tissue clamp 124 (FIG. 5A) may be moved into a closed configuration whereupon the opposing faces of the first and second tissue gripping pads 132, 140 engage and/or clamp onto an outer surface of a tendon for grasping the tendon. The opposing teeth 176, 184 preferably engage an outer surface of the tendon for grasping the tendon. The opposing teeth are offset from one another to minimize damage to the tendon when the tendon is under clamping force. The offset teeth 176, 184 preferably form a bed of nails gripping structure that minimizes the amount of clamping force that is applied to any particular area of the tendon, which will minimize the likelihood of tissue damage to the tendon.

Figure 11:
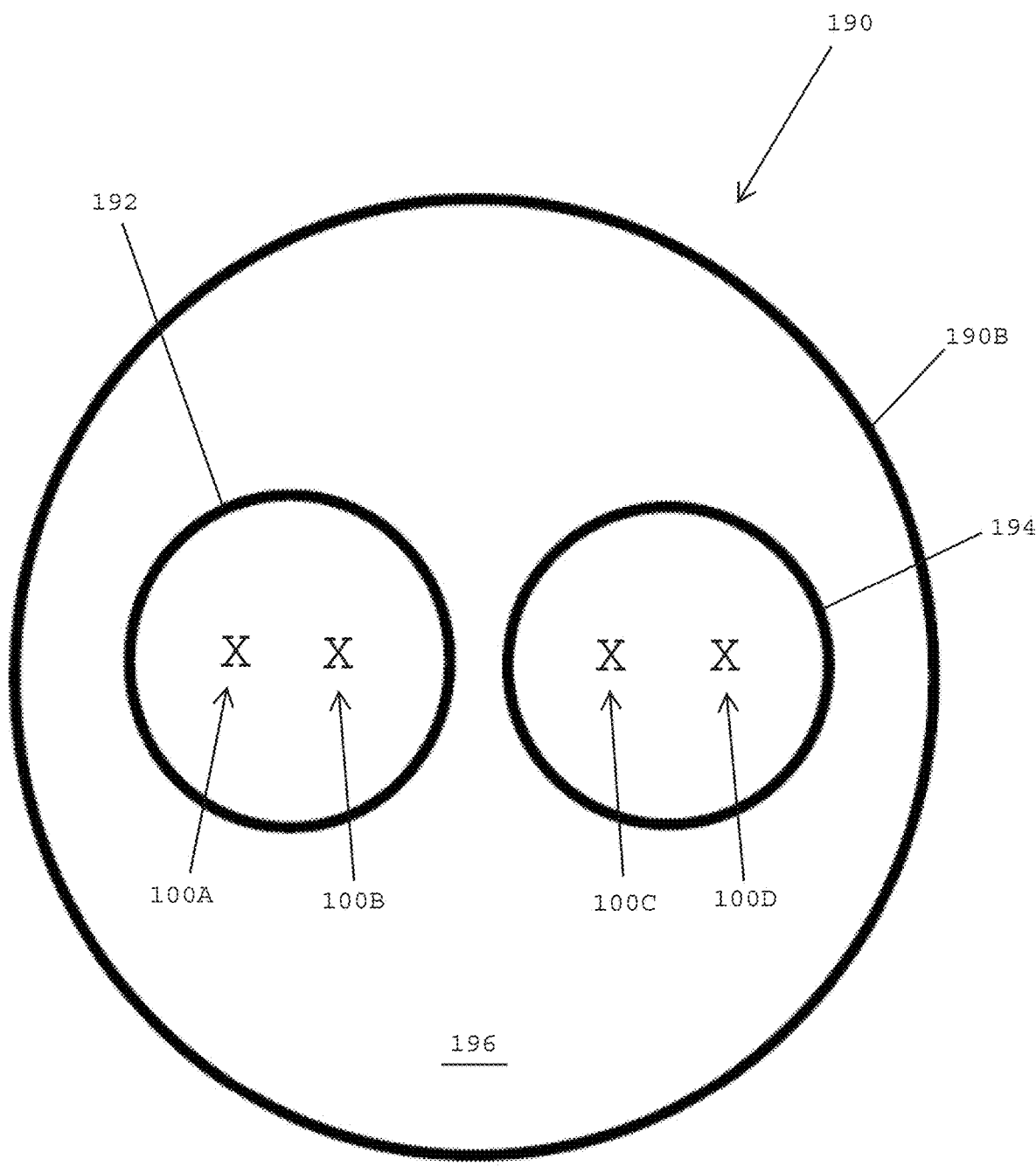
FIG. 11 shows a cross-sectional view of a distal section of a tendon that is undergoing surgical repair, in accordance with one embodiment of the present patent application.
Figure 12A:
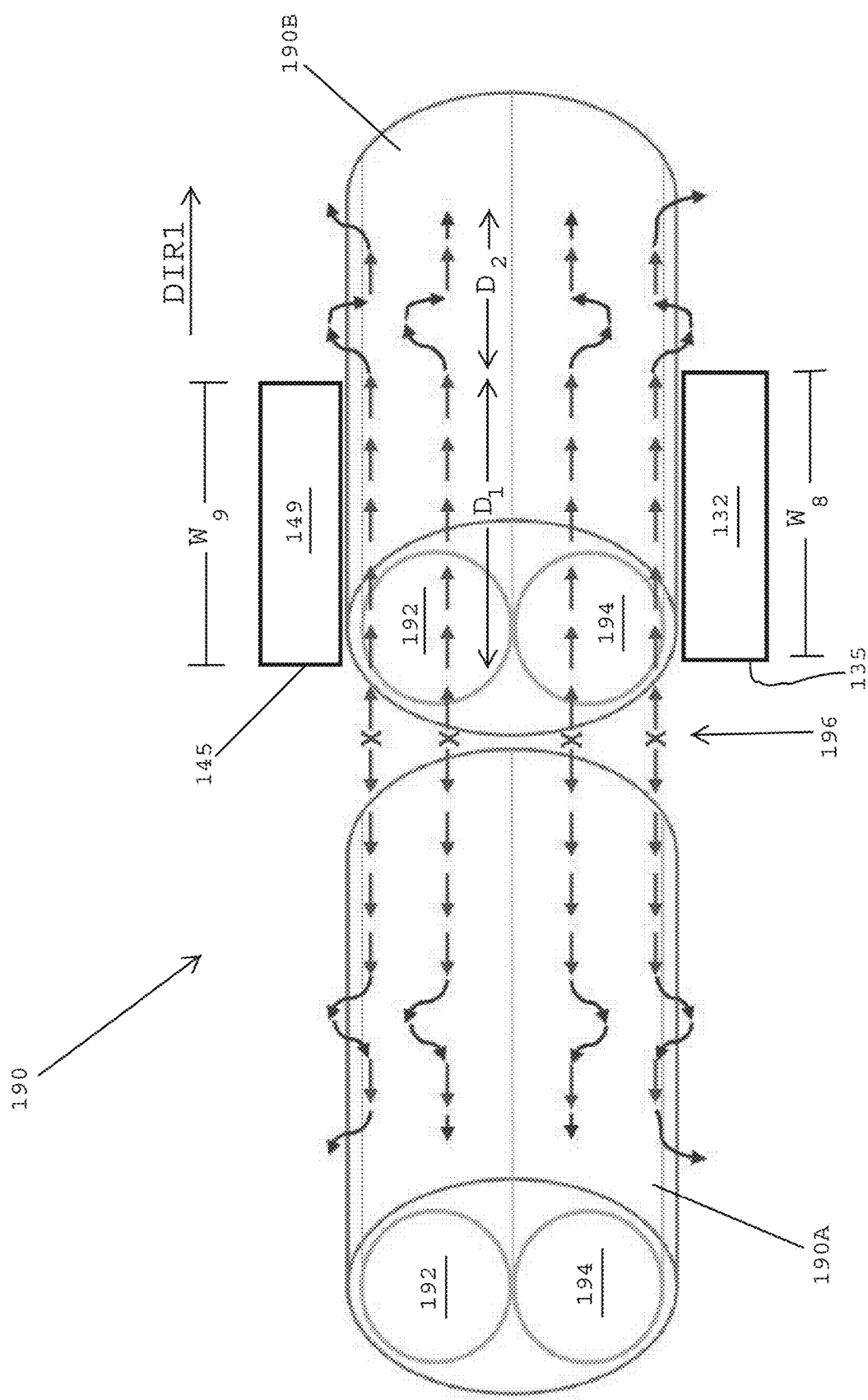
FIG. 12A shows a first stage of a tendon repair procedure, in accordance with one embodiment of the present patent application.

Referring to FIGS. 11 and 12A, in one embodiment, a damaged tendon 190 may include a proximal tendon section 190A and a distal tendon section 190B that are rejoined during a tendon repair procedure. In one embodiment, a surgical procedure may include clean cutting the opposing edges of the proximal and distal tendon sections 190A, 190B to prepare the opposing ends for being sutured together. For example, an end of a proximal tendon section may have a jagged edge and the clean cut can remove the jagged edge so that the clean cut end of the proximal tendon section may be rejoined with an end face of a distal tendon section.

In one embodiment, the tendon 190 preferably includes a first collagen bundle 192 and a second collagen bundle 194 that extend along the length of the tendon. The first and second collagen bundles preferably extend through the proximal and distal tendon sections 190A, 190B. In one embodiment, in order to reconnect the proximal and distal tendon sections, first and second bidirectional barbed sutures 100A, 100B may be implanted into the first collagen bundle 192 and second and third bidirectional barbed sutures 100C, 100D may be implanted into the second collagen bundle 194.

Referring to FIG. 12A, in one embodiment, after the opposing ends of the damaged tendon 190 have been clean cut, the proximal end 196 of the distal tendon section 190B is preferably gripped and/or clamped between the opposing teeth of the respective first and second gripper bases 132, 140 (FIG. 10A). In one embodiment, the lateral sidewalls 135, 145 of the respective first and second gripper bases 132, 140 are preferably positioned adjacent the clean cut proximal end 196 of the distal tendon section 190B.

In one embodiment, the first tissue gripping pad 132 preferably was a width $W_8$ of about 4-7 millimeters and more preferably about 6 millimeters. In one embodiment, the second tissue gripping pad 140 preferably has a width $W_9$ of about 4-7 millimeters and more preferably about 6 millimeters.

In one embodiment, a first or distal needle (e.g., a blunt needle) may be secured to the distal end 106 of the first bidirectional barbed suture 100A. The distal end of the distal needle is passed through the first collagen bundle 192 and advanced through the first collagen bundle 192 in the distal direction DIR1 for a tissue bite of about 7 mm (shown in red). The first bidirectional barbed suture 100A is then pulled out of a sidewall of the distal tendon section 190B (shown in black) and tension is applied on the first bidirectional; barbed suture 100A until the suture stop 110 (FIG. 4) abuts against the clean cut proximal end face at the proximal end 196 of the distal tendon section 190B. After tension has been applied for pulling the stop against the proximal face of the distal tendon section 190B, the first bidirectional barbed suture 100A is then reinserted back into the distal tendon section and a second bite (shown in red) having a length of about 5 mm is attained. After the second bite of 5 mm, the first suture needle is removed from the tendon via a sidewall of the distal tendon section 190B (shown in black).

While the distal tendon section 190B remains gripped and/or clamped between the first and second tissue gripping pads 132, 140, a second bidirectional barbed suture 100B is passed through the first collagen bundle 192, using similar steps as described above for the first bidirectional barbed suture 100A.

In one embodiment, third and fourth bidirectional barbed sutures 100C, 100D are passed through the second collagen bundle 194, using similar steps as described above for the first and second bidirectional barbed sutures 100A, 100D.

In one embodiment, after the distal ends of the bidirectional barbed sutures 100A-100D have been passed through the first and second collagen bundles 192, 194 of the distal tendon section 190B, the proximal ends of the respective bidirectional barbed sutures 100A-100D may be passed through the first and second collagen bundles in the proximal tendon section 190A. The first and second tissue gripping pads 132, 140 preferably grip and/or clamp onto the distal end of the proximal tendon section 170. Needles are desirably used for directing the proximal ends of the respective bidirectional barbed sutures 100A-100D through the first and second collagen bundles 192, 194 of the proximal tendon section 190A.

Figure 12B:
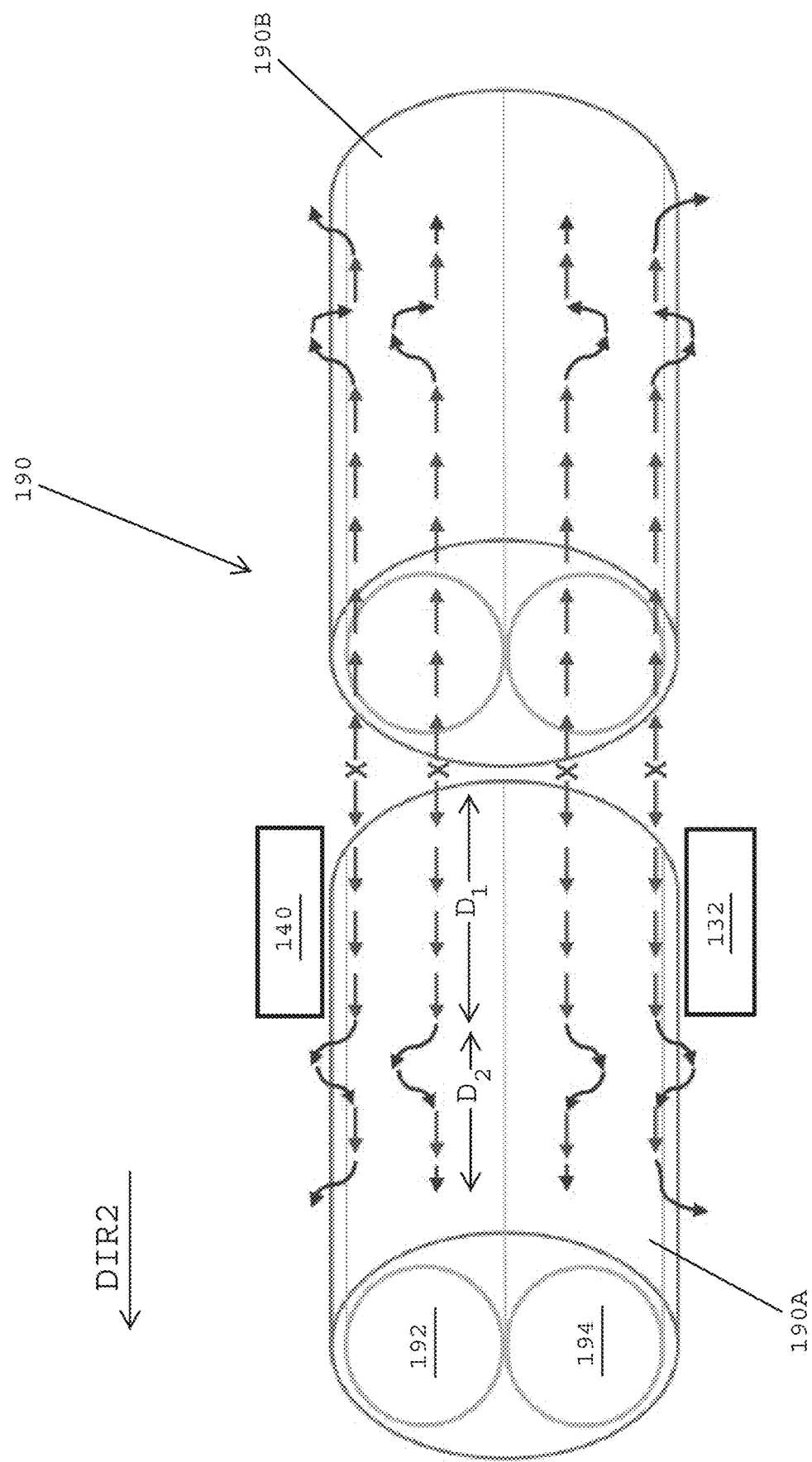
FIG. 12B shows a second stage of a tendon repair procedure, in accordance with one embodiment of the present patent application.

Referring to FIG. 12B, in one embodiment, after the distal ends of the four bidirectional barbed sutures 100A-100D have been passed through the first and second collagen bundles of the distal tendon section 190B, the proximal ends of the four respective bidirectional barbed sutures may be passed through the first and second collagen bundles that are located in the proximal tendon section 190A. In one embodiment, the proximal ends of the first and second bidirectional barbed sutures 100A, 100B are passed through the first collagen bundle 192 of the proximal tendon section 190A. The proximal ends of the third and fourth bidirectional barbed sutures 100C, 100D are preferably passed through the second collagen bundle 194 of the proximal tendon section 190A. In one embodiment, first bites of about 7 millimeters (shown in red) are attained and then the respective bidirectional barbed sutures are pulled out of a sidewall (shown in black) of the proximal tendon section 190A. Tension is applied to the proximal ends of the respective bidirectional barbed sutures for minimizing the distance between the opposing cut edges of the proximal and distal tendon sections 190A, 190B. After the opposing cut surfaces have been juxtaposed with one another, the suture needles are then passed back into the proximal tendon section 190A to attain a second tissue bite (shown in red) having a length of about 5 mm. After the second 5 mm bite, the proximal ends of the bidirectional barbed sutures (shown in black) are removed from the sidewall of the proximal tendon section 190A.

Referring to FIG. 13A, in one embodiment, a proximal end 196 of a distal tendon section 190B has a clean cut end face 197. A first or distal needle (not shown) is secured to a distal end of a first bidirectional barbed suture 100A.

Referring to FIGS. 13A and 13B, in one embodiment, the distal needle pulls the distal section 114 of the first bidirectional barbed suture 100A through the first collagen bundle 192 (FIG. 12A) of the distal tendon section 190B. As described above, a first tissue bite of about 7 mm is achieved. After the 7 mm first bite, the distal needle may be pulled out of the tendon for applying tension onto the distal section 114 of the first bidirectional barbed suture 100A, which pulls the distal section 114 in the distal direction DIR1 until the stop 110 abuts against the end face 197 at the proximal end 196 of the distal tendon section 190B. The distal needle may then be used to perform the second 5 mm tissue bite to further anchor the distal section 114 of the first bidirectional barbed suture 100A within the first collagen bundle 192 of the distal tendon section 190B.

Referring to FIGS. 13B and 13C, a similar procedure as described above in the preceding paragraph is utilized for pulling the proximal section 112 of the first bidirectional barbed suture 100A through the first collagen band 193 (FIG. 12B) that extends through the proximal tendon section 190A. A needle (not shown) secured to the proximal end of the first bidirectional barbed suture 100A pulls the proximal section 112 of the first suture through the first collagen bundle 192 (FIG. 12B) and in the proximal direction DIR2 until the stop 110 abuts against the end face 199 of the proximal tendon section 190A. Tension is applied to the proximal section 112 of the first bidirectional barbed suture until the opposing end faces 197, 199 of the respective distal and proximal tendon sections 190B, 190A are approximated with one another.

Figure 14:
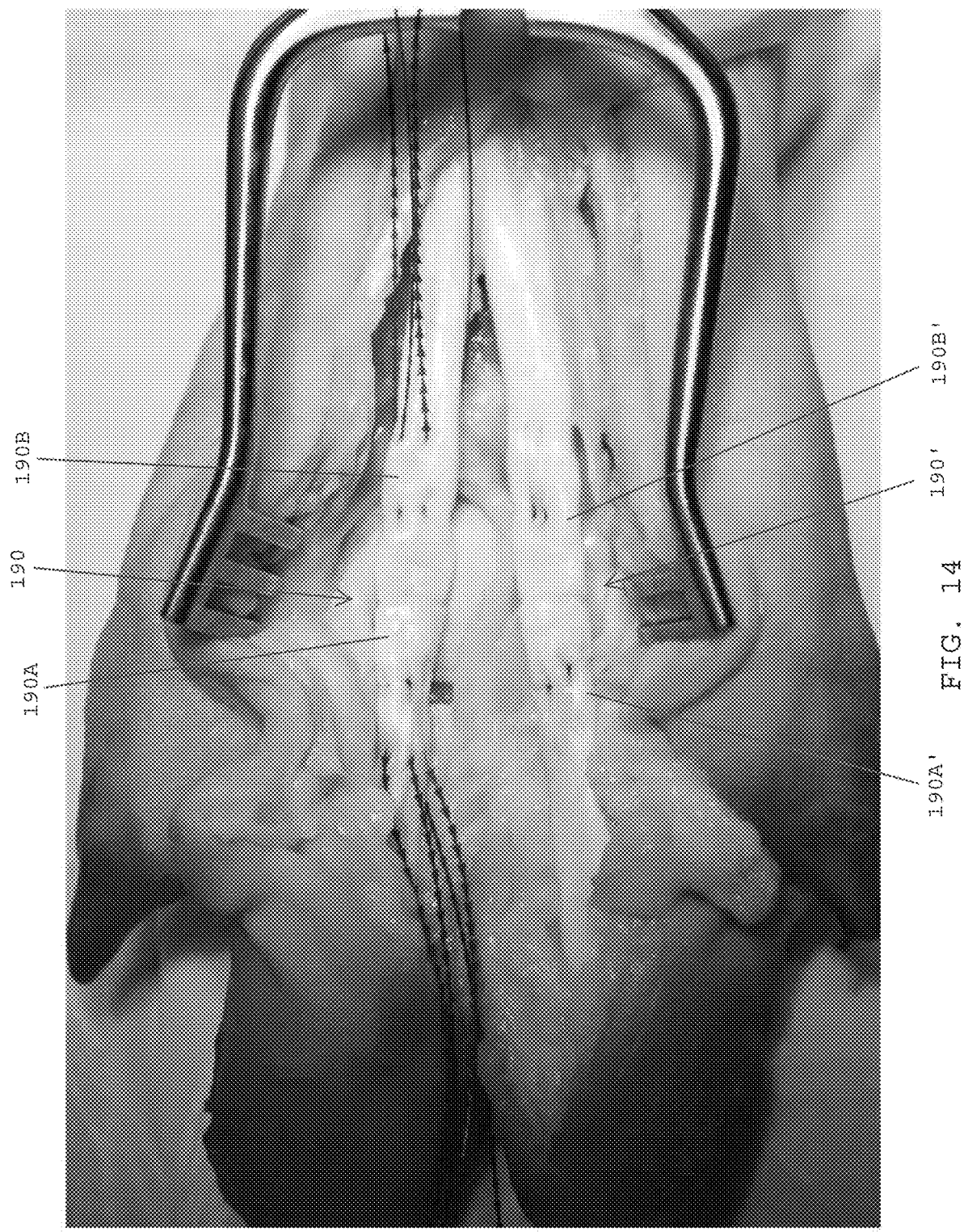
FIG. 14 shows a method of using the bidirectional barbed suture of FIG. 1A for repairing tendons, in accordance with one embodiment of the present patent application.

FIG. 14 shows first and second tendons 190, 190' that have been repaired using the surgical procedure shown and described above in FIGS. 11-13C. The distal ends of the four bidirectional barbed sutures 100A-100D have been passed through the distal tendon section 190B of the first tendon 190. The proximal ends of the four bidirectional barbed sutures 100A-100D have been passed through the proximal tendon section 190A of the first tendon 190. After the 7 millimeter first bite and the 5 millimeter second bite have been achieved, the respective proximal and distal ends of the four bidirectional barbed sutures 100A-100D that extend out of the first tendon 190 may be cut away.

FIG. 14 also shows a second tendon 190' that has been repaired using four bidirectional barbed sutures as described above, whereby the exposed proximal and distal ends of the four bidirectional barbed sutures have been cut away. The distal sections of the four respective bidirectional barbed sutures preferably include first tissue bites having a length of about 7 mm and second tissue bites having a length of about 5 mm that are located in the distal tendon section. The proximal sections of the four respective bidirectional barbed sutures preferably include first tissue bites having a length of about 7 mm and second tissue bites having a length of about 5 mm that are located in the proximal tendon section. The excess proximal and distal ends of the four bidirectional barbed sutures have been cut away.

Figure 15:
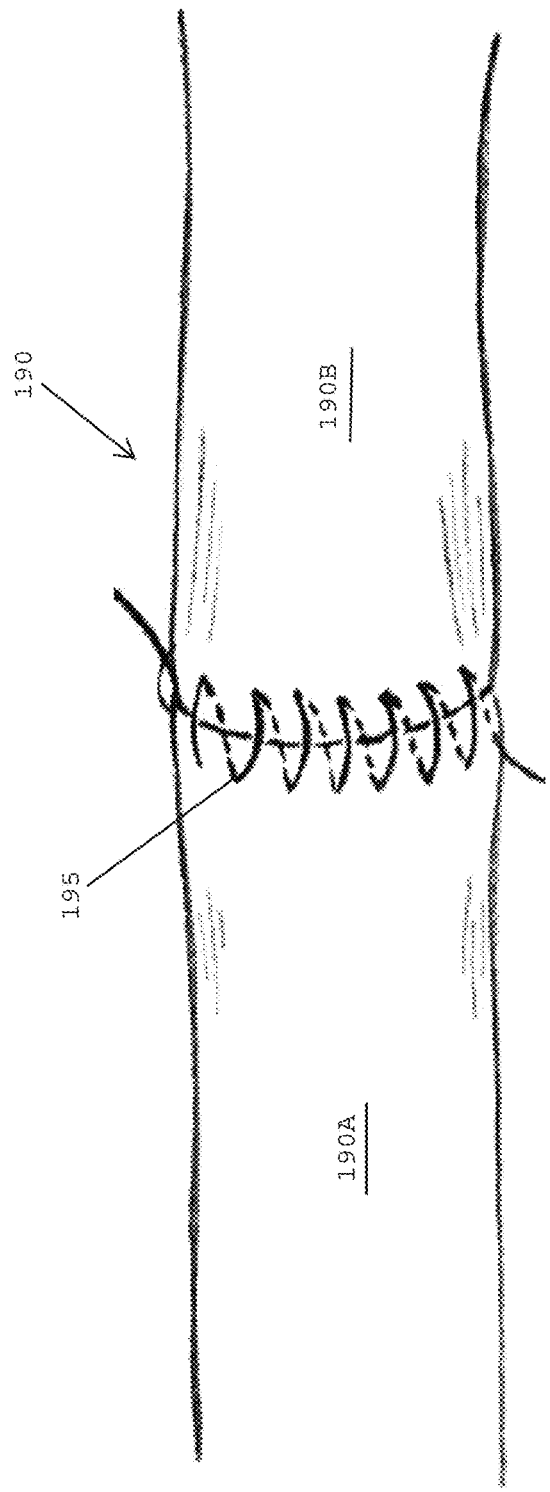
FIG. 15 shows a method of utilizing a circumferential epitendinous whip stitch for repairing a tendon, in accordance with one embodiment of the present patent application.

Referring to FIG. 15, in one embodiment, after the opposing ends of the proximal and distal tendon sections 190A, 190B have been joined together using the four bidirectional barbed sutures shown and described above in FIGS. 11-14, a circumferential epitendinous whip stitch 195 may be utilized. The circumferential epitendinous whip stitch 195 preferably extends around the opposing edges and the circumference of the proximal and distal tendon sections 190A, 190B that have been joined together for minimizing the presence of any jagged or rough surfaces at the junction of the proximal and distal tendon sections 190A, 190B.

In one embodiment, the whip stitch 195 preferably incorporates a therapeutic agent that enhances healing and/or encourages the formation of bridging collagen at the rejoined injury site. In one embodiment, the therapeutic agent incorporated into the whip stitch may include peptides, which are biologically and medically significant molecules. In one embodiment, the therapeutic agent incorporated into the whip stitch 195 may include genetically modified immune compatible cells designed to deliver repair instruction to the tendon and ligament tissue, such as a therapeutic agent that utilizes Clustered Regularly Interspaced Short Palindromic Repeat (CRISPR) technology.

Figure 16:
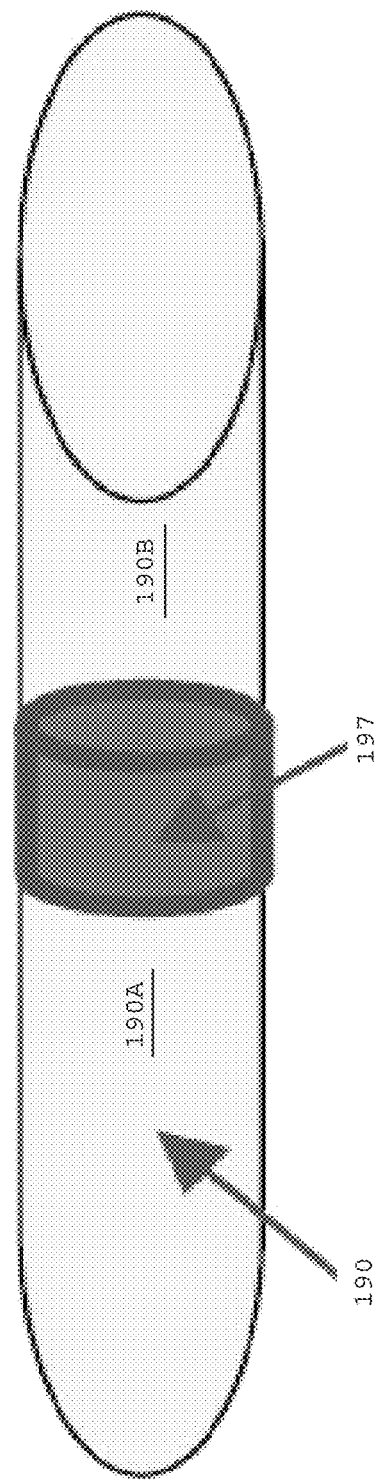
FIG. 16 shows a method of utilizing adhesive tape for repairing a tendon, in accordance with one embodiment of the present patent application.

Referring to FIG. 16, in one embodiment, instead of using a circumferential epitendinous whip stitch as shown and described above, the opposing cut edges of the proximal and distal tendon sections 190A, 190B of the tendon 190 may be covered by an annular band 197, such as a band of adhesive tape that covers the rejoined, opposing edges of the proximal and distal tendon sections 190A, 190B. In one embodiment, the adhesive tape 197 may be made of heat shrink material that will shrink in response to body heat. In one embodiment, a circumferential whip stitch may be employed at the junction of the proximal and distal tendon sections 190A, 190B and the adhesive band 197 may be placed over the circumferential whip stitch.

In one embodiment, the band 197 or adhesive tape may incorporate a therapeutic agent that enhances healing and/or encourages the formation of bridging collagen at the injury site. In one embodiment, the therapeutic agent incorporated may include peptides and genetically modified immune compatible cells designed to deliver repair instruction to the tendon and ligament tissue, such as a therapeutic agent that utilizes Clustered Regularly Interspaced Short Palindromic Repeat (CRISPR) technology.

Figure 17:
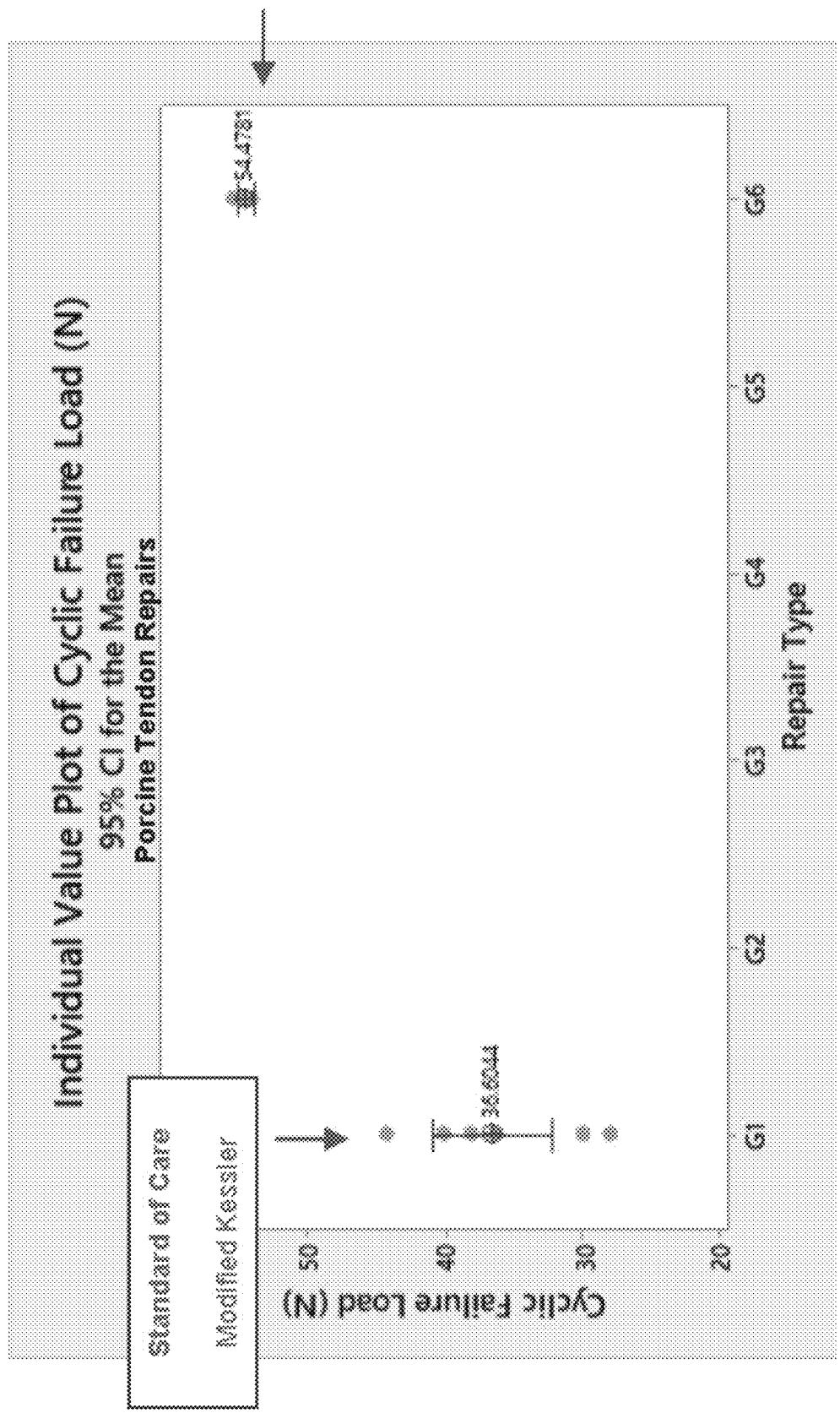
FIG. 17 is a graph that plots the cyclic failure load for a conventional tendon repair procedure versus the tendon repair procedure disclosed in certain preferred embodiments of the present patent application.
Figure 29:
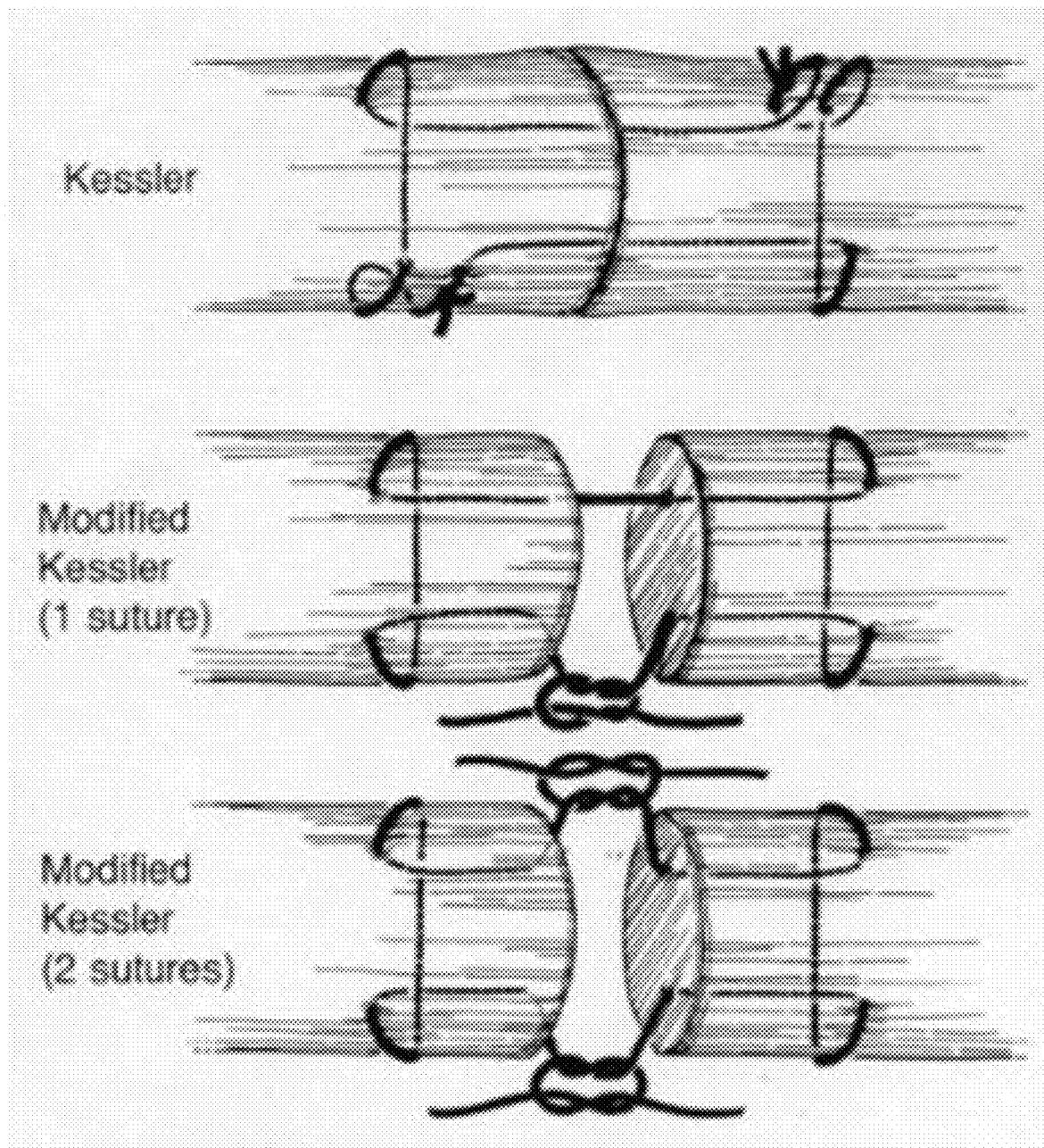
FIG. 29 shows prior art Kessler and Modified Kessler suturing techniques that are used for flexor tendon repair.

Experiment #1. Porcine tendon repairs were performed using both the modified Kessler technique (FIG. 29) and the improved systems, devices and tendon repair methods disclosed in the present patent application. In the present patent application, the modified Kessler technique is designated Repair Type G1, and the improved system and repair technique is designated repair type G6. The two different tendon repair procedures (G1 v. G6) were evaluated to determine the load that could be applied to the two different types of tendon repairs before reaching a failure load at which the repaired tendon would fail. FIG. 17 is a graph that plots the average failure load for the modified Kessler repairs (i.e., Repair Type G1) versus the failure load for tendons repaired using the improved systems, devices and methods disclosed in the present patent application (i.e., Repair Type G6). The modified Kessler technique (Repair Type G1) failed under an average load of about 36.60 N. Moreover, the modified Kessler technique (Repair Type G1) failed over a wide range of loads that extended from a low of about 27 N to a high of about 44 N.

In contrast, the improved tendon repair procedure (Repair Type G6) shown and described in the present patent application failed at an average load of about 54.478 N. In addition, the improved protocol (Repair Type G6) failed under a narrower range of loads that only slightly deviated from the average failure load of about 54.478 N. Thus, the improved tendon repair procedure (Repair Type G6) disclosed herein had a significantly higher failure load than the conventional modified Kessler protocol (Repair Type G6), and the failure tended to occur within a very narrow load range, which provides for a more consistent and predictable result than can be obtained when using the modified Kessler repair protocol.

Figure 18:
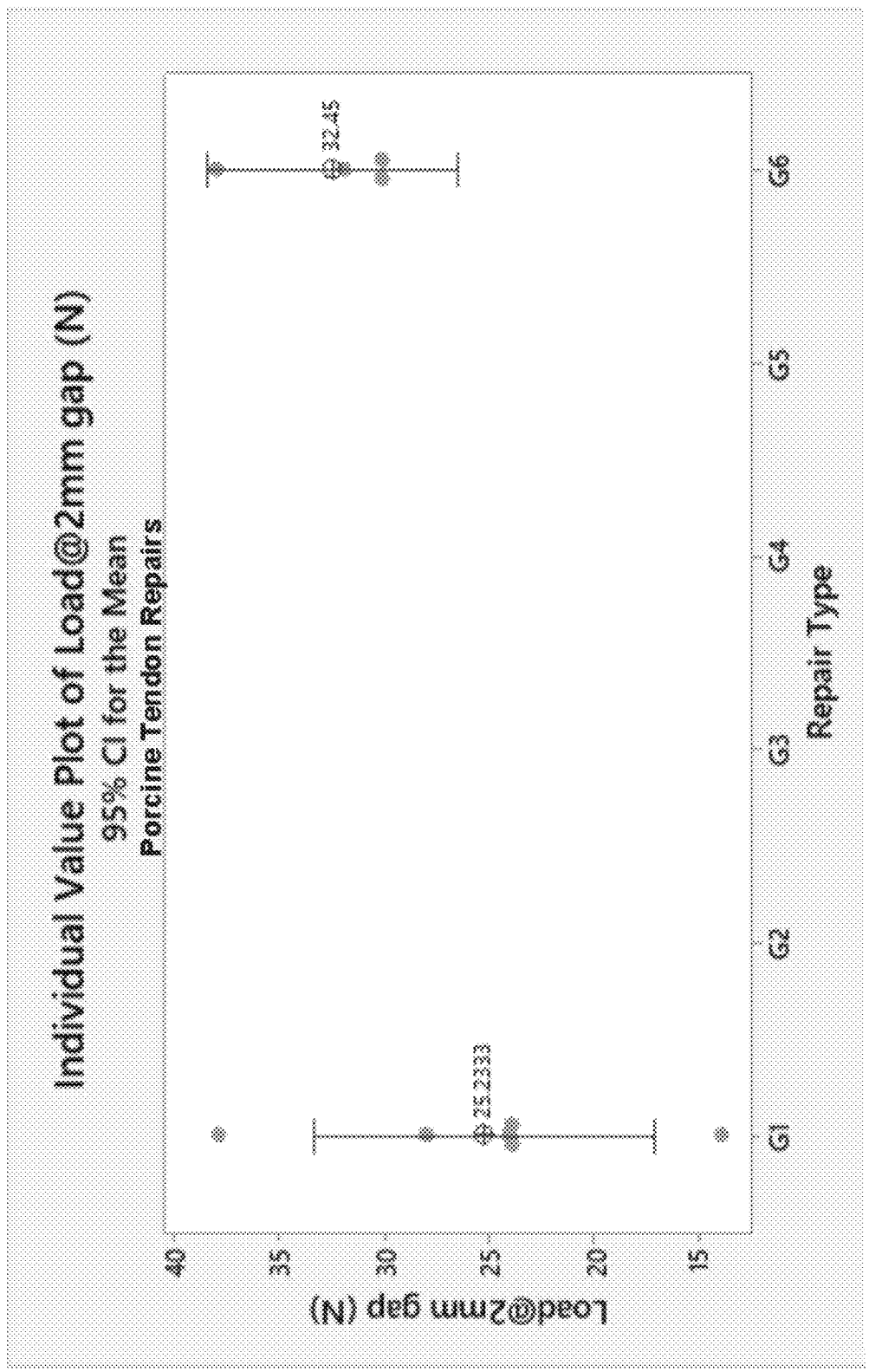
FIG. 18 is a graph that plots the load that is applied for attaining a two millimeter gap between proximal and distal sections of a repaired tendon, in accordance with one embodiment of the present patent application.

Experiment #2. Porcine tendon repair procedures were performed using both the modified Kessler technique (Repair Type G1 shown in FIG. 29) and the improved systems, devices and tendon repair methods disclosed in the present patent application (Repair Type G6). Proximal and distal tendon sections were rejoined using the two respective repair types G1 and G6. The two different tendon repair procedures were evaluated to determine the load that was applied to form a 2 mm gap between opposing edges of the proximal and distal tendon sections. The graph in FIG. 18 shows the load that is applied to attain a 2 mm gap between the opposing edges of the proximal and distal tendon sections for respective repair types G1 and G6. For the Kessler repair type G1, a 2 mm gap was attained after applying a load of 25.2 N. In contrast, for the inventive tendon repair procedure G6 disclosed herein, a 2 mm was attained after applying a load of 32.45 N. The text results provided clear evidence that the G6 repair procedure did a significantly better job holding the proximal and distal tendon sections together than did the prior art G1 repair procedure.

Figure 19:
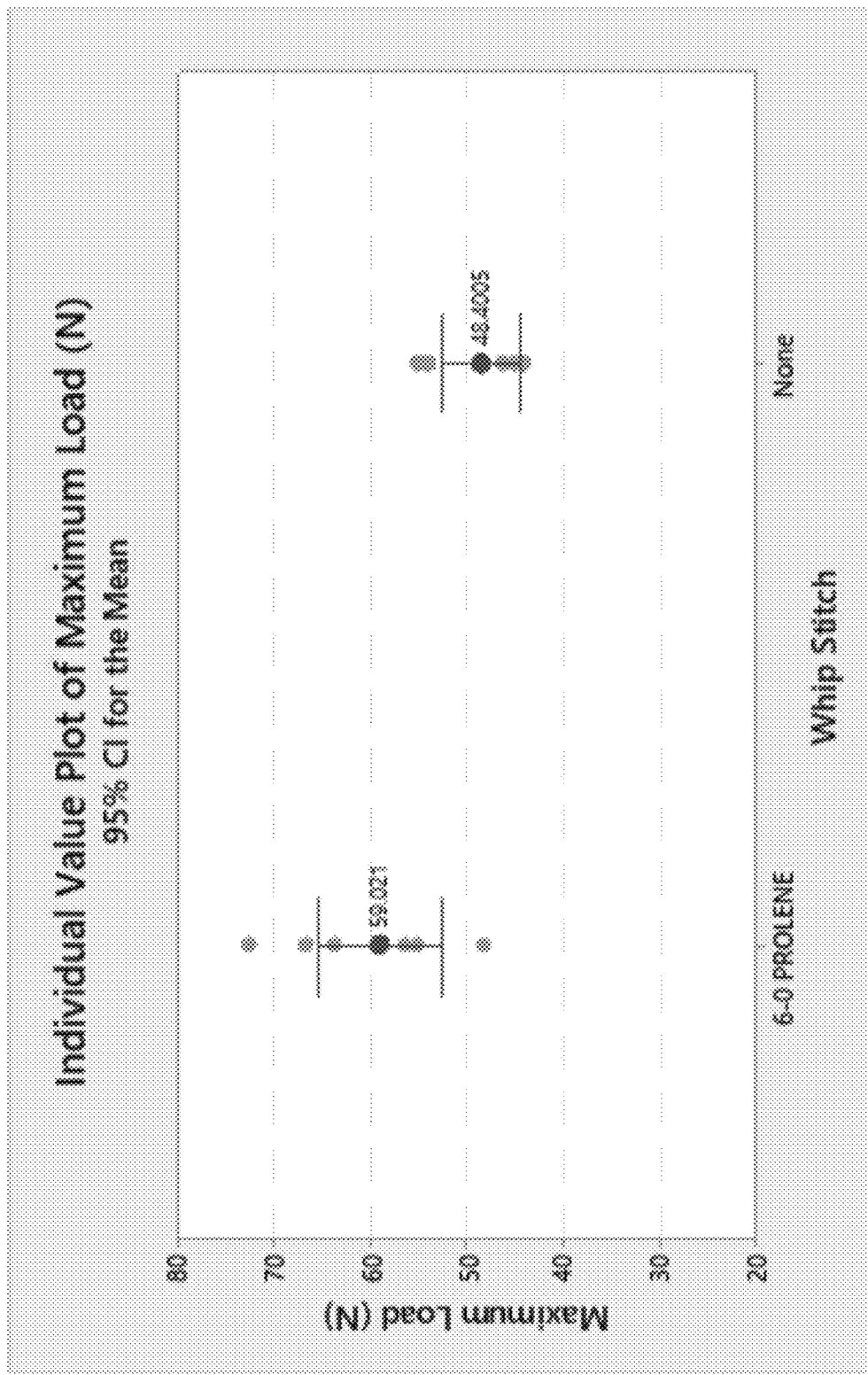
FIG. 19 is a graph that plots the benefits of using a circumferential epitendinous whip stitch to repair a tendon, in accordance with one embodiment of the present patent application.

Experiment #3. A plurality of tendons were repaired using the improved tendon repair procedures shown and described above in FIGS. 11-14 (Repair Type G6). The repaired tendons were divided into first and second lots. The first lot of repaired tendons received a circumferential whip stitch (e.g., 6-0 Prolene) around the junction of the opposing edges of proximal and distal tendon sections. The second lot of repaired tendons received no circumferential whip stitch around the junction of the opposing edges of the proximal and distal tendon sections. Referring to FIG. 19, the first lot of repaired tendons that received the whip stitch made of 6-0 Prolene had an average failure load of 59.021 N. The second lot of repaired tendons that did not receive whip stitches has a lower average failure load of 48.40 N. Thus, adding a whip stitch to a tendon repaired using the Repair Type G6 was shown to increase the strength of a repaired tendon.

Figure 20:
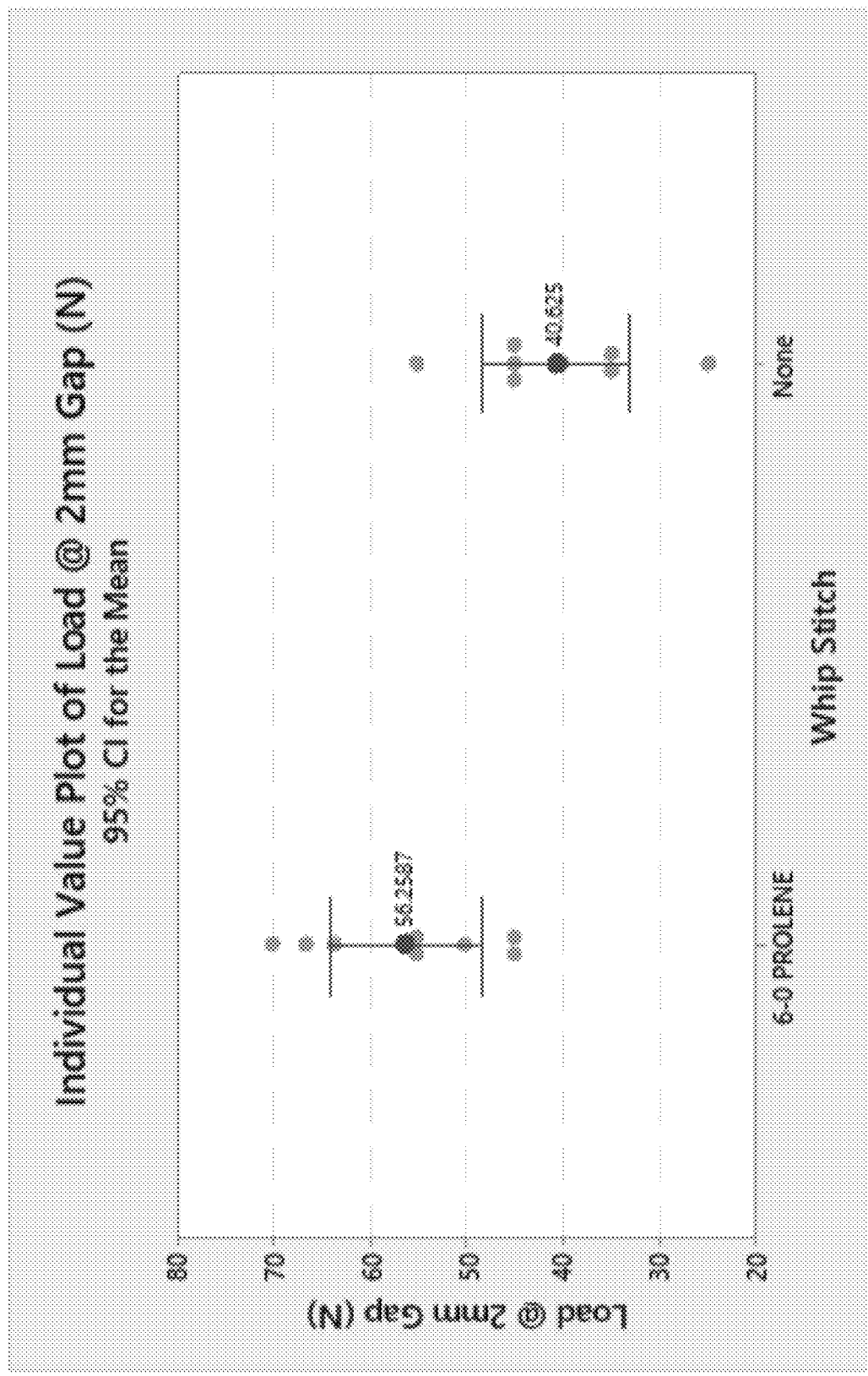
FIG. 20 is a graph that plots the load that is applied for attaining a two millimeter gap between proximal and distal sections of a repaired tendon when using a circumferential epitendinous whip stitch.

Experiment #4. A plurality of tendons were repaired using the improved surgical procedure described shown above in FIGS. 11-14 and described herein as Repair Type G6. The repaired tendons were divided into two lots. The repaired tendons in the first lot received a circumferential whip stitch using a 6-0 Prolene suture. The repaired tendons in the second lot did not receive a circumferential whip stitch. The two lots were evaluated to determine the load that must be applied to the repaired tendons to create a 2 mm gap between opposing edges of the rejoined proximal and distal tendon sections. FIG. 20 is a graph that plots the results. An average load of 56.26 N was applied to the first lot of repaired tendons to attain a 2 mm gap between the opposing edges of the repair tendons. An average load of 40.625 was applied to the second lot of repaired tendons to attain a 2 mm gap between the opposing edges of the repair tendons. The experimental results showed that using a circumferential whip stitch will increase the strength of a tendon that has been repaired using Repair Type G6.

Figure 21:
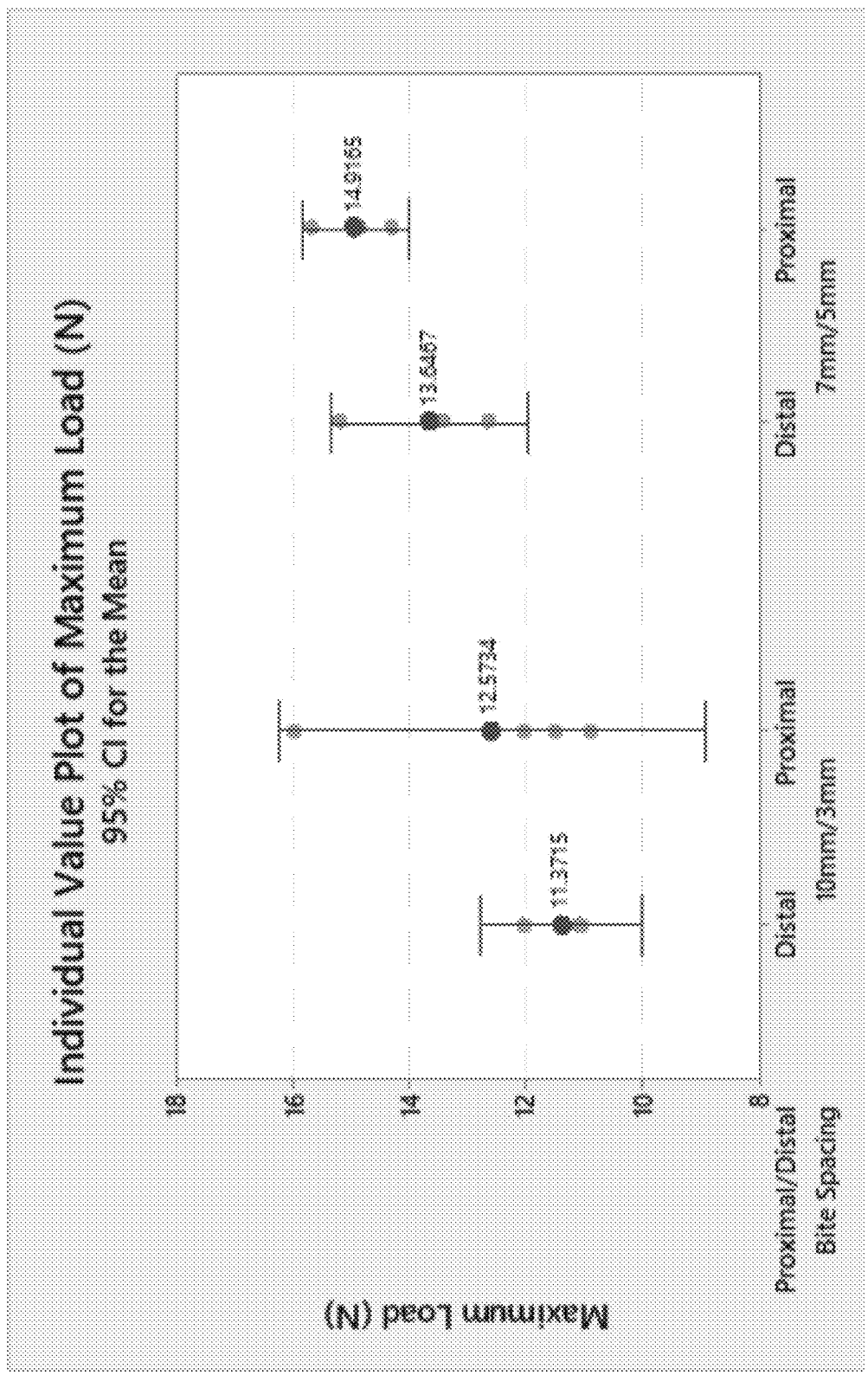
FIG. 21 is a graph that plots the maximum failure load for repaired tendons for 10 millimeter/3 millimeter bite spacing versus 7 millimeter/5 millimeter bite spacing.

Experiment #5. Tendons were repaired using both the bidirectional barbed sutures shown and described above in FIGS. 1A-4, and the surgical repair procedures shown and described above in FIGS. 11-13C. The repaired tendons were divided into first and second lots. For the first lot of repaired tendons, the bite spacing used a first tissue bite of 10 mm and a second tissue bite of 3 mm. For the second lot of repaired tendons, the bite spacing used a first tissue bite of 7 mm and a second tissue bite of 5 mm. FIG. 21 is a graph that shows the test results. In the second lot using the 7 mm/5 mm bite protocol, the maximum load that may be applied to the distal tendon section is 13.65 N and the maximum load that may be applied to the proximal tendon section is 14.91 N. This is an improvement over the first lot protocol that used a 10 mm/3 mm bite pattern. For the 10 mm/3 mm bite protocol, the maximum load that may be applied to the distal tendon section is 11.37 N and the maximum load that may be applied to the proximal tendon section is 12.57 N.

Figure 22A:
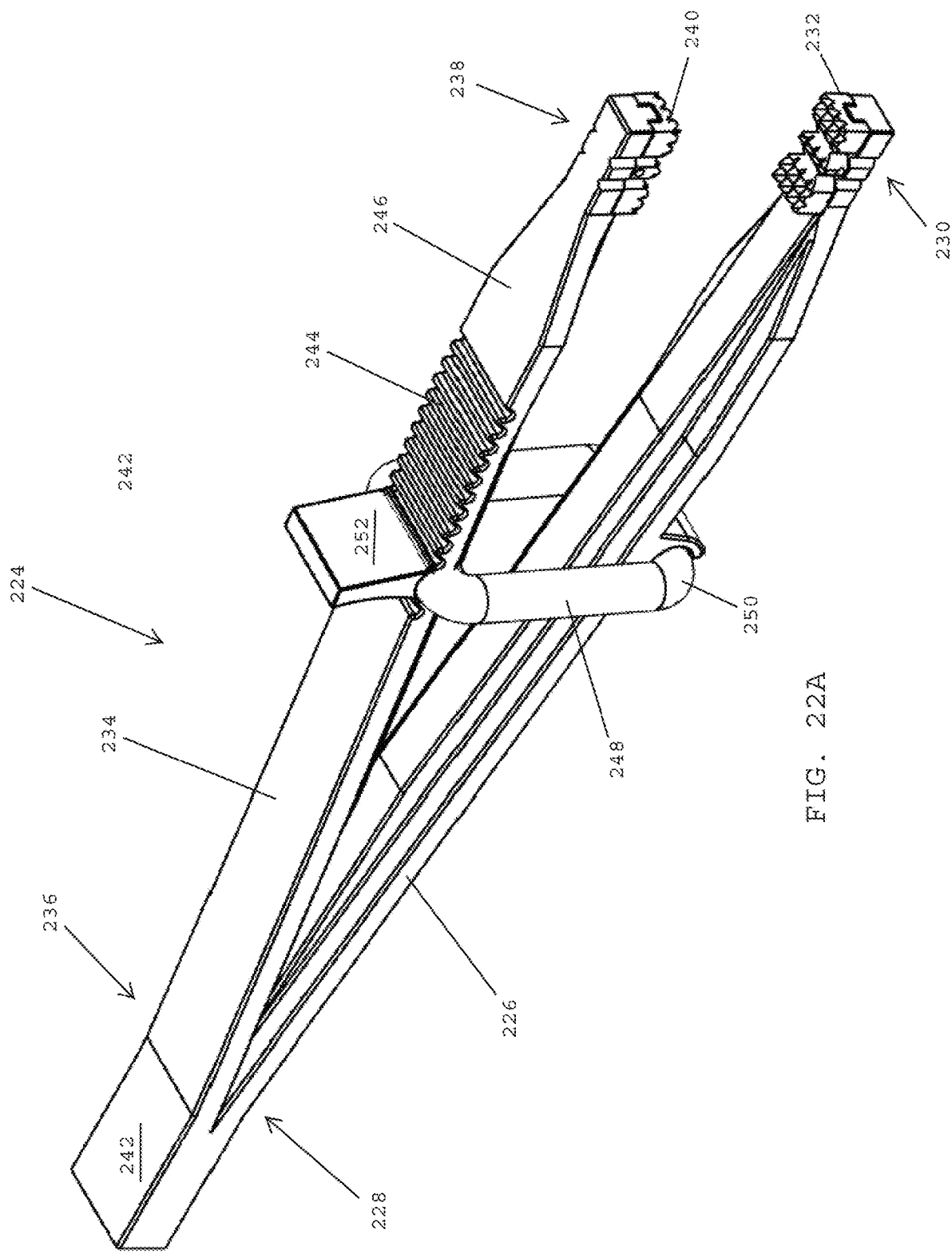
FIG. 22A is a perspective view a tissue clamp used for repairing a tendon, the tissue clamp having a first clamping arm with a first tissue gripping pad and a second clamping arm with a second tissue gripping pad, the first and second tissue gripping pads opposing one another, in accordance with one embodiment of the present patent application.
Figure 22B:
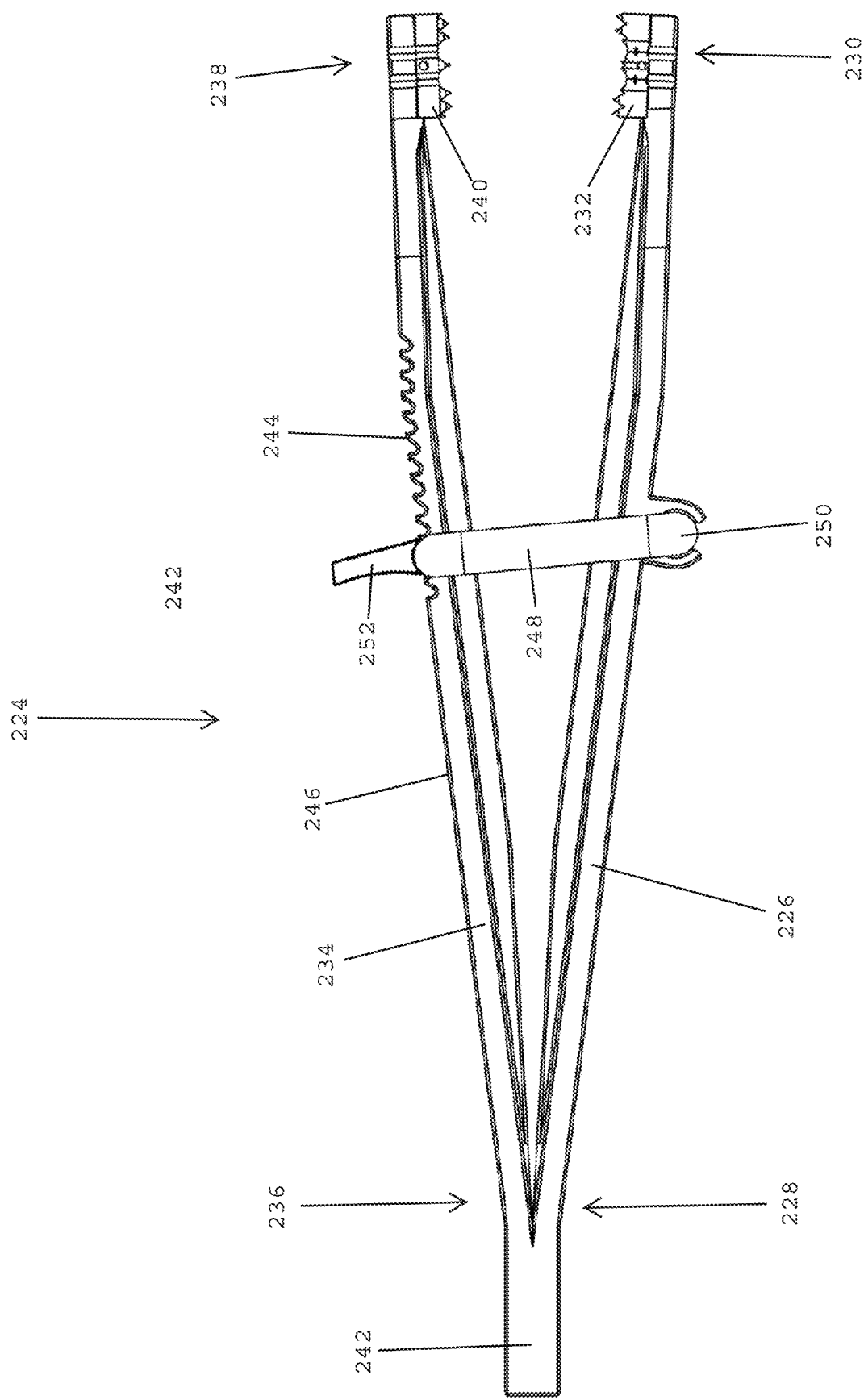
FIG. 22B is a side view of the tissue clamp shown in FIG. 22A.

Referring to FIGS. 22A and 22B, in one embodiment, a tissue clamp 224 is adapted to grasp a tendon or a ligament during a surgical repair procedure. In one embodiment, the tissue clamp 224 preferably includes a first clamping arm 226 having a proximal end 228 and a distal end 230. A first tissue gripping pad 232 is secured to the distal end 230 of the first clamping arm 226.

In one embodiment, the tissue clamp 224 preferably includes a second clamping arm 234 having a proximal end 236 and a distal end 238. A second tissue gripping pad 240 is secured to the distal end 238 of the second clamping arm 234.

In one embodiment, the proximal ends 228, 236 of the respective first and second clamping arms 226, 234 are connected to a spring tension component 242 that provides spring tension at the proximal end of the tissue clamp 224 for ensuring that the distal ends 230, 238 of the respective first and second clamping arms 226, 234 are normally biased away from one another into the open position shown in FIGS. 22A and 22B.

In one embodiment, the distal ends 230, 238 of the respective first and second clamping arms 226, 234 may be pressed toward one another for overcoming the spring tension force provided by the spring tension component 242. When the pressing force is released, the spring tension component 242 will return the distal ends 230, 238 of the respective first and second clamping arms 226, 234 to the open position shown in FIGS. 22A and 22B.

In one embodiment, the tissue clamp 224 preferably includes a locking mechanism 242 that enables adjustable clamping pressure to be applied between the first and second tissue gripping pads 232, 240. In one embodiment, the locking mechanism 242 preferably includes ratchet teeth 244 that are located over a top surface 246 of the second clamping arm 234. The locking mechanism 242 preferably includes a locking lever 248 having a lower end 250 that is coupled with the first clamping arm 226 and an upper end 251 that is adapted to engage the ratchet teeth 244 for adjusting the amount of clamping pressure that may be applied between the first and second tissue gripping pads 232, 240.

Referring to FIG. 23, in one embodiment, the distal end 230 of the first clamping arm 226 of the tissue clamp 224 preferably includes a first tissue gripping pad mounting base 254 that is configured to secure the first tissue gripping pad 232 to the distal end 230 of the first clamping arm 226. In one embodiment, the tissue clamp 224 preferably includes the second clamping arm 234 having the distal end 238. In one embodiment, the distal end 238 of the second clamping arm 234 preferably includes a second tissue gripping pad mounting base 264 that is adapted to secure the second tissue gripping pad 240 to the distal end 238 of the second clamping arm 234.

Figure 24:
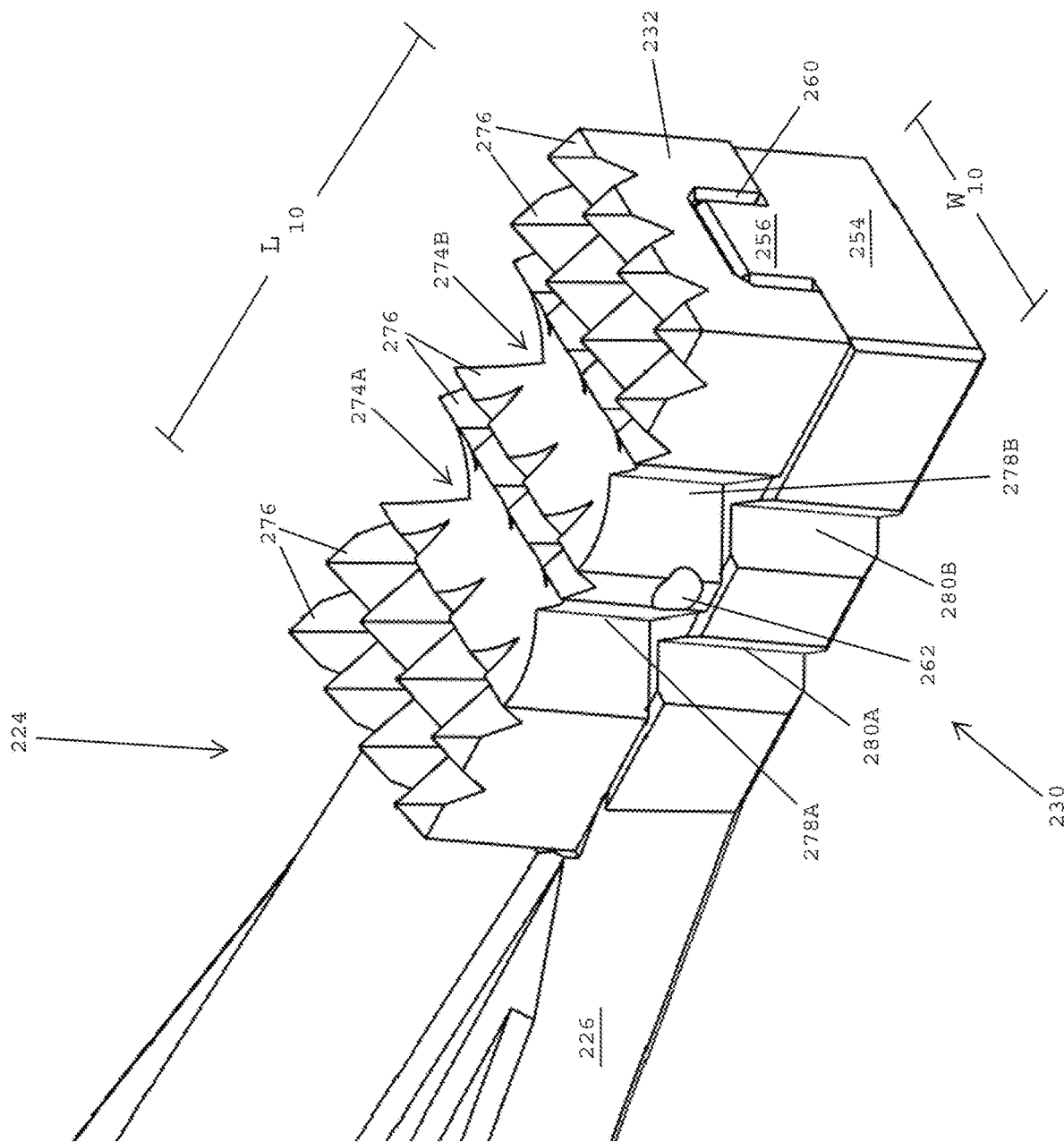
FIG. 24 is a magnified view of the first tissue gripping pad shown in FIG. 22A.

Referring to FIGS. 23 and 24, in one embodiment, the first tissue gripping pad mounting base 254 preferably includes a first alignment flange 256 that preferably extends along the longitudinal axis of the first clamping arm 226. In one embodiment, the first alignment flange 256 preferably includes a laterally extending pinhole (not shown) that is adapted to receive a pin for securing an underside of the first tissue gripping pad 232 to the first alignment flange 256. In one embodiment, the first tissue gripping pad 232 has a U-shaped channel 260 that extends along an underside thereof that is adapted to receive the first alignment flange 256 of the first tissue gripping pad mounting base 254 for mounting the first tissue gripping pad 232 to the distal end 230 of the first clamping arm 226. The side walls of the first tissue gripping pad 232 preferably include aligned pinholes 262 that are preferably aligned with the pinhole on the first alignment flange 256. A pin may be passed through the pinholes 262 for securing the first tissue gripping pad 232 onto the first alignment flange 256 and the first tissue gripping pad mounting base 254, which is located at the distal end 230 of the first clamping arm 226.

Referring to FIG. 24, in one embodiment, the first tissue gripping pad 232 is preferably secured atop the first alignment flange 256 of the first tissue gripping pad mounting base 254. The first tissue gripping pad 232 preferably has a length $L_{10}$ that extends along the length of the first clamping arm 226 and a width $W_{10}$ that extends between lateral sides of the first tissue gripping pad 232. In one embodiment, the first tissue gripping pad 232 preferably includes a top surface having a series of laterally extending needle guide channels. In one embodiment, the first tissue gripping pad 232 preferably includes two laterally extending needle guide channels 274A and 274B that are located between the proximal and distal ends of the first tissue gripping pad 232. The two needle guide channels 274A, 274B preferably extend in lateral directions that are perpendicular to the length $L_{10}$ of the first tissue gripping pad 232. The first needle guide channel 274A may be adapted for alignment with the first collagen bundle 192 of a tendon 190 (FIG. 11) and the second needle guide channel 274B may be adapted for alignment with the second collagen bundle 194 of the tendon 190 (FIG. 11). In one embodiment, the first tissue gripping pad 232 preferably includes a plurality of spaced teeth 276 that project from the upper face of the first tissue gripping pad. The teeth 276 desirably extend outside or and between the respective needle guide channels 274A, 274B.

In one embodiment, the first tissue gripping pad 232 preferably includes side grooves 278A and 278B that are preferably in alignment with the respective needle guide channels 274A and 274B for providing a visual indication of the needle guide channels 274A and 274B when the tissue clamp 224 is closed on a tendon. In one embodiment, a distal end of a suture needle is preferably aligned with one of the side grooves 278A-278D for passing the needle through one of the needle guide channels 274-274D. The suture needle is preferably utilized for passing an end of the bidirectional barbed sutures shown and described above in FIGS. 1A-1B through a tendon.

In one embodiment, a sidewall of the first tissue gripping pad mounting base 254 preferably includes side grooves 280A and 280B that are preferably aligned with the respective side grooves 278A and 278B of the first tissue gripping pad 232 to provide an additional visual indication of the location of the needle guide channels 274A and 278B.

Figure 25:
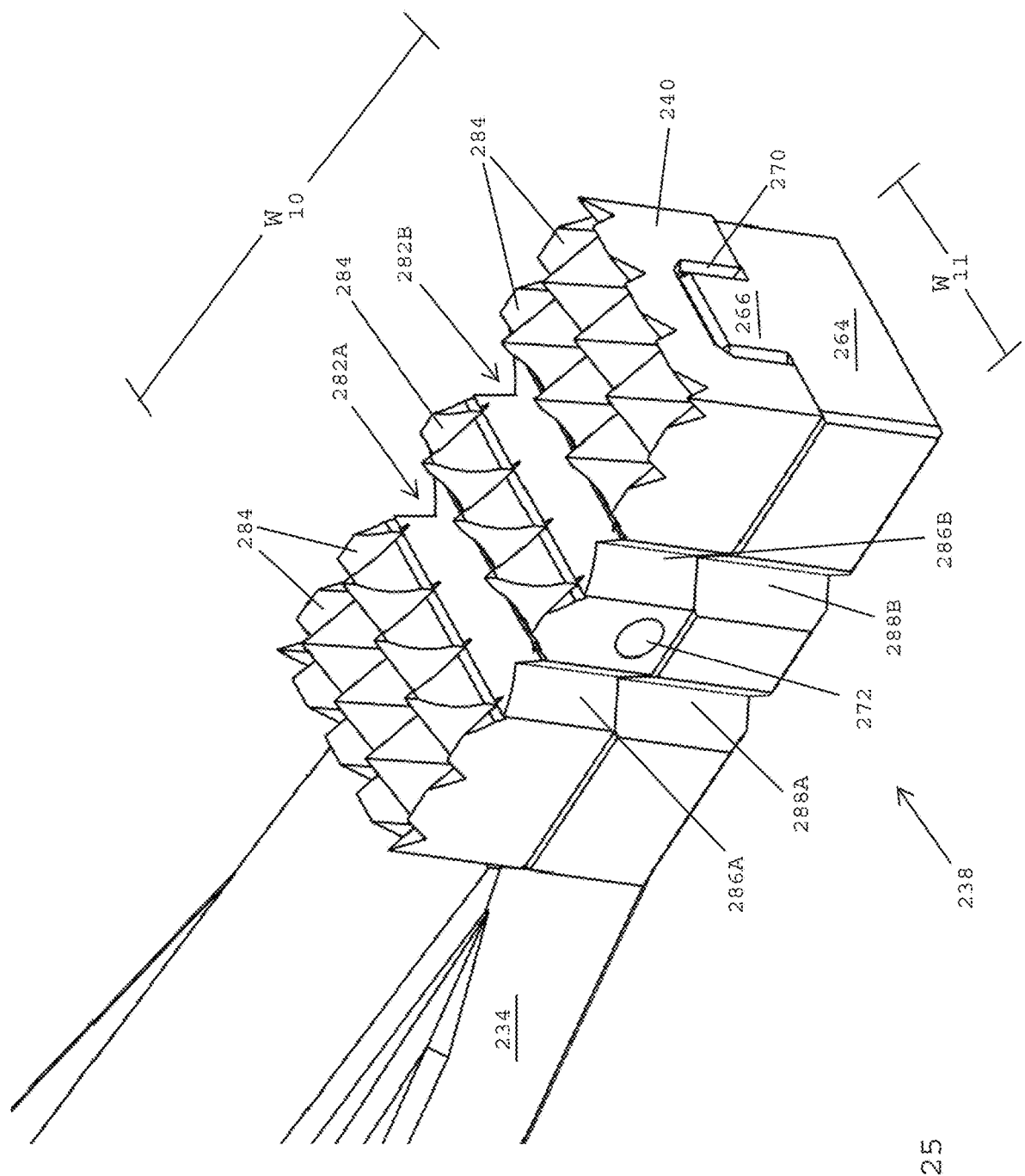
FIG. 25 is a magnified view of the second tissue gripping pad shown in FIG. 22A.

Referring to FIGS. 23 and 25, in one embodiment, the second tissue gripping pad mounting base 264 preferably includes a second alignment flange 266 having a laterally extending pinhole (not shown) that is adapted to receive a pin for securing the second tissue gripping pad 240 to the second alignment flange 266 of the second tissue gripping pad mounting base 264. In one embodiment, the second tissue gripping pad 240 preferably includes a U-shaped channel 270 that is adapted to receive the second alignment flange 266 for mounting the second tissue gripping pad 240 to the distal end 238 of the second clamping arm 234. In one embodiment, the second tissue gripping pad 240 preferably includes pinhole openings 272 that are adapted to receive a pin for securing the second tissue gripping pad 240 to the second alignment flange 266 of the second tissue gripping pad mounting base 264. In one embodiment, after the U-shaped channel 270 of the second tissue gripping pad 240 is positioned over the second alignment flange 266, a pin may be passed through the pinhole openings 272 for securing the second tissue gripping pad 240 to the second tissue gripping pad mounting base 264.

Referring to FIG. 25, in one embodiment, the second tissue gripping pad 240 is preferably mounted onto the second alignment flange 266 of the second tissue gripping pad mounting base 264. The second tissue gripping pad 240 preferably has a length $L_{11}$ that extends along the longitudinal axis of the second clamping arm 234 and a width $W_{11}$ that extends between the lateral sides of the second tissue gripping pad 240. In one embodiment, the second tissue gripping pad 240 preferably includes a bottom surface having two laterally extending needle guide channels 282A and 282B that are spaced from one another and that extend between the lateral sides of the second tissue gripping pad 240 and along respective axes that are substantially perpendicular to the longitudinal axis of the second clamping arm 234. In one embodiment, the second tissue gripping pad 240 preferably includes teeth 284 that project from the bottom surface of the second tissue gripping pad and that are located outside and between the two laterally extending needle guide channels 282A and 282B. In one embodiment, a lateral side of the second tissue gripping pad 240 preferably includes side grooves 286A and 286B that are aligned with the respective laterally extending needle guide channels 282A-282D for providing a visual indication of the location of the laterally extending needle guide channels 282A and 282B. In one embodiment, a sidewall of the second tissue gripping pad mounting base 264 includes side grooves 288A and 288B that are in alignment with the respective side grooves 286A and 286B of the second tissue gripping pad 240.

Figure 26B:
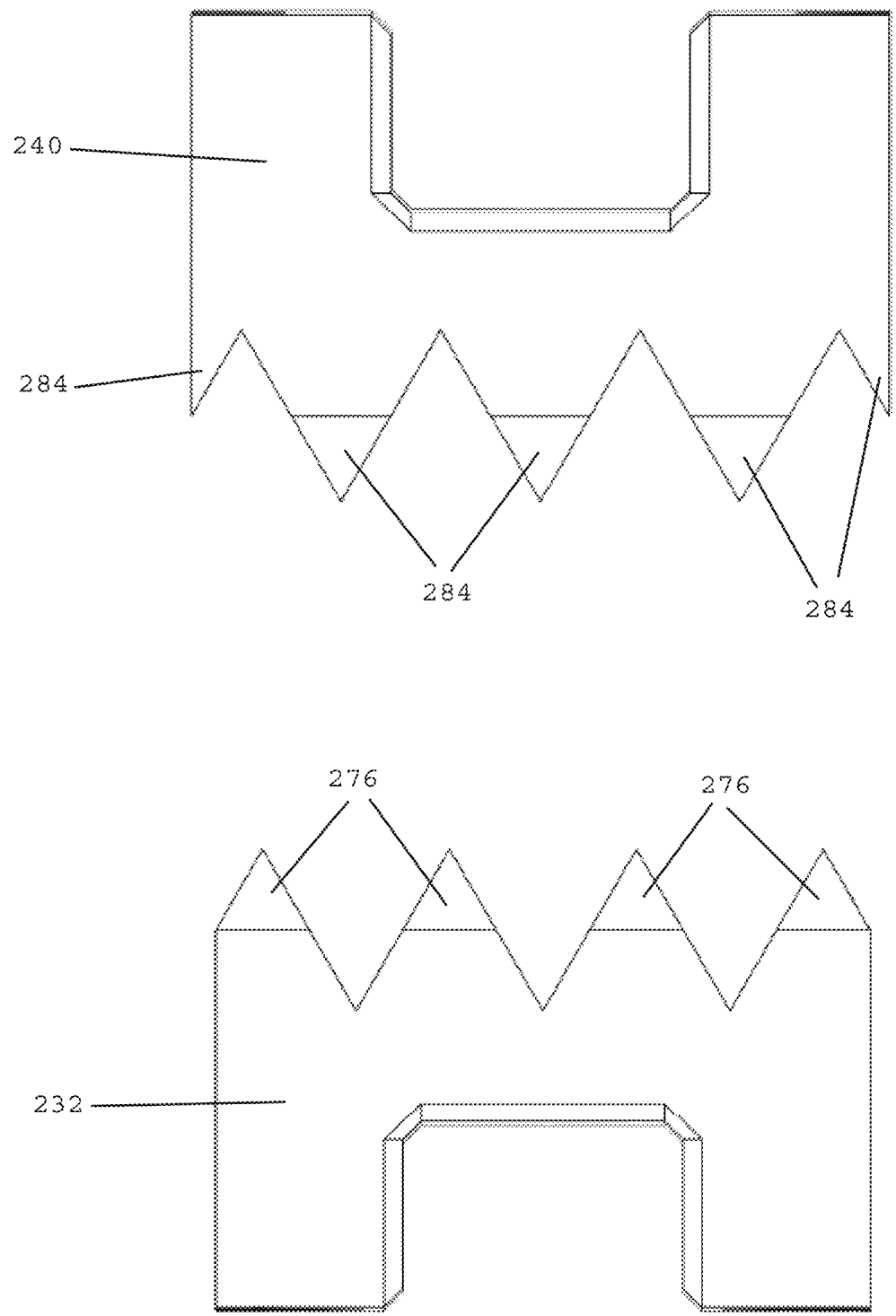
FIG. 26B is a distal end view of the opposing first and second tissue gripping pads shown in FIGS. 22A-22B and 26A.

Referring to FIGS. 26A and 26B, in one embodiment, the upper surface of the first tissue gripping pad 232 preferably opposes the bottom surface of the second tissue gripping pad 240. The top surface of the first tissue gripping pad 232 preferably includes the two laterally extending needle guide channels 274A and 274B that oppose the bottom surface of the second tissue gripping pad 240.

In one embodiment, the bottom surface of the second tissue gripping pad 240 preferably includes the two laterally extending clearance channels 282A and 282B that preferably oppose the top surface of the first tissue gripping pad 232.

In one embodiment, the peaks of the teeth 276 projecting from the upper surface of the first tissue gripping pad 232 are preferably offset from the peaks of the teeth 284 projecting from the bottom surface of the second tissue gripping pad 240.

Although the present patent application is not limited by any particular theory of operation, offsetting the peaks of the opposing teeth from one another preferably generates a bed of nails clamping mechanism, which minimizes the amount of clamping pressure applied to a tendon, thereby minimizing the likelihood of tissue damage during a tendon repair procedure.

Referring to FIG. 26A, in one embodiment, a sidewall of the first tissue gripping pad 232 preferably includes side grooves 278A and 278B that are preferably aligned with the respective laterally extending needle guide channels 274A and 274B for providing a visual indication of the location of the needle guide channels 274A and 274B when the tissue clamp is closed on a tendon.

In one embodiment, the second tissue gripping pad 240 preferably has a sidewall having side grooves 286A and 286D formed therein that are in alignment with the laterally extending needle guide channels 282A and 282B of the second tissue gripping pad 240 for providing a visual indication of the location of the laterally extending needle guide channels 282A and 282B when the tissue clamp is closed on a tendon.

During a tendon repair procedure, the tissue clamp shown and described in FIGS. 22A-26B may be moved into a closed configuration whereupon the teeth 276, 284 projecting from the opposing first and second tissue gripping pads 232, 240 engage an outer surface of the tendon for grasping the tendon. The opposing teeth 276, 284 are preferably offset from one another (i.e., not in alignment) to minimize any likelihood of damage to the tendon when the tissue clamp is closed for applying a clamping force to the tendon.

In one embodiment, when the clamp is closed on a tendon, the needle guide channels 274A, 282A of the respective first and second tissue gripping pads 232, 240 are preferably aligned with the first collagen bundle 192 of the tendon 190 for guiding one or more needles into the first collagen bundle, and the needle guide channels 274B, 282B of the respective first and second tissue gripping pads 232, 240 are preferably aligned with the second collagen bundle 194 of the tendon 190 for guiding one or more needles into the second collagen bundle.

Figure 27:
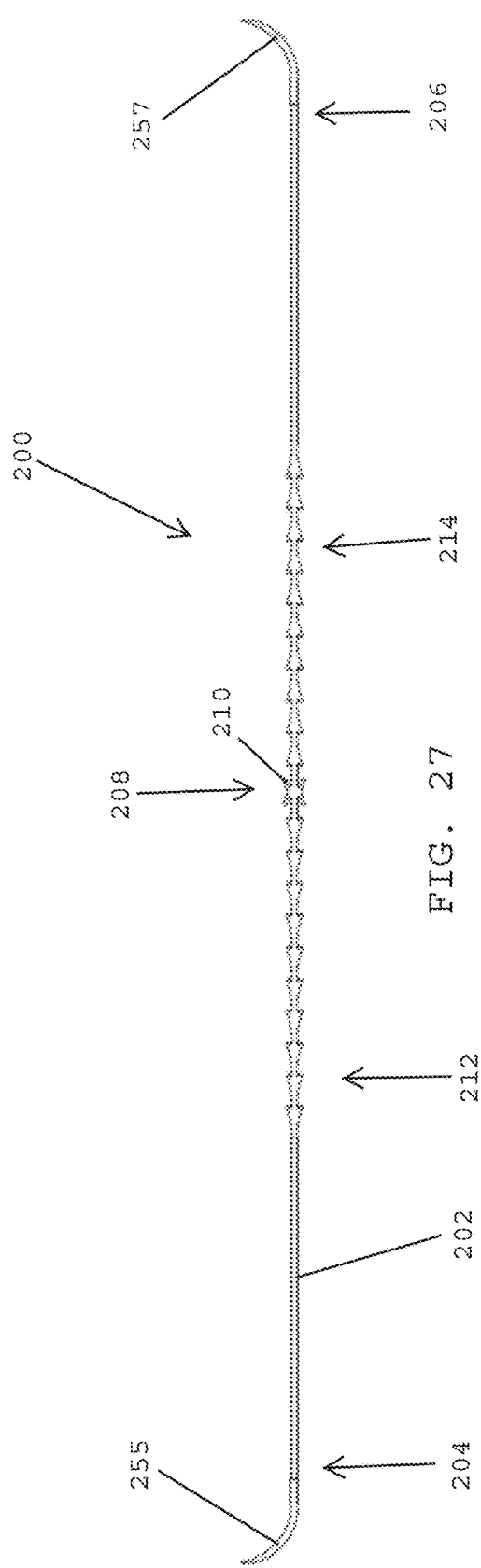
FIG. 27 is a top view of a bidirectional barbed suture used for repairing tendons and ligaments, the bidirectional barbed suture having an elongated filamentary element, bidirectional barbs, a central transition zone, a stop located in the central transition zone, and first and second curved suture needles secured to respective proximal and distal ends of the elongated filamentary element, in accordance with one embodiment of the present patent application.

Referring to FIG. 27, in one embodiment, a bidirectional barbed suture 200 preferably includes an elongated core 202 having a proximal end 204 and a distal end 206. In one embodiment, the bidirectional barbed suture 200 preferably includes a transition zone 208 that is located midway between the proximal and distal ends 204, 206 of the elongated core 202. In one embodiment, the bidirectional barbed suture 200 preferably includes a stop 210 that is located within the transition zone 208 thereof. The bidirectional barbed suture 200 preferably includes a proximal barbed section 212 that extends proximally between the stop 210 and the proximal end 204 of the elongated core 202. The bidirectional barbed suture 200 preferably includes a distal barbed section 214 that preferably extends between the stop 210 and the distal end 206 of the elongated core 202.

In one embodiment, a first or proximal needle 255 is secured to the proximal end 204 of the elongated core 202. In one embodiment, a second or distal needle 257 is secured to the distal end 206 of the elongated core 202. The needles are used for advancing the proximal and distal sections 212, 214 of the bidirectional barbed suture 200 through proximal and distal tendon sections of a tendon that is being repaired.

Figure 28:
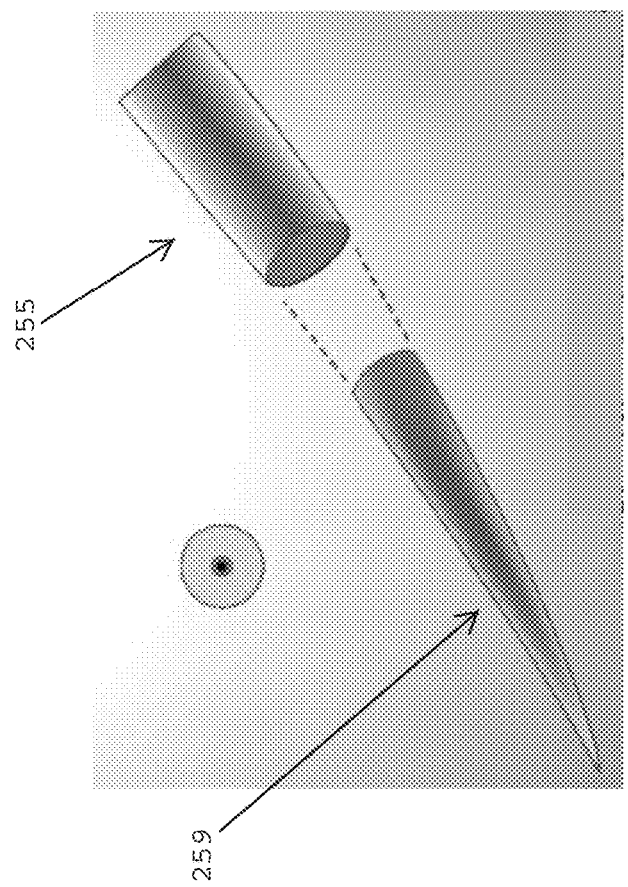
FIG. 28 is a schematic view of the first suture needle shown in FIG. 27.

FIG. 28 shows the distal end 259 of the proximal needle 255. The distal end 259 has a distal tip that is blunt or tapered, which preferably enables the distal tip to pass between the fibers of the collagen bundles without cutting the fibers as the bidirectional barbed suture is passed through the collagen bundles.

In one embodiment, the proximal and distal needles 255, 257 may be made of metal such as stainless steel. In one embodiment, needles preferably include curved elongated bodies having suture attachment barrels that are adapted to be secured to outer ends of the elongated core 202.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A method of repairing a tendon comprising:

obtaining four bidirectional barbed sutures configured to repair the tendon, each of the four bidirectional barbed sutures including a proximal section with proximal barbs that extend in a first direction and a proximal needle secured to a proximal end of the proximal section, a distal section with distal barbs that extend in a second direction that is opposite the first direction and a distal needle secured to a distal end of the distal section, and a stop located between the proximal and distal barbs;

using the distal needle of a first one of the bidirectional barbed sutures to take a first suture bite in a distal tendon section and pulling the distal barbs of the first bidirectional barbed suture in a distal direction through the distal tendon section until the stop of the first bidirectional barbed suture abuts against a free end of the distal tendon section;

using the distal needle of a second one of the bidirectional barbed sutures to take a second suture bite in the distal tendon section and pulling the distal barbs of the second bidirectional barbed suture in the distal direction through the distal tendon section until the stop of the second bidirectional barbed suture abuts against the free end of the distal tendon section;

using the distal needle of a third one of the bidirectional barbed sutures to take a third suture bite in the distal tendon section and pulling the distal barbs of the third bidirectional barbed suture in the distal direction through the distal tendon section until the stop of the third bidirectional barbed suture abuts against the free end of the distal tendon section;

using the distal needle of a fourth one of the bidirectional barbed sutures to take a fourth suture bite in the distal tendon section and pulling the distal barbs of the fourth bidirectional barbed suture in the distal direction through the distal tendon section until the stop of the fourth bidirectional barbed suture abuts against the free end of the distal tendon section;

using the proximal needle of the first bidirectional barbed suture to take a fifth suture bite in a proximal tendon section and pulling the proximal barbs of the first bidirectional barbed suture in a proximal direction through the proximal tendon section;

using the proximal needle of the second bidirectional barbed suture to take a sixth suture bite in the proximal tendon section and pulling the proximal barbs of the second bidirectional barbed suture in the proximal direction through the proximal tendon section;
using the proximal needle of the third bidirectional barbed suture to take a seventh suture bite in the proximal tendon section and pulling the proximal barbs of the third bidirectional barbed suture in the proximal direction through the proximal tendon section; and
using the proximal needle of the fourth bidirectional barbed suture to take an eighth suture bite in the proximal tendon section and pulling the proximal barbs of the fourth bidirectional barbed suture in the proximal direction through the proximal tendon section, wherein each of the first, second, third and fourth suture bites in the distal tendon section have a length of about 7 mm, and wherein the fifth, sixth, seventh, and eight suture bites in the proximal tendon section have a length of about 7 mm;
using the distal needle of the first bidirectional barbed suture to take a ninth suture bite in the distal tendon section, and using the distal needle of the second bidirectional barbed suture to take a tenth suture bite in the distal tendon section, the distal needle of the third bidirectional barbed suture to take an eleventh suture bite in the distal tendon section, and the distal needle of the fourth bidirectional barbed suture to take a twelfth suture bite in the distal tendon section; and
using the proximal needle of the first bidirectional barbed suture to take a thirteenth suture bite in the proximal tendon section, using the proximal needle of the second bidirectional barbed suture to take a fourteenth suture bite in the proximal tendon section, the proximal needle of the third bidirectional barbed suture to take a fifteenth suture bite in the proximal tendon section, and the proximal needle of the fourth bidirectional barbed suture to take a sixteenth suture bite in the proximal tendon section, wherein each of the ninth, tenth, eleventh, twelfth, thirteenth, fourteenth, fifteenth, and sixteenth sutures bites has a length of about 5 mm.

2. The method as claimed in claim 1, further comprising:
pulling the distal barbs of the first bidirectional barbed suture and the distal barbs of the second bidirectional barbed suture in the distal direction through a first collagen bundle located within the distal tendon section; and
pulling the distal barbs of the third bidirectional barbed suture and the distal barbs of the fourth bidirectional barbed suture in the distal direction through a second collagen bundle located within the distal tendon section.

3. The method as claimed in claim 1, further comprising applying tension to the proximal ends of the four bidirectional barbed sutures to pull the respective stops of the four bidirectional barbed suture against the free end of the proximal tendon section that opposes the free end of the distal tendon section for approximating the opposing free ends of the distal and proximal tendon sections for repairing the tendon.

4. The method as claimed in claim 1, further comprising:
pulling the proximal barbs of the first bidirectional barbed suture and the proximal barbs of the second bidirectional barbed suture in the proximal direction through a first collagen bundle located within the proximal tendon section; and pulling the proximal barbs of the third bidirectional barbed suture and the proximal barbs of the fourth bidirectional barbed suture in the proximal direction through a second collagen bundle located within the proximal tendon section.

5. The method as claimed in claim 4, wherein the first and second collagen bundles extend along a length of the tendon, and wherein the first and second bidirectional barbed sutures extend linearly through the first collagen bundle of the tendon and the third and fourth bidirectional barbed sutures extend linearly through the second collagen bundle of the tendon.

6. The method as claimed in claim 3, further comprising placing an epitendinous whip stitch around a junction of the approximated opposing free ends of the distal and proximal tendon sections.

7. The method as claimed in claim 3, further comprising placing a band of heat-shrink material around a junction of the approximated opposing free ends of the distal and proximal tendon sections.

8. The method as claimed in claim 1, further comprising using a tissue clamp for securing the distal tendon section adjacent the free end of the distal tendon section, wherein the tissue clamp includes first and second tissue gripping pads that oppose one another for engaging opposite sides of the distal tendon section, and wherein the opposing tissue gripping pads define at least one needle guide channel that is in alignment with a collagen bundle that is disposed within the distal tendon section.

9. The method as claimed in claim 8, further comprising:
the first tissue gripping pad having teeth that project toward the opposing second tissue gripping pad; and
the second tissue gripping pad having teeth that project toward the opposing first tissue gripping pad, wherein the teeth of the first tissue gripping pad are offset from the teeth of the second tissue gripping pad.

10. The method as claimed in claim 1, wherein the first bidirectional barbed suture comprises a marker made of a material that is opaque to one or more forms of radiation.

11. A method of repairing a tendon comprising:
obtaining a first bidirectional barbed suture configured to repair the tendon, the first bidirectional barbed suture including a proximal section with proximal barbs that extend in a first direction and a proximal needle secured to a proximal end of the proximal section, a distal section with distal barbs that extend in a second direction that is opposite the first direction and a distal needle secured to a distal end of the distal section, and a stop located between the proximal and distal barbs;
using the distal needle to take a first suture bite in a distal tendon section of the tendon and pulling the distal barbs in a distal direction through the distal tendon section until the stop abuts against a free end of the distal tendon section; and
using the proximal needle to take a second suture bite in a proximal tendon section of the tendon and pulling the proximal barbs in a proximal direction through the proximal tendon section until the stop abuts against a free end of the proximal tendon section that opposes the free end of the distal tendon section for approximating the opposing free ends of the distal and proximal tendon sections.

12. The method as claimed in claim 11, further comprising:
using the distal needle to take a third suture bite in the distal tendon section that is located distal to the first suture bite in the distal tendon section; and using the proximal needle to take a fourth suture bite in the proximal tendon section that is located proximal to the second suture bite in the proximal tendon section.

13. The method as claimed in claim 12, wherein the first suture bite in the distal tendon section is longer than the third suture bite in the distal tendon section, and wherein the second suture bite in the proximal tendon section is longer than the fourth suture bite in the proximal tendon section.

14. The method as claimed in claim 13, wherein each of the first and second suture bites has a length of about 7 mm, and wherein each of the third and fourth suture bites has a length of about 5 mm.

15. The method as claimed in claim 12, further comprising:
obtaining a second bidirectional barbed suture configured to repair the tendon, the second bidirectional barbed suture including a proximal section with proximal barbs that extend in the first direction and a proximal needle secured to a proximal end of the proximal section, a distal section with distal barbs that extend in the second direction and a distal needle secured to a distal end of the distal section, and a stop located between the proximal and distal barbs;
using the distal needle of the second bidirectional barbed suture to take a fifth suture bite in the distal tendon section and pulling the distal barbs of the second bidirectional barbed suture in the distal direction through the distal tendon section until the stop of the second bidirectional barbed suture abuts against the free end of the distal tendon section; and
using the proximal needle of the second bidirectional barbed suture to take a sixth suture bite in the proximal tendon section and pulling the proximal barbs of the second bidirectional barbed suture in the proximal direction through the proximal tendon section until the stop of the second bidirectional barbed suture abuts against the free end of the proximal tendon section that opposes the free end of the distal tendon section for approximating the opposing free ends of the distal and proximal tendon sections.

16. The method as claimed in claim 15, further comprising:
using the distal needle of the second bidirectional barbed suture to take a seventh suture bite in the distal tendon section that is located distal to the fifth suture bite of the second bidirectional barbed suture in the distal tendon section; and
using the proximal needle of the second bidirectional barbed suture to take an eighth suture bite in the proximal tendon section that is located proximal to the sixth suture bite of the second bidirectional barbed suture in the proximal tendon section.

17. The method as claimed in claim 16, wherein the fifth suture bite of the second bidirectional barbed suture in the distal tendon section is longer than the seventh suture bite of the second bidirectional barbed suture in the distal tendon section, and wherein the sixth suture bite of the second bidirectional barbed suture in the proximal tendon section is longer than the eighth suture bite of the second bidirectional barbed suture in the proximal tendon section.

18. The method as claimed in claim 17, wherein each of the fifth and sixth suture bites has a length of about 7 mm, and each of the seventh and eighth suture bites has a length of about 5 mm.

19. The method as claimed in claim 16, further comprising:
obtaining a third bidirectional barbed suture configured to repair the tendon, the third bidirectional barbed suture including a proximal section with proximal barbs that extend in the first direction and a proximal needle secured to a proximal end of the proximal section, a distal section with distal barbs that extend in the second direction and a distal needle secured to a distal end of the distal section, and a stop located between the proximal and distal barbs;
using the distal needle of the third bidirectional barbed suture to take a ninth suture bite in the distal tendon section of the tendon and pulling the distal barbs of the third bidirectional barbed suture in the distal direction through the distal tendon section until the stop of the third bidirectional barbed suture abuts against the free end of the distal tendon section; and
using the proximal needle of the third bidirectional barbed suture to take a tenth suture bite in the proximal tendon section of the tendon and pulling the proximal barbs of the third bidirectional barbed suture in the proximal direction through the proximal tendon section until the stop of the third bidirectional barbed suture abuts against the free end of the proximal tendon section that opposes the free end of the distal tendon section for approximating the opposing free ends of the distal and proximal tendon sections of the tendon.

20. The method as claimed in claim 19, further comprising:
obtaining a fourth bidirectional barbed suture configured to repair the tendon, the fourth bidirectional barbed suture including a proximal section with proximal barbs that extend in the first direction and a proximal needle secured to a proximal end of the proximal section, a distal section with distal barbs that extend in the second direction and a distal needle secured to a distal end of the distal section, and a stop located between the proximal and distal barbs;
using the distal needle of the fourth bidirectional barbed suture to take a eleventh suture bite in the distal tendon section of the tendon and pulling the distal barbs of the fourth bidirectional barbed suture in the distal direction through the distal tendon section until the stop of the fourth bidirectional barbed suture abuts against the free end of the distal tendon section; and
using the proximal needle of the fourth bidirectional barbed suture to take a twelfth suture bite in the proximal tendon section of the tendon and pulling the proximal barbs of the fourth bidirectional barbed suture in the proximal direction through the proximal tendon section until the stop of the fourth bidirectional barbed suture abuts against the free end of the proximal tendon section that opposes the free end of the distal tendon section for approximating the opposing free ends of the distal and proximal tendon sections.

21. The method as claimed in claim 15, further comprising placing an epitendinous whip stitch around a junction of the approximated opposing free ends of the distal and proximal tendon sections.

22. The method as claimed in claim 15, further comprising placing a band of heat-shrink material around a junction of the approximated opposing free ends of the distal and proximal tendon sections.

23. The method as claimed in claim 20, wherein first and second collagen bundles extend along a length of the tendon, and wherein the first and second bidirectional barbed sutures extend linearly through the first collagen bundle and the third and fourth bidirectional barbed sutures extend linearly through the second collagen bundle.

24. A bidirectional suture system for repairing a tendon comprising:
a first bidirectional barbed suture configured to be implanted in the tendon for approximating a free end of a proximal tendon section of the tendon with a free end of a distal tendon section of the tendon, the free end of the distal tendon section opposing the free end of the proximal tendon section, the first bidirectional barbed suture including a proximal section having proximal barbs configured to engage the proximal tendon section when the first bidirectional barbed suture is implanted in a desired configuration, a distal section of the first bidirectional barbed suture having distal barbs that are configured so that, when the first bidirectional barbed suture is implanted in the desired configuration, the distal barbs engage the distal tendon section, the first bidirectional barbed suture further including a stop located between the proximal barbs and the distal barbs configured to engage the approximated free ends of the proximal and distal tendon sections when the first bidirectional barbed suture is implanted in the desired configuration.

25. The bidirectional suture system of claim 24, wherein the proximal barbs extend in a first direction and the distal barbs extend in a second direction that is opposite the first direction.

26. The bidirectional suture system of claim 24, further comprising a second, a third and a fourth bidirectional barbed suture, each of the first and second bidirectional sutures being configured to extend linearly through a first collagen bundle of the tendon and each of the third and fourth bidirectional barbed sutures being configured to extend linearly through a second collagen bundle of the tendon.

27. The bidirectional suture system of claim 24, wherein the proximal section of the first bidirectional barbed suture is configured to make a first suture bite in the proximal tendon section and a second suture bite in the proximal tendon section, the proximal section of the first bidirectional barbed suture being configured so that, when implanted in the desired configuration, a second length of the second bite is shorter than a first length of the first bite, the distal section of the first bidirectional barbed suture is configured to make a third suture bite in the distal tendon section and a fourth suture bite in the distal tendon section, and wherein the distal section of the first bidirectional suture is configured so that, when the first bidirectional barbed suture is implanted in the desired configuration, a fourth length of the fourth bite is shorter than a third length of the third bite.

28. The bidirectional suture system of claim 27, wherein the first length of the first suture bites is about 7 mm, the second length of the second suture bites is about 5 mm, the third length of the third suture bite is about 7 mm, and the fourth length of the fourth suture bite is about 5 mm.

* * * * *